United States Patent [19]
Rilling

[11] Patent Number: 5,608,409
[45] Date of Patent: Mar. 4, 1997

[54] ADAPTIVE ARRAY WITH AUTOMATIC LOOP GAIN CONTROL

[76] Inventor: Kenneth F. Rilling, 1190 Crestline Dr., Cupertino, Calif. 95014

[21] Appl. No.: 411,290

[22] Filed: Mar. 28, 1995

[51] Int. Cl.$^6$ ............................... G01S 3/16; G01S 3/28
[52] U.S. Cl. ...................... 342/380; 342/375; 342/383
[58] Field of Search .................................. 342/375, 378, 342/379, 380, 383

[56] References Cited

U.S. PATENT DOCUMENTS

| | | | |
|---|---|---|---|
| 3,763,490 | 10/1973 | Hadley et al. | |
| 3,876,947 | 4/1975 | Giraudon | |
| 4,079,379 | 3/1978 | Pesinger | 343/100 SA |
| 4,079,380 | 3/1978 | Ersy | 343/100 SA |
| 4,079,381 | 3/1978 | Piesinger | |
| 4,161,733 | 7/1979 | Piesinger | |
| 4,268,829 | 5/1981 | Baurle et al. | 343/100 LE |
| 4,280,128 | 7/1981 | Masak | |
| 4,439,770 | 3/1984 | Lewis et al. | 343/381 |
| 4,516,126 | 5/1985 | Masak et al. | 342/383 |
| 4,641,141 | 2/1987 | Masak | 342/379 |
| 4,717,919 | 1/1989 | Cherette et al. | 342/383 |
| 4,736,460 | 4/1988 | Rilling | 455/283 |
| 4,752,969 | 6/1988 | Rilling | 455/278 |
| 4,797,950 | 1/1989 | Rilling | 455/276 |
| 4,931,977 | 6/1990 | Klemes | 364/581 |
| 5,152,010 | 9/1992 | Talwar | 455/136 |
| 5,379,046 | 1/1995 | Tsujimoto | 342/378 |

FOREIGN PATENT DOCUMENTS 8931461  9/1989  Australia ..................... H04B 7/08

OTHER PUBLICATIONS

Widrow, B. et al, "Adaptive Antenna Systems", Proceedings of the IEEE, vol. 55, No. 12, Dec. 1967, pp. 2143–2159.

Treichler, John R. and Agee, Brian G., "A New Approach to Multipath Correction of Constant Modulus Signals", IEEE Transactions on Acoustics, Speech, and Signal Processing, vol. ASSP–31, No. 2, Apr. 1983, pp. 459–471.

Monzingo, Robert A. and Miller, Thomas W., *Introduction to Adaptive Arrays*, John Wiley & Sons, New York, 1980.

Monzingo, Robert A. and Miller, Thomas W., *Introduction to Adaptive Arrays*, John Wiley & Sons, New York, 1980, pp. 348–355.

Blaser, Robert J., Control Circuit Produces Linear Attenuator Response, Microwaves & RF, Feb. 1994, p. 59, 60, 62, & 64.

Prymek, Roy E., Basic Techniques Guide the Design of AGC Systems, Microwaves & RF, Sep. 1991, p. 99, 100, 102, & 106.

Prymek, Roy E., "Op Amp Filters Control Responses in AGC Systems", Microwaves & RF, Oct. 1991, p. 111,112, 114,116, 118,120,121.

Suzuki, Hiroshi, Adaptive Signal Processing for Optimal Transmission Mobile Radio Communications, IEICE Transactions Communications, vol. E–77–B, No. 5, May 1994, pp. 59–63.

Takeo Ohgane, Takanori Shimura, Naoto Matsuzawa and Hideichi Sasaoka, An Implementation of a CMA Adaptive Array for High Speed GMSK Transmission Mobile Communications, IEEE Transactions on Vehicular Technology, vol. 43, No. 3, Aug. 1993, pp. 282–288.

(List continued on next page.)

*Primary Examiner*—Theodore M. Blum
*Attorney, Agent, or Firm*—Allston L. Jones

[57] ABSTRACT

Adaptive arrays with an adaptive loop gain control to reduce the degradation in performance in reducing the effects of multipath and interference in communications receivers when the gain of the adaptive loops change with a change in the input signal level of the adaptive array. As the input signal level to the adaptive array changes, the adaptive loop gain control reduces the change in the adaptive loop gain to improve adaptive array performance.

48 Claims, 31 Drawing Sheets

OTHER PUBLICATIONS

Takeo Ohgane, Hideichi Sasaoka, Naoto Matsuzawa, Kazuhiro Takeda and Takanori Shimura, A Development of GMSK/TDMA System with CMA Adaptive Array for Land Mobile Communications, 41st IEEE Vehicular Technology Conference. Gateway to the Future Technology in Moiton. St. Louis MO, USA, 19–22 May 1991, Pub: New York, NY, USA:IEEE, 1991, pp. 172–177.

Takeo Ohgane, Hidiechi Sasoka, Seiichi Sampei, Yukiyoshi Kamio, Takanori Shimura, Kunihito Usui, and Nabuo Tsukamoto, A Designing of GMSK/TDMA System with Adaptive Array in Land Mobile Radio Communications, I.E.I.C.E., Japan, vol. 89, No. 250, RCS89–30, pp. 69–74.

Takeo Ohgane, Takanori Shimura, Hideichi Sasaoka, Seiichi Sampei, Yukiyoshi Kamio, Kunihito Usui, and Nobuo Tsukamoto, A Development of GMSK/TDMA System with Adaptive Array in Land Mobile Communications, I.E.I.C.E., Japan, vol. 89, No. 250, RCS89–31, pp. 75–80.

Gabriel, William F., Adaptive Arrays—An Introduction, Proceedings of the IEEE, vol. 64, No. 2, Feb. 1976, pp. 239–271.

D. White, Warren D., Cascade Preprocessors of Adaptive Antennas, IEEE Transactions on Antennas and Propagation, vol. AP–24, No. 5, Sep. 1976, pp. 670–684.

J. R. Compton, Jr., *Adaptive Antennas Concepts and Performance*, Prentice Hall, Englewood Cliffs NJ, 1988, pp. 310–317.

Tavares, Concalo and Piedade, Moises S., High Performance Algorithms for Digital Signal Processing AGC, 1990 IEEE International Symposium on Circuits and Systems, V2, pp. 1529–1532.

Triechler, John R., Johnson, C. Richard Jr., Larimore, G. Micheal, *Theory and Design of Adaptive Filters*, John Wiley & Sons, New York, 1987, pp. 82–85.

Chang, C. Y., Adaptive Multichannel Filtering, IEEE International Conference on Acoustics, Speech, and Signal Processing ICASSP 80, V2, pp. 462–465, Apr. 9–11, 1980, Denver, Colo.

Mitkees, A., Eweda, E. I., Matar, M. A. and Hamad, G., A Proposal for Speed—Accuracy Trade—Off in the LMS Adaptive Array, Proceedings of the Third National Radio Science Symposium 1985, pp. 1991–201, Conf. date Feb. 23–25, 1985, Cairo, Egypt.

AD–A080 374/2, An Adaptive Array with Automatic Gain Control, by John Rogers Sutton (Master's Thesis).

From
Antenna Element 10
Or
Mixer 18
Or
Bandpass Filter 12

Amplifier 14

To
Tapped Delay Line 20
Or
Mixer 18

ADAPTIVE ARRAY WITH AUTOMATIC LOOP GAIN CONTROL

TECHNICAL FIELD

The present invention relates to the use of adaptive arrays in communications receivers and other applications and is particularly directed to improving the performance of methods that adaptively reduce noise and distortion due to multipath and interference.

BACKGROUND

In many applications where a signal is used to provide information in some form, the quality and/or reliability of that information can be degraded by other unwanted signals or noise. This is particularly true of communications systems. To obtain high quality reception, communication systems (including mobile communications, such as Broadcast FM radio or celluar telephone in automobiles), require a strong signal that is not corrupted by noise or distortion). One source of noise and distortion that can severely degrade reception is multipath. Multipath occurs when the transmitted signal arrives at the receiver simultaneously from more than one direction. The multiple paths are generally due to reflections of the transmitted signal from hills, buildings, etc. and can also be the result of atmospheric phenomena. Multipath can cause distortion in the amplitude, phase and frequency of the received signal, which can result in deep signal strength fades, overlapping data, noise, etc.

One approach well known in the art for reducing the effects of multipath and interference is the adaptive array (Widrow, B. & others, "Adaptive Antenna Systems", Proceedings of the IEEE, Vol. 55, No. 12, December 1967, pp. 2143–2159; Treichler, John R. and Agee, Brian G., "A New Approach to Multipath Correction of Constant Modulus Signals", IEEE Transactions on Acoustics, Speech, and Signal Processing, Vol. ASSP-31, No. 2, April 1983, pp.459–471; Monzingo, Robert A. and Miller, Thomas W., *Introduction to Adaptive Arrays*, John Wiley & Sons, New York, 1980; U.S. Pat. Nos. 4,736,460, Multipath Reduction System by Kenneth Rilling, 4,797,950, Multipath Reduction System by Kenneth Rilling, and 4,752,969, Anti-Multipath Signal Processor by Kenneth Rilling). The performance of adaptive arrays can depend strongly on the gain of the adaptive loops, however, in some adaptive arrays the gain of the adaptive loops depend on the level of the input signals to the adaptive array. In some applications, such as mobile communications (i.e. FM radio in automobiles), the dynamic range of the input signals of an adaptive array can be very large, causing a large change in the loop gain. This pushes the adaptive array off its performance peak, resulting in reduced multipath noise and interference reduction.

SUMMARY OF INVENTION

The present invention reduces the degradation in performance of adaptive arrays having a plurality of adaptive loops for reducing the effects of a signal-of-interest with multiple images with different delay times and of interference received by the adaptive array for improving the performance of the adaptive array degraded by an increased difference between the gain and the optimal gain of any of the adaptive loops as a result of change of the average input signal level of the adaptive array. In the direct control form of the present invention, the adaptive loops include at least one gain control to automatically change the gain of said adaptive loops with a control signal, where the control signal changes the gain of the gain control to reduce the increased difference between the gain and the optimal gain of the adaptive loops caused by change in the average input signal level to improve the performance of the adaptive array. In the indirect control form of the present invention, the input signal paths to the adaptive array each include a gain control to automatically reduce the change in the average input signal level of the adaptive array with a control signal, where the control signal changes the gain of each gain control to reduce the change of the average input signal level and reduce the increased difference between the gain and the optimal gain of said adaptive loops to improve the performance of adaptive array.

DETAILED DESCRIPTION

Figure 1:
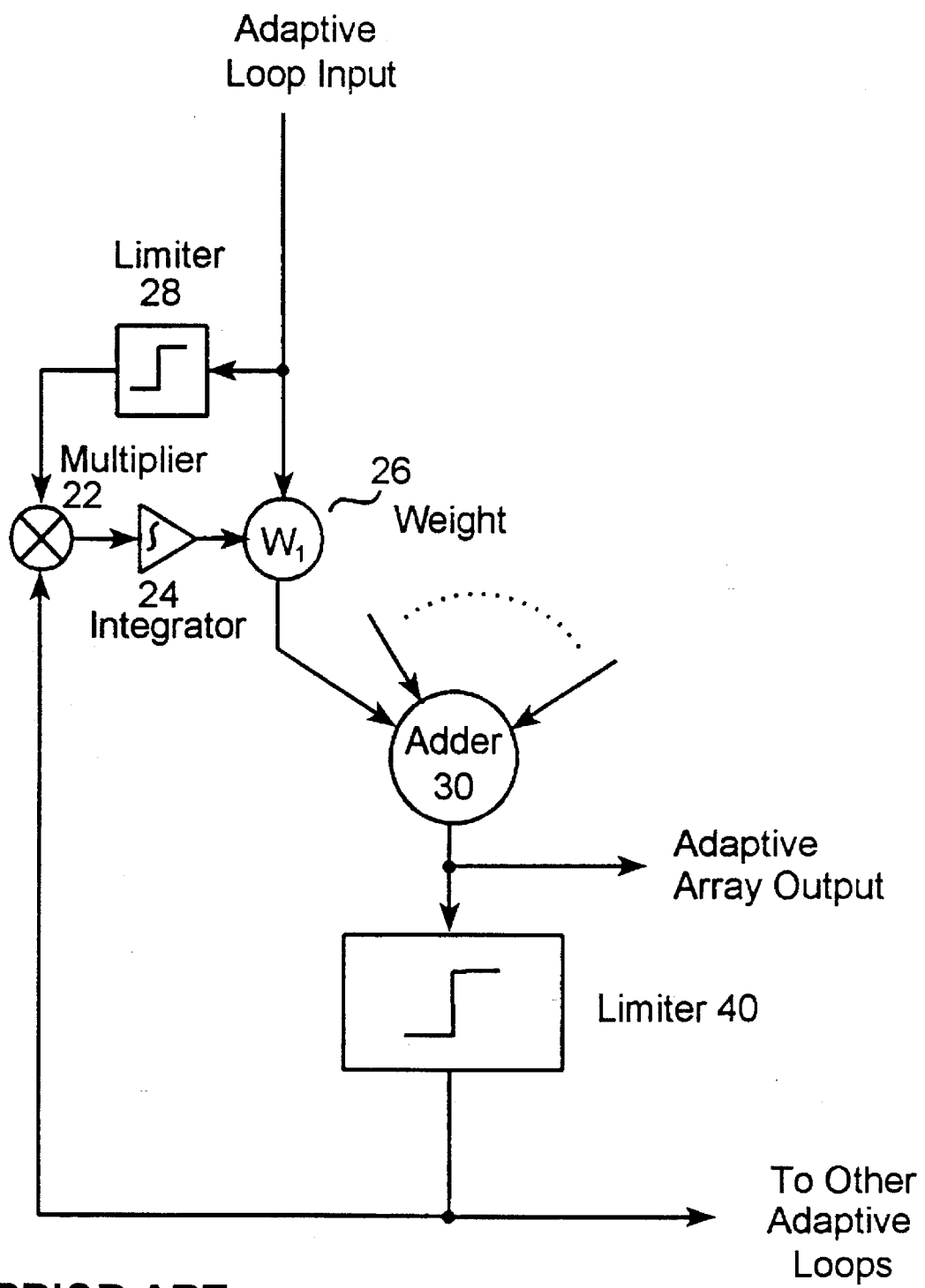
FIG. 1 is a block diagram of a prior art adaptive loop.

The gain of the adaptive loop can be an important parameter for adaptive arrays in determining multipath noise and interference reduction performance. FIG. 1 shows a single adaptive loop from the prior art adaptive array shown in FIG. 2. The adaptive loop includes the weight 26, adder 30, amplitude limiter 40, multiplier 22, and integrator 24. An adaptive loop is the feedback signal path for generating the control signal for a weight. The gain of the adaptive loop is defined for purposes of the present invention as all of the effective amplifications and attenuations of the signal around the adaptive loop.

Amplitude limiter 28 in FIG. 1, although not directly part of the adaptive loop, does affect the gain of the adaptive loop by providing an input signal with a constant power level to multiplier 22. The operation and purpose of limiter 28 is discussed below.

Figure 2:
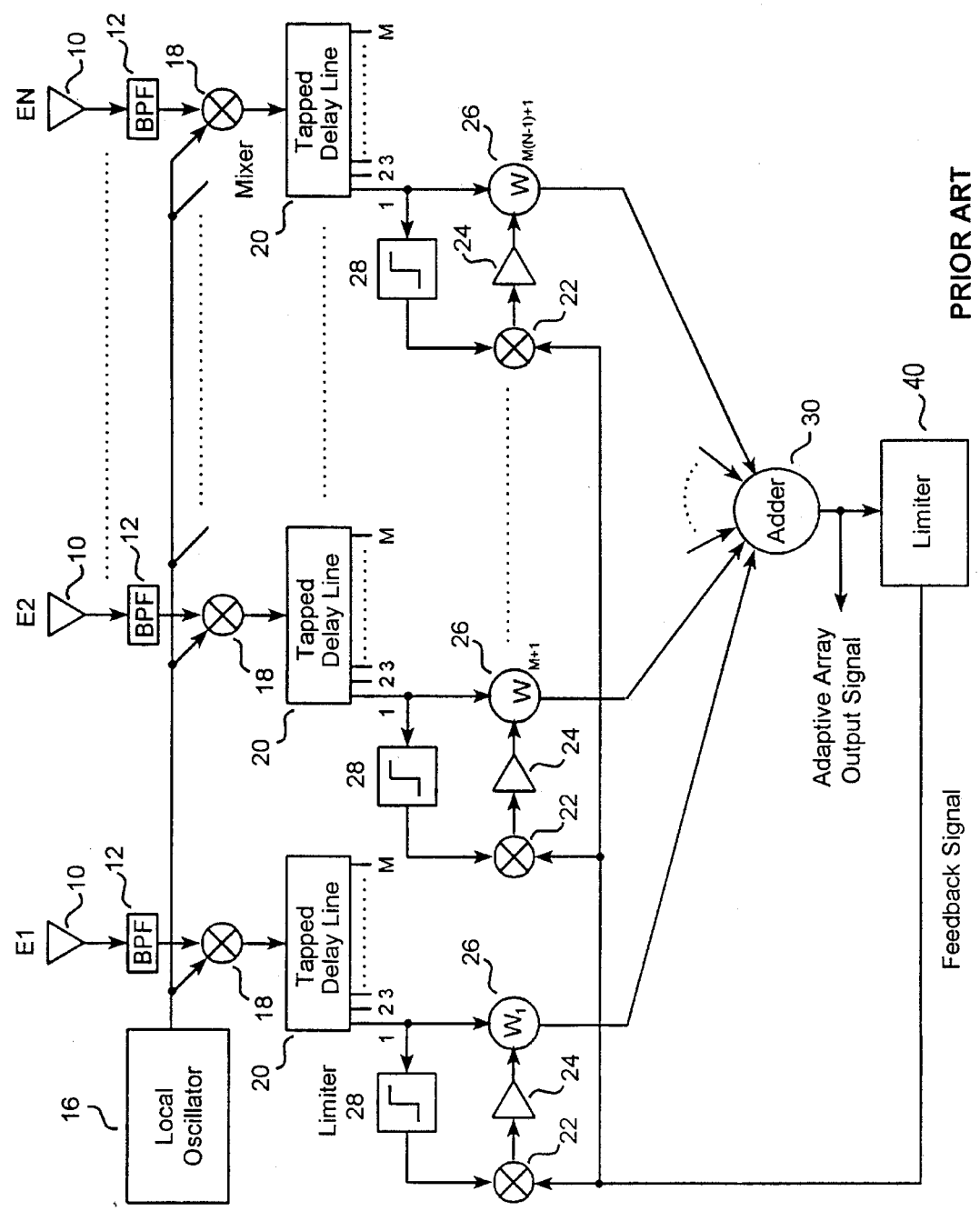
FIG. 2 is a block diagram of a prior art adaptive array.

In general, adaptive arrays have many adaptive loops. In FIG. 2, the adaptive array has N input elements En, with each input element having one tapped delay line 20 with M output terminals, each of which provides the input signal to the corresponding adaptive loop. The number of loops in the adaptive array is equal to the product N times M. All of the adaptive loops have the same gain unless they are designed otherwise. In general, the adaptive loops share some components. Each of the loops of the adaptive array in FIG. 2 share adder 30 and limiter 40 in the feedback signal path.

When adaptive arrays are used in communication systems, the antenna array receives an average signal level which can change in time. In a multipath or interference signal environment, the induced amplitude fluctuations on the received signal are different from array element to array element, where each array element is placed at a different location in space (i.e. different location on a vehicle). For purposes of the present invention, the phrase "input signal level" will mean the average signal level common to all the input elements, unless the context indicates otherwise.

There are at least several general reasons why the performance of all adaptive arrays depend, to a greater or lesser extent, on the loop gain. As the loop gain decreases, the speed of convergence of the adaptive array decreases, where the speed of convergence is the rate at which the adaptive array reaches steady state. If the speed of convergence is too slow, the performance of the adaptive array can degrade in a changing signal environment. As the loop gain increases, the speed of convergence increases. However, the weight noise also increases and the error of the steady state value increases. If the loop gain is too high, the weight noise degrades the performance of the adaptive array. Optimal performance can thus become a trade-off between these effects. Also, when the loop gain is very large, weights can be more easily driven to their limits because practical weights have a limited dynamic range. When this happens, performance degrades. If the loop gain is very small, weak signal conditions can result in signal levels close to the signal biases which are present in practical adaptive arrays. The biases are sources of error and when they become significant relative to adaptive array signal levels, they degrade performance. In the case of digital systems, a small loop gain in weak signal conditions can result in low level signals that are influenced by quantization errors. This also degrades performance. The input signal level also can affect other aspects of the adaptive array which reduce performance.

Components which deviate from their ideal (i.e. non-linear multipliers, non-linear weights, non-linear amplifiers, limiters with output power changes, etc.) can be interpreted in terms of an effective change in loop gain caused by a change in the input signal level. The deviation from the perfect component can be due to flaws in the component or the result of a deliberate effort to reduce cost, size, etc. Since all practical components have errors, all adaptive arrays can suffer some degradation when the input signal level to the adaptive array changes.

Figure 3:
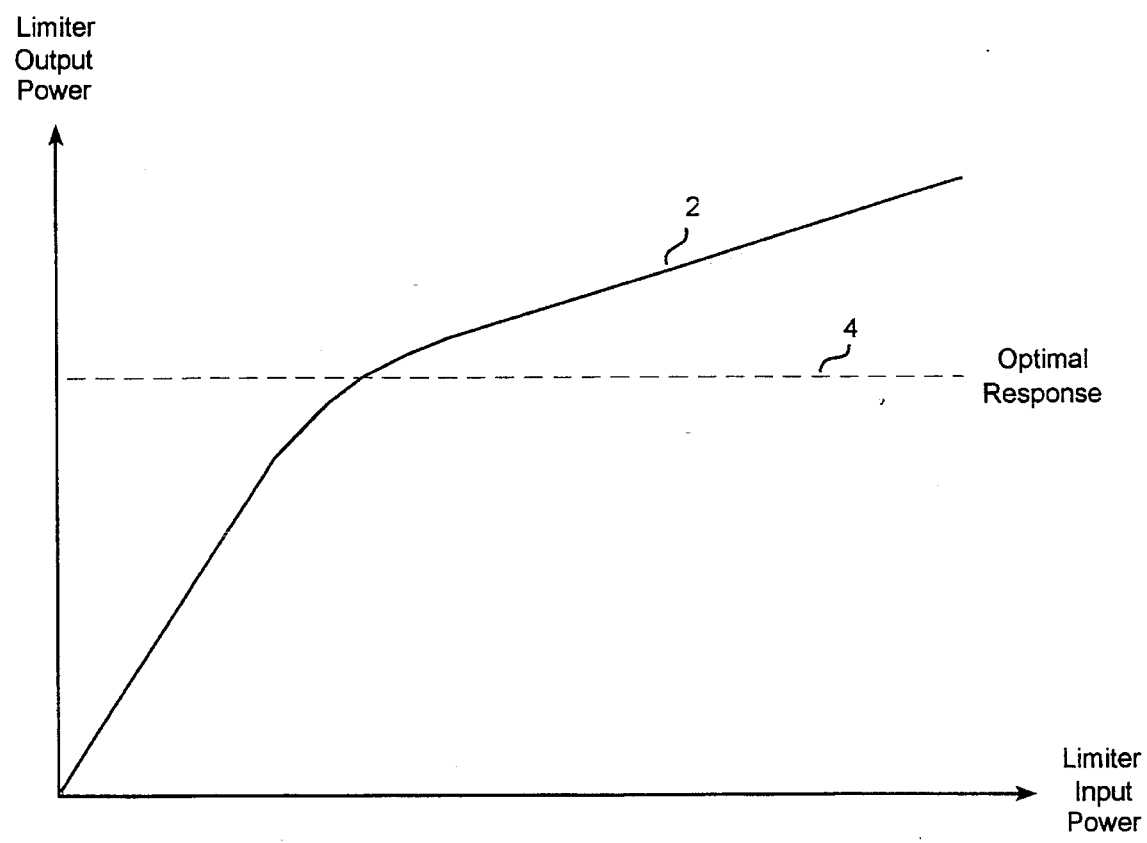
FIG. 3 is a plot of the performance of an ideal and a non-ideal limiter.

As an example, consider an implementation of limiter 28 in FIG. 1 which deviates from the ideal limiter, where, as shown in FIG. 3 by curve 2, the output power of limiter 28 changes as a function of input power. As the input signal level to limiter 28 increases, the output power of limiter 28 increases. This in turn causes an increase in loop gain, and if uncompensated, can cause a degradation in adaptive array performance. In contrast, the output power of an ideal limiter stays constant over the dynamic range of the input power, as shown by curve 4 in FIG. 3.

Figure 4:
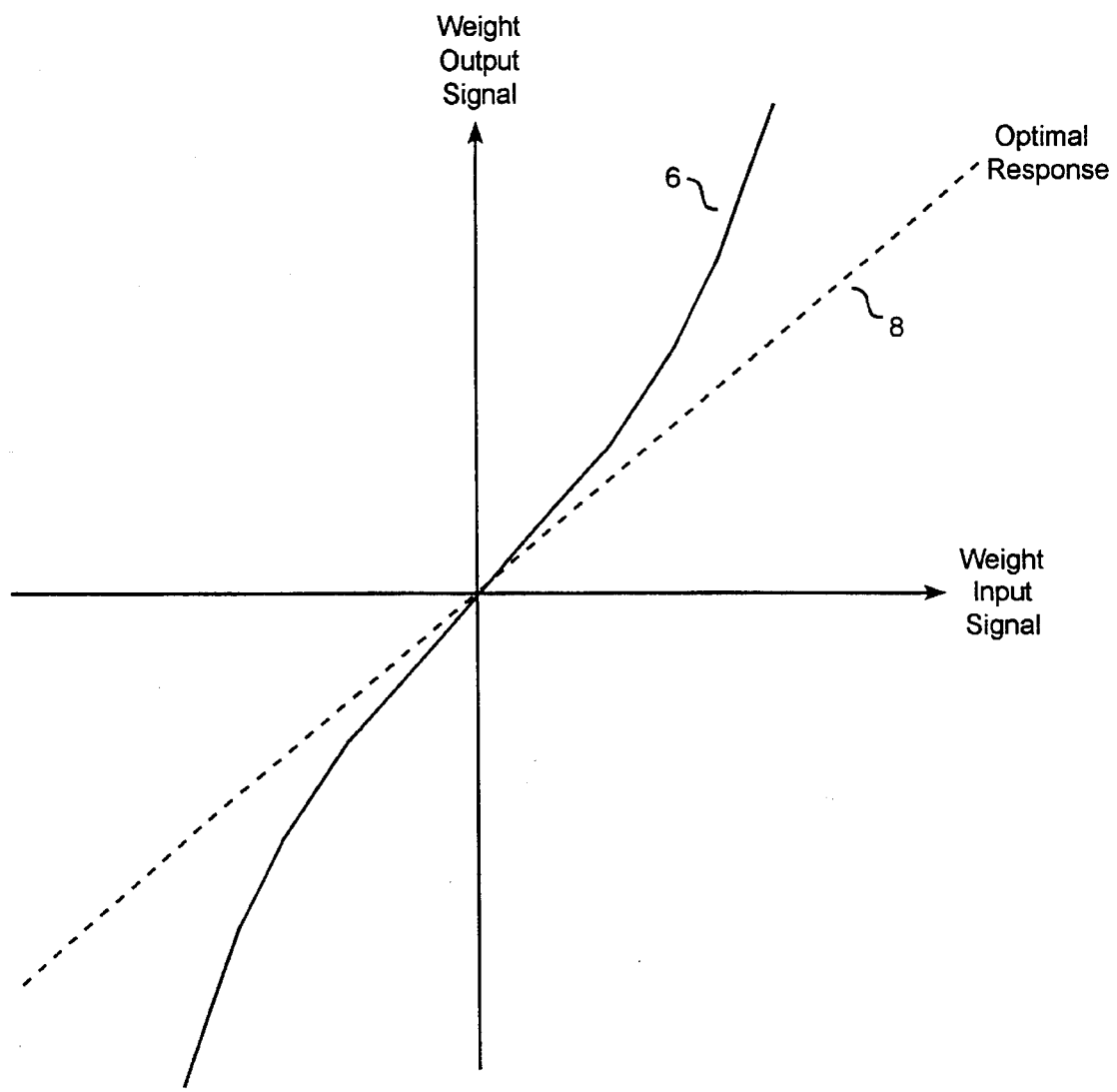
FIG. 4 is a plot of the performance of a linear and a non-linear multiplier.

As another example, consider the effect of an implementation of weight 26 in FIG. 1 with a non-linear response. As shown in FIG. 4, the non-linear weight response curve 6 deviates from the ideal linear weight response curve 8. With the constant power output signals of limiters 40 and 28 holding the output signal of multiplier 22 constant, the output signal of integrator 24, which is the weighting value of weight 26 is held constant. With the input signal of the adaptive loop increasing, and therefore the input signal of weight 26 increasing, the output signal of weight 26 increases in a non-linear manner. The deviation from the linear response of weight 26, in effect, can be interpreted as an increase in loop gain, and if uncompensated, can cause a degradation of adaptive array performance.

The way the adaptive loop gain changes as a function of the input signal level depends on the specific adaptive array implementation. William F. Gabriel (Proceedings of the IEEE, Vol. 64, No. 2, February 1976, pp. 239–271) showed that the loop gain/input signal level relationship changed for two specific adaptive array implementations. The relationship between loop gain and adaptive array performance was also known, however, it was derived from an abstract mathematical model of the adaptive loop formulated to calculate adaptive array design parameters. That model is very appropriate for the purposes of determining adaptive array design parameters, however, it obscures the physical relationship of the change in loop gain with the characteristics of adaptive loop components.

In the present invention, the way the feedback signal is generated from the adaptive array output signal is a possible source of change of the loop gain when the input signal level of the adaptive array changes. The way in which a change in the input signal level affects the adaptive loop gain depends on the technique used to generate the feedback signal from the adaptive array output signal.

For purposes of the present invention, possible techniques for generating the feedback signal are called the feedback functions, which include those given in U.S. Pat. Nos. 4,736,460 (Multipath Reduction System by Kenneth Rilling), 4,797,950 (Multipath Reduction System by Kenneth Rilling) and 4,752,950 (Anti-Multipath Signal Processor by Kenneth Rilling) for Constant Modulus Algorithm (CMA) based adaptive arrays.

As discussed in U.S. Pat. Nos. 4,736,460, 4,797,950, and 4,752,696 by Rilling, CMA adaptive arrays can only reject interference signals which have an amplitude which is less than the amplitude of the signal-of-interest. For purposes of the present invention for adaptive arrays which must have the signal of interest be the largest received inband signal, the term "interference signal" means interfering signals with an amplitude less than the amplitude of the signal-of-interest.

The loop gain for an adaptive array needs to be set to a value which provides the best performance. However, as discussed above, the loop gain of many adaptive arrays can depend on the input signal level to the adaptive array to a greater or lesser degree. As the input signal level changes, the gain of the adaptive loops change. If the change in the input signal level is too large, the adaptive array can be driven off its performance peak by the change in loop gain. This degrades the ability of the adaptive array to reduce multipath noise and interference.

Tests in a multipath signal environment have shown that the performance of the prior art adaptive array in FIG. 2 depends on the adaptive loop gain. For a given input signal level, a specific loop gain was found for which the adaptive array performance is maximized. The further the loop gain deviates in either direction from the optimal loop gain value, the poorer the adaptive array performs. This is a problem because the input signal level to the adaptive array for many applications does not stay constant. This is particularly true in mobile communications.

Analysis of the prior art adaptive loop in FIG. 1 shows that the specific implementation of the loop is a major cause of the dependence of the adaptive loop gain on the input signal level. For purposes of this analysis, assume that all the components of the adaptive loop are ideal. As the loop input signal level increases, the input signal level of limiter 40 increases, however the output power of a limiter must stay constant. The only possible way this can occur is for the effective gain (the ratio of the output to input signal power) of limiter 40 to decrease. The resulting decrease in gain of limiter 40 causes a corresponding net decrease in the gain of the adaptive loop. When the change of the input signal level is too great, the corresponding change in the gain of each loop pushes the prior art adaptive array in FIG. 2 off the performance peak, causing the negative effects of multipath and interference to increase.

The following example gives a more detailed analysis of how a change in the input signal level of an adaptive array causes the gain of the loop to change, and clearly isolates the cause of the loop gain change. Consider the simplified case of a single prior art adaptive loop as in FIG. 1, where all the components are ideal. By letting the input signal level to the adaptive loop of FIG. 1 increase by a factor of 2, the level of the input signal of limiter 40 increases by a factor of 2 because the weight 26 is held constant. With the output signal power of limiter 40 held constant, the effective gain of limiter 40 decreases by a factor of ½, which in turn lowers the gain of the overall adaptive loop by a factor of ½. Since the output signals of limiters 40 and 28 are constant, the output signal of multiplier 22 must remain constant, and this in turn keeps the output signal of integrator 24 constant, which in turn keeps weight 26 constant. In this example, weight 26 stays constant when the input level of the adaptive loop increases by a factor 2, but the gain of the adaptive loop decreases by a factor of ½. Thus, the cause of the change in loop gain is isolated to the change in gain of limiter 40.

From the above analysis, it is understood that, as the input signal level of the prior art adaptive array of FIG. 2 increases by a factor of 2, the gain of all of the adaptive loops decrease (in general, not by a factor of 2 because all the weighted output signals for the loops are summed to contribute to the array output signal which determines the gain of limiter 40). It is also clear that the change in the gain of each adaptive loop is due to the change in the gain of limiter 40 and that the degradation in performance is due to, at least in part, the change in the loop gain. It is also clear that the dynamic range of the input signal level of the adaptive array must be relatively small so that the gain of the adaptive loops do not change too much and degrade the performance of the adaptive array.

Keeping the dynamic range of the input signal level small is not practical for many adaptive array applications, particularly for mobile communications applications (i.e. aircraft communications, marine communications, celluar phones, FM radios in automobiles, etc.) where the dynamic range of received signals are often very large. Therefore, it is clear that the dynamic range of the adaptive array input signal level cannot be restricted in many applications, and it is the change in the adaptive loop gain that must be reduced to prevent degradation in performance.

In the present invention, the change in the gain of the adaptive loops, which occurs when the input signal level of the adaptive array changes, is reduced by an automatic loop gain control (AGLC). It is this step of reducing the change in the adaptive loop gain caused by a change in input signal level with the ALGC to improve the performance of the adaptive array in multipath and interference signal environments which is new. The adaptive loop gain can be controlled by direct ALGC techniques and indirect ALGC techniques. In the direct ALGC implementations of the present invention, the gain control(s) are located in the adaptive loops. In the indirect ALGC implementations of the present invention, the gain controls are located in the input signal paths to the adaptive array. The direct and indirect ALGC approaches can be implemented in the same adaptive array.

The ALGC in FIGS. 6–8 and 10–15 include a detector network 70 and gain control 60, where the detector network 70 determines the input signal level of the adaptive array and generates a control signal which changes the gain of the gain control 60 to, at least in part, reduce the change in loop gain due to the change in input signal level.

Although the prior art had recognized that the loop gain change resulted in degradation of performance, it did not recognize the loop gain as a dynamic parameter which can be controlled to improve performance. In the present invention, adaptive array implementations and analysis methods where chosen that isolate the cause of the loop change and provided the necessary insight to solve the problem. The inventive steps consist of the following: 1) Recognizing that the performance of the adaptive array degraded when the input signal level changed. 2) Identifying adaptive array applications where the degradation in performance is a problem. 3) Analyzing an adaptive loop implementation which isolated the cause of the loop gain change. 4) Recognizing that if the change in the gain of the adaptive loops can be controlled and reduced when the input signal level changes, performance degradation can be reduced. 5) Determining that the change in adaptive loop gain can be controlled and reduced by the ALGC, thereby improving the performance of the adaptive array.

The detector networks in FIGS. 6–8, 10–15, 30/31 and the other embodiments of the present invention generate an appropriate control signal for controlling the gain of a gain control for specific adaptive array and ALGC implementation. The control signal is derived from one or more signals which are substantially representative in some form and to some extent to the input signal level of the adaptive array. The signals from which the control signal can be derived includes, but are not restricted to one or more adaptive array input signals, the adaptive array output signal, a processed adaptive array output signal, or the output signal of one or more weights. In the case of applications of many communications receivers, the input signals to the detector network can be at RF, IF or audio frequencies (the audio frequencies used with envelope modulated systems only). The detector network can include a level detector for determining the level of the input signal(s), a signal processor section for providing the proper input signal level to control signal relationship and a method for setting the control signal bandwidth (note: a signal processor section is not always necessary). The implementation of level detectors and signal processing components are well known in the art.

The use of automatic gain control (AGC) circuits are common in communications receivers and other electronics applications (see for example Blaser, Robert J., "Control Circuit Produces Linear Attenuator Response", Microwaves & RF, February 1994, p.59; Prymek, Roy E., Basic Techniques Guide the Design of AGC Systems, Microwaves & RF, September 1991, p.99; Prymek, Roy E., "Op Amp Filters Control Responses in AGC Systems", Microwaves & RF, October 1991, p.111; Suzuki, Hiroshi, "Adaptive Signal Processing for Optimal Transmission Mobile Radio Communications", IEICE Transactions Communications, Vol. E-77-B, No. 5, May 1994, Pp. 59–63; Tavares, Concalo and Piedade, Moises S., "High Performance Algorithms for Digital Signal Processing AGC", 1990 IEEE International Symposium on Circuits and Systems, V2, Pp. 1529–1532). Although there are many similarities between ALGC of the present invention and standard receiver AGC, there are also many differences. The purpose for which an AGC is used in a standard communications receiver is different than the purpose for which the ALGC is used in the present invention. The AGC of the standard receiver controls the level of the RF, IF, and/or audio signal so that the mixers, IF amplifiers, detector circuits, etc. stay within their operating range, and, additionally, for communications systems that use a modulation type with constant envelope (i.e. FM, PSK, FSK, etc.) can help reduce amplitude fluctuations. In contrast, in the present invention, the purpose of the ALGC is to control the gain of the adaptive loops. The ALGC does not replace the function of the standard AGC of a receiver, and in any implementation of the present invention, an AGC can be added to compatibly perform the AGC functions outlined above.

Because of their different purposes, the AGC and the indirect ALGC implementations affect the bandwidth of the envelope of the received signal differently. As an example, consider an FM radio receiver. The FM radio signal has a constant envelope when transmitted, but multipath and interference cause both modulation of the envelope and distortion of the phase and frequency. Unless the amplitude modulation is removed, unnecessary additional audio noise and distortion results. In some standard FM receiver, relatively wide bandwidth RF AGC that responds quickly to amplitude jumps and deep signal fades caused by multipath and interference is used in conjunction with amplitude limiters to remove as much amplitude modulation as possible. In contrast, in the present invention, the indirect ALGC implementations need to preserve most of the amplitude modulation because the adaptive array uses it as information to help reject the unwanted multipath or interference signals which caused it (see 4,797,950 by Rilling). The bandwidth of the control signal for an ALGC with the gain control located in the adaptive array input signal path, to be discussed below, can be much narrower than that for an RF AGC of a standard FM receiver so that the gain control of the ALGC can pass most of the amplitude modulation through to the input tapped delay line 20, etc. of the adaptive array. By making the bandwidth of the ALGC control signal narrow, the control signal tracks the average level of the level detector output signal. Consequently, the gain control can respond only to the average change in the input signal level. Because the gain control only responds to the average change of the input signal level of the adaptive array, the higher frequency components of the input signal from each element are not responded to by the ALGC. They pass through the gain controls to the input of the tapped delay lines 20, or 90 degree phase shifters 20', etc. For implementations of the present invention with the gain control located in the adaptive loop, discussed below, the amplitude fluctuations of the adaptive array input signals are not affected directly by the ALGC bandwidth because the gain control is not located in the input signal path of the adaptive array.

The above comparison of the indirect ALGC to AGC in an FM receiver also applies to receivers of communications systems that use other constant envelope modulation types. The multipath and interference induced envelope modulations are unwanted in these standard receivers, but they are desirable in the adaptive array.

For communications systems which use modulation types that modulate the envelope (i.e. AM, single side band AM, suppressed carrier AM, etc.), the same comparison is true, except that the standard receiver, such as an AM receiver, can not use the AGC or limiter to remove multipath or interference induced amplitude fluctuations because that would also remove the modulated information. The envelope modulated type communications systems receivers will not work well with the indirect gain control embodiments of the present invention unless most of the modulation signal is higher in frequency than the control signal; the present invention is restricted to these systems for envelope modulation.

The function of standard AGC is to control the dynamic range of the receiver signal amplitude, and, often in the case of a constant envelope type of modulation (FM, FSK, PSK, etc.) in conjunction with limiters, to also minimize amplitude fluctuations of the received signal induced by multipath, interference, or other sources. The function of the ALGC is to reduce the performance degradation of the adaptive array in multipath and interference signal environments by controlling the gain of the adaptive loops. In general, since the present invention does not specifically control the dynamic range of the received signal, the standard receiver AGC still needs to be used when the present invention is implemented in a receiver.

The ALGC circuits in this invention are used in addition to the standard receiver AGC circuits. Although the ALGC circuits of this invention may be combined with the standard receiver AGC circuits, such a hybrid circuit must insure that both the signal level dynamic range requirements of the standard receiver and the loop gain requirements of the ALGC for the adaptive array are met. As an example, in communications application, the receiver RF level detection circuitry of some standard RF AGC can be shared with the present invention to derive the AGC control signal.

In "An Implementation of a CMA Adaptive Array for High Speed GMSK Transmission in Mobile Communications" by Takeo Ohgane, Takanori Shimura, Naoto Matsuzawa and Hideichi Sasaoka (IEEE Transactions on Vehicular Technology, vol. 43, no. 3, August 1993, pp. 282–288) and "A Development of GMSK/TDMA System with CMA Adaptive Array for Land Mobile Communications" by Takeo Ohgane, Hideichi Sasaoka, Naoto Matsuzawa, Kazuhiro Takeda and Takanori Shimura (41st IEEE Vehicular Technology Conference. Gateway to the Future Technology in Motion. St. Louis Mo., USA, 19–22 May 1991, Pub: New York, N.Y., USA: IEEE, 1991, pp. 172–177) an AGC system in the input to a 4-element constant modulus algorithm (CMA) adaptive array for GMSK/TDMA modulation scheme for land mobile communications receivers is used. AGC is used to control the input to the Ohgane adaptive array. However, this AGC is different in many ways from the indirect ALGC in the present invention, because it meets the requirements of standard receiver AGC for a receiver used with an adaptive array but not the requirements of the indirect ALGC for the present invention.

The AGC of Ohgane adaptive array is part of the down conversion and A/D converter section of the receiver for each antenna element to "roughly control" the input power of the adaptive array, where in contrast in the present invention, the indirect ALGC is part of the adaptive array input to reduce the change in the input signal level of the adaptive array so that the change in the gain of the adaptive loops is reduced. The control signal for the AGC of the Ohgane adaptive array is generated from the input signal level of all four antenna elements, where the signal from the antenna element with greatest signal amplitude is selected to generate the control signal, where in contrast in the present invention, the control signal for the indirect AGLC is generated from the average input signal level of the adaptive array by averaging one or more antenna element signals or the adaptive array output signal. In the Ohgane adaptive array, the AGC gain in all the elements are changed the same amount to prevent the AGC from changing in accordance with the Doppler shift of the received signal, where in contrast in the present invention, the gain of the ALGC gain control in each input element to the adaptive array changes the same amount to preserve the relative amplitude fluctuations of the received signals from element to element. The Ohgane adaptive array has the AGC adjust gain more slowly than the weight adjustment, where in contrast, the present invention the ALGC changes slowly enough so that the ALGC gain tracks the average input signal level of the adaptive array and has the amplitude fluctuations caused by multipath and interference pass through to the inputs of the adaptive array. The Oghane adaptive array uses only feedback AGC, where in contrast in the present invention, feedforward or feedback based indirect ALGC is used, where the feedback AGLC can use either the adaptive array input signals or the adaptive array output signal to generate the control signal. The Oghane adaptive array is designed for a GMSK/TDMA modulation system, where in contrast in the present invention, the ALGC applies to analog and digital modulations with constant envelope modulation or envelope modulation systems. The AGC of the Oghane adaptive array is different from the indirect ALGC of the present invention. The AGC of the Oghane adaptive array meets the requirements of standard receiver AGC for a receiver used with an adaptive array, but not the requirements of the indirect ALGC for the present invention.

Figure 5:
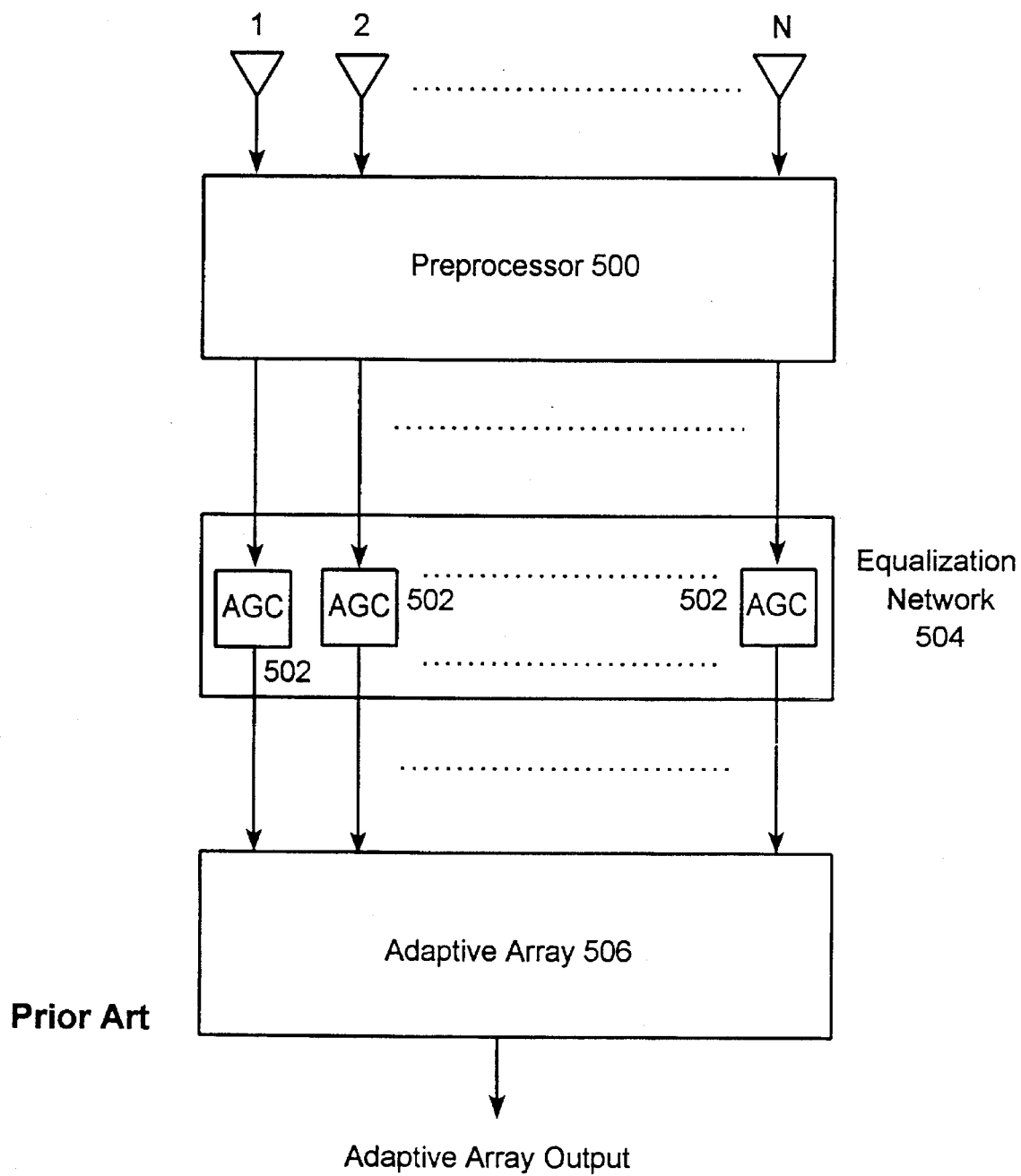
FIG. 5 is block diagram of a prior art adaptive array using a preprocessor and AGC circuits to reduce eignvalue spread.

The theory of adaptive arrays shows that a large spread in the eignavalues causes slow adaptive array convergence (see Monzingo, Robert A., and Miller, Thomas W., *Introduction to Adaptive Arrays*, John Wiley & Sons, New York, 1980). Preprocessors, such as the Gram-Schmidt orthogonalization preprocessor, have been developed for use with some adaptive arrays to decrease the time of convergence when large eignvalue spread occur. FIG. 5 shows a prior art block diagram of a preprocessor and adaptive array arrangement. To summarize, because the signals received by each of the array antenna elements come from the same source(s), the array input signals are correlated. The preprocessor 500 transforms the set of correlated array input signals into a set of uncorrelated orthogonal signals, each of which is related to an individual eignvalue. Because the output signals of preprocessor 500 are orthogonal and uncorrelated, their individual gains can be adjusted without affecting the performance of the adaptive array 506. Since each output signal of preprocessor 500 is related to an individual eignvalue, equalizing these signals with equalization network 504 makes the eignvalue spread small and decreases the time of convergence for adaptive array 506. The equalization network 504 is implemented with individual AGC circuits 502.

The indirect ALGC implementations of the present invention is different from the AGC used in the equalization network 504 in FIG. 5. First, the equalization AGC must be used in conjunction with preprocessor 500 which provides a set of orthogonalized output signals, where in contrast, the indirect ALGC does not require a preprocessor and uses the standard correlated adaptive array input signals. Second, the purpose of the AGC circuits 502 in the equalization network 504 is to reduce eignvalue spread, where in contrast, the purpose of the ALGC of the present invention is to control the gain of the adaptive loops. Third, the equalization network 504 makes the input signals to the adaptive array 506 nominally equal, where in contrast, in the present invention, the indirect ALGC preserves the relative amplitude difference between the array input signals.

Fourth, the equalization network 504 implements an independent AGC circuit 502 for each input signal. Since the AGC circuits 502 for each input signal are independent of each other, the control signal of each AGC circuit 502 is derived from its corresponding input signal and is the control signal for that AGC circuit 502 only. Where in contrast in the present invention, a single collective ALGC is implemented that controls all the adaptive loops and input signals. All the gain controls of the present invention use the same control signal, with the control signal being derived from one or more of the array input signals or the array output signal. In the present invention, the ALGC acts as a gain control for the whole adaptive array as a unit.

A prior an Gram-Schmidt preprocessor-LMS adaptive array implementation is described by J. R. Compton, Jr., (*Adaptive Antennas Concepts and Performance. Prentice Hall*, Englewood Cliffs N.J., 1988) for solving the eigenvalue spread problem by controlling the time constant of each of the individual complex adaptive loop which make up the preprocessor and adaptive array combination. The time constant of each complex adaptive loop is held fixed by an independent AGC circuit by implementing a gain control located in the feedback signal path. The input signal level of the complex loop is used to generate the control signal for that AGC circuit. In this manner the convergence time of each complex loop is controlled and the eigenvalue spread problem solved. This is possible only because the set of input signals are decoupled by the orthogonalization process of the Gram-Schmidt preprocessor.

The ALGC used in the present invention is different from the independent AGC circuits used in the adaptive loops of the Gram-Schmidt preprocessor-LMS adaptive array. First, the adaptive loop AGC of the LMS adaptive array must be used with the decorrelated orthogonal set of output signals from the Gram-Schmidt preprocessor, where in contrast, the ALGC of the present invention does not use a preprocessor and uses the standard correlated adaptive array input signals. Second, the purpose of the AGC circuit of each complex loop in the preprocessor-LMS adaptive array is to reduce the eignvalue spread, where in contrast, the purpose of the ALGC of the present invention is to control the gain of the adaptive loops. Third, the control signal for each AGC gain control of the complex loops of the preprocessor-LMS adaptive array is derived from the input signal of that individual complex loop and acts as a gain control for that complex loop only, where in contrast, for the present invention, all the gain controls use the same control signal, where the control signal is derived from one or more of the array input signals or the array output signal. Fourth, the AGC circuit for each complex loop of the preprocessor-LMS adaptive array is an independent circuit, where in contrast, in the present invention, a single collective ALGC is implemented which controls the gain of all the adaptive loops, and all the gain controls use the same control signal, with the control signal being derived from one or more of the array input signals or the array output signal. In the present invention, the ALGC acts as a gain control for the whole adaptive array as a unit.

Figure 11:
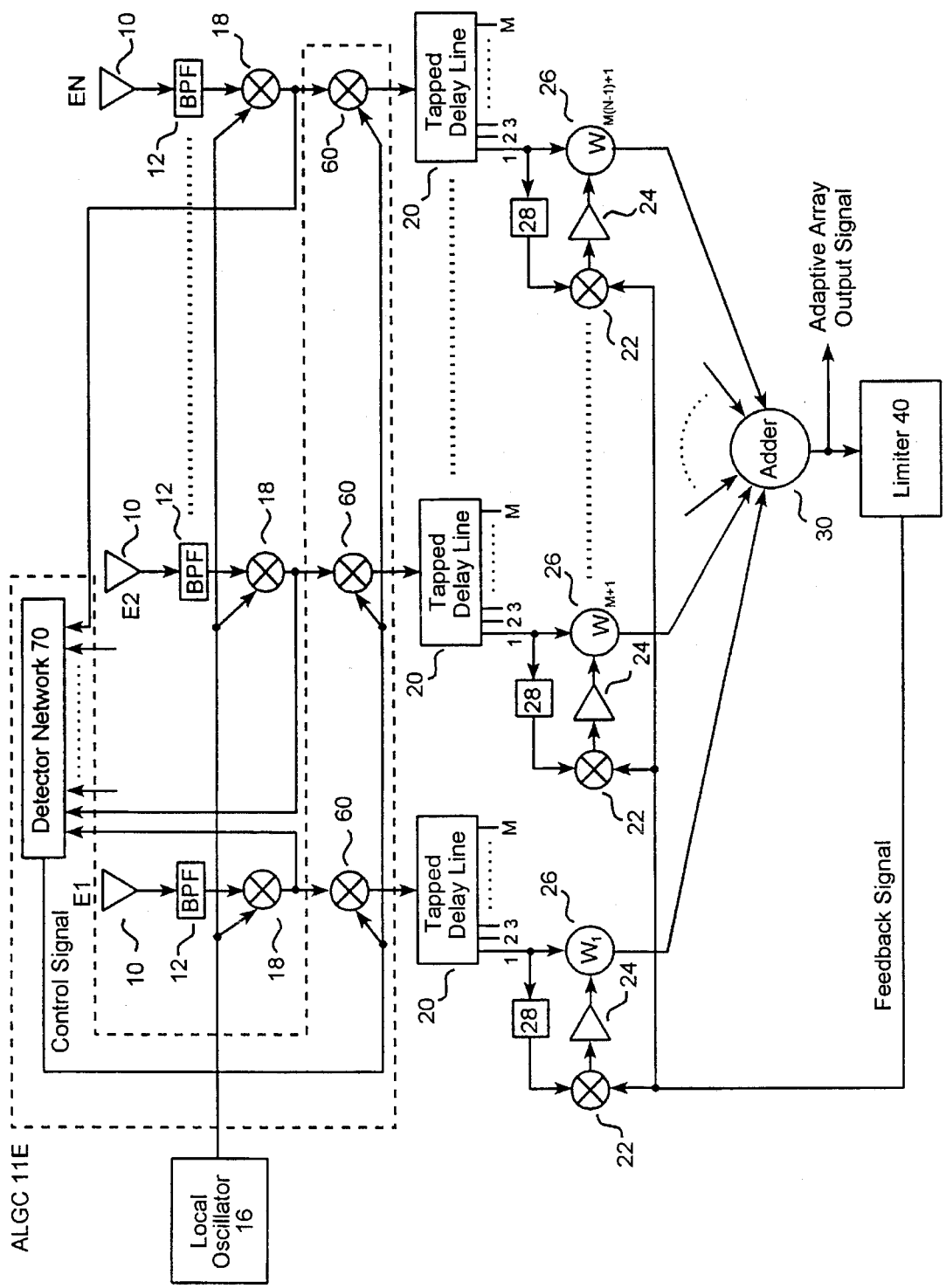
FIG. 11 is a block diagram of an embodiment of the present invention with a gain control located at the input terminal of each tapped delay line and the inputs to the detector network coupled to the input terminals of the gain controls.
Figure 12:
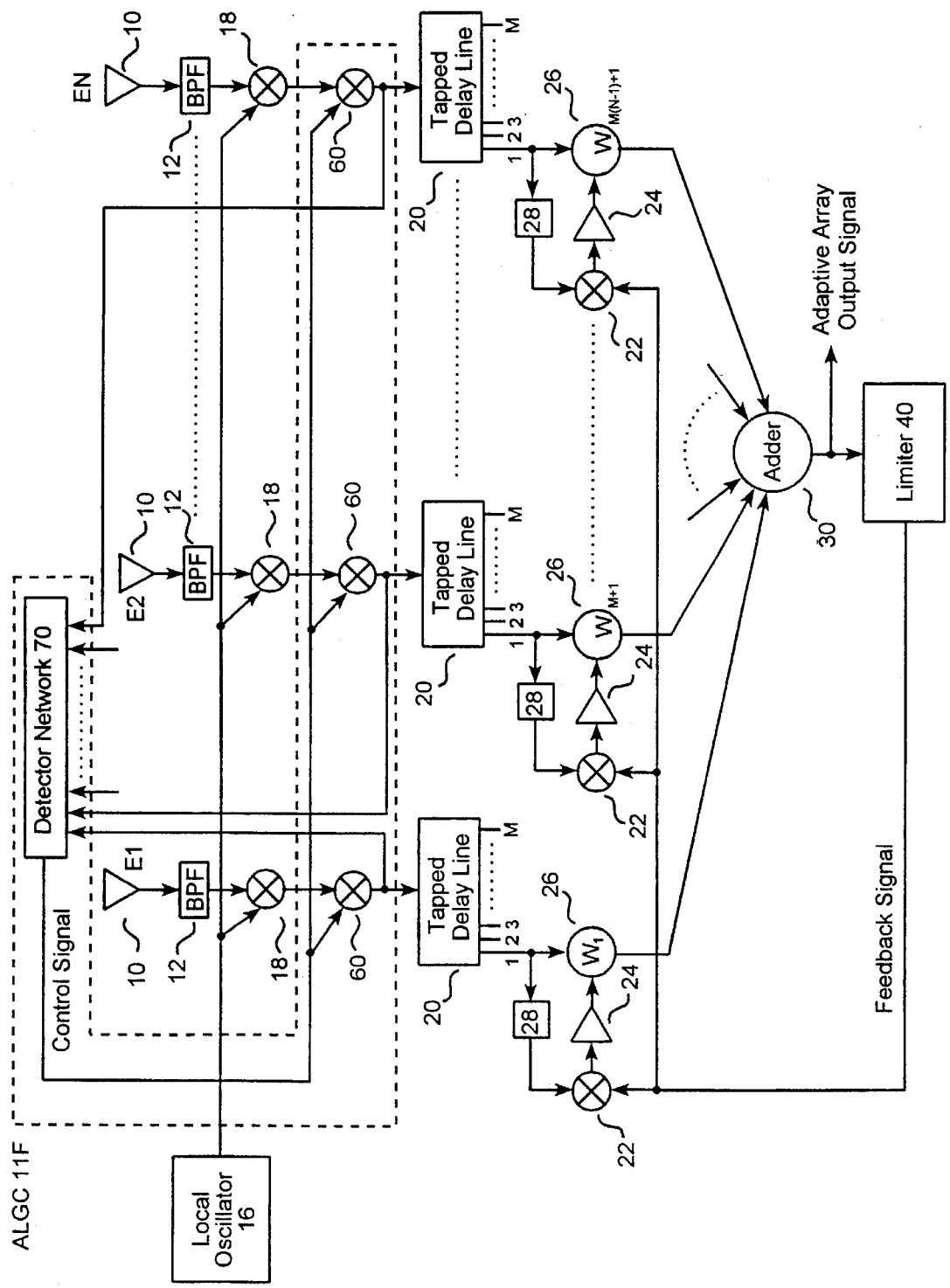
FIG. 12 is a block diagram of an embodiment of the present invention with a gain control located at the input terminal of each tapped delay line and the inputs to the detector network coupled to the output terminals of the gain controls.
Figure 13:
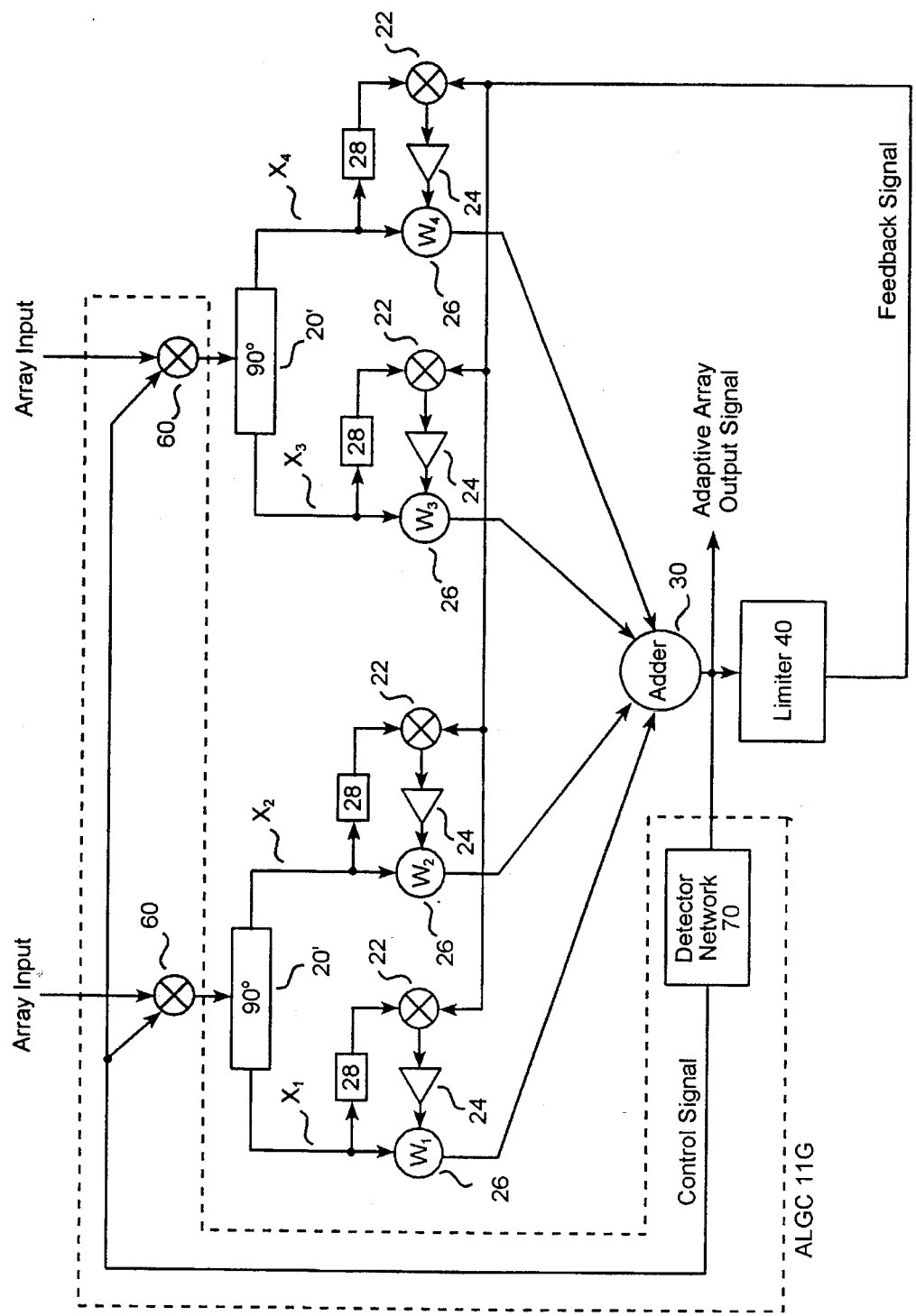
FIG. 13 is a block diagram of an embodiment of the present invention with a gain control located at the input terminal of each ninety degree phase shifter and the input to the detector network coupled to the output terminal of the adder.

The ALGC consists of detector network 70 (to be discussed below) which generates a control signal which is representative of the input signal level of the adaptive array and gain control(s) 60 which controls the gain of the adaptive loops. FIGS. 6–8, 10, 14, and 15 (to be discussed below) show ALGC implementations that provide direct control of the adaptive loop gain with the gain control(s) 60 located in the adaptive loops. FIGS. 11–13 show AGLC implementations that provide indirect control of the adaptive loop gain with the gain controls 60 located in the input signal paths of the adaptive array.

Figure 6:
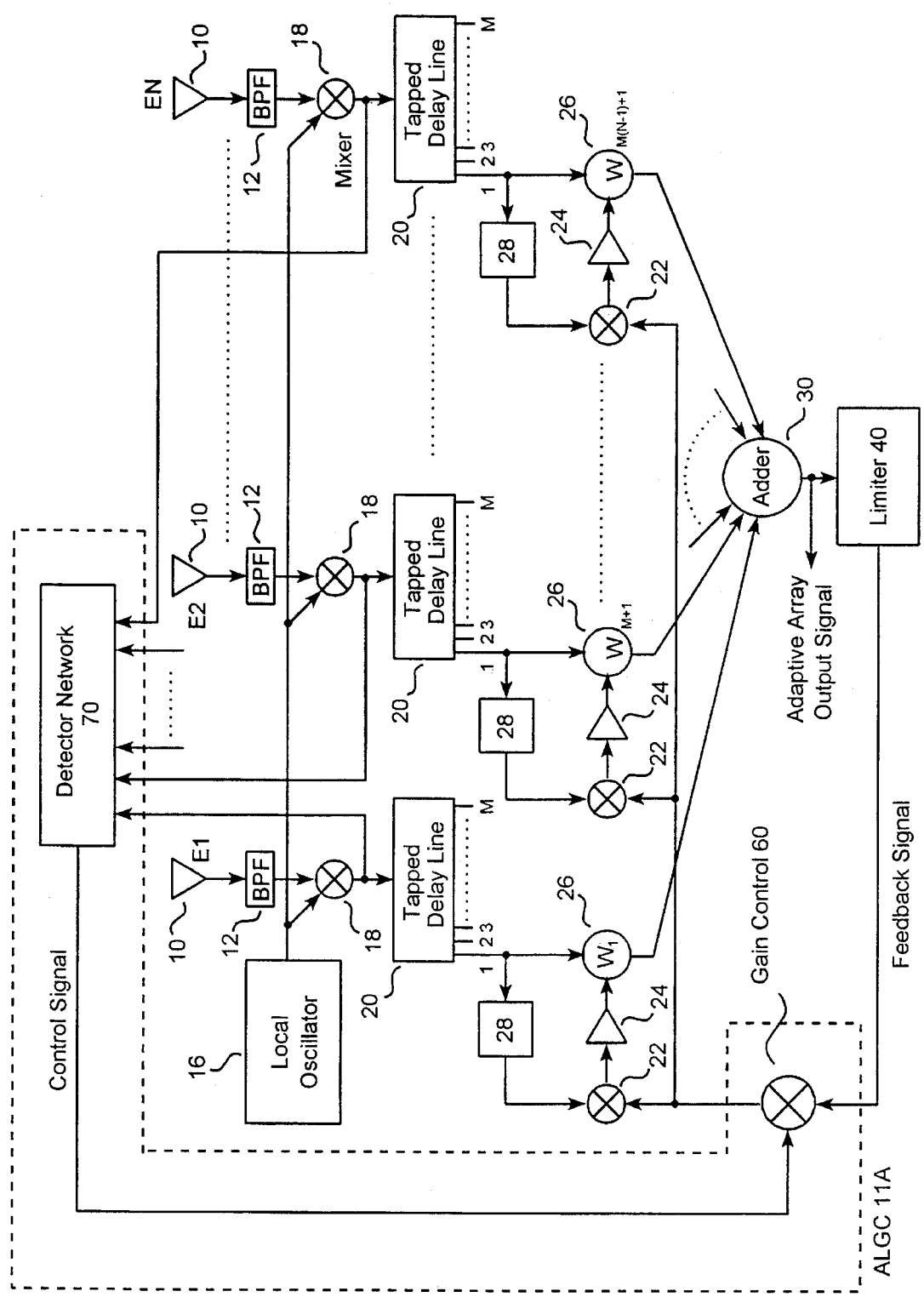
FIG. 6 is a block diagram of an embodiment of the present invention with a gain control common to all the adaptive loops located in the feedback signal path and the inputs to the detector network coupled to the output terminals of the mixers.

FIG. 6 shows a first embodiment of the present invention. Here, ALGC 11A consists of a gain control 60 and a detector network 70. Gain control 60 is located in the common feedback signal path and is shared by all the adaptive loops providing direct control of the gain of all the adaptive loops. The number of adaptive loops in the adaptive array is equal to the product of N times M (N input elements En and M tapped delay line 20 output signals). The input signals to the adaptive array in FIG. 6 are developed by appropriate input devices such as antenna elements 10, bandpass filters 12, and mixers 18. The output terminal of each antenna element 10 is coupled to the input terminal of the corresponding bandpass filter 12, and the output terminal of bandpass filter 12, in turn, is coupled to the first input terminal of the corresponding mixer 18. The second input terminal to each mixer 18 is coupled to the output terminal of a shared local oscillator 16. Thus, mixers 18 convert the input signals to phase coherent signals at an appropriate IF frequency. The output terminal of each respective mixer 18 in turn is coupled to the input terminal of the corresponding tapped delay line 20 and to the corresponding input terminal of detector network 70 of ALGC 11A. The output terminal of detector network 70 provides the control signal coupled to the control signal input terminal of gain control 60. For purposes of the present invention, gain control 60 (discussed below) has two input terminals, the first input terminal is for the signal being controlled, and the second input terminal is for the control signal from the detector network 70 (discussed below) to determine the gain of the gain control 60.

In FIG. 6, each of the M output terminals of each tapped delay line 20 are coupled to the input terminal of the corresponding amplitude limiter 28 and the first input terminal of the corresponding weight 26 for each adaptive loop (i.e. one adaptive loop and limiter 28 for each output terminal of tapped delay fine 20). The output terminal of each amplitude limiter 28, in turn, is coupled to the first input terminal of the corresponding multiplier 22. The output terminal of each multiplier 22 is coupled to the input terminal of the corresponding integrator 24. The output terminal of each integrator 24 is coupled to the second input terminal of the corresponding weight 26. The output terminal of each weight 26 is coupled to a corresponding input terminal of adder 30. The output terminal of adder 30 is coupled to the input terminal of limiter 40 and also provides the adaptive array output signal. Unless limiter 28 or 40 is implemented so that the harmonics in its output signal are low level, the product of the harmonics can form a term that does not average to zero in the integrator circuit, resulting in an inaccurate product. A filter to remove the harmonics can be applied to the output signal of either limiter 40 or limiters 28, if required. The output terminal of limiter 40, in turn, is coupled to the first input terminal of gain control 60, where gain control 60 is implemented appropriately for the ALGC implementation, which is discussed below. The output terminal of gain control 60 is the feedback signal and is coupled to the second input terminal of each multiplier 22.

As the input signal level of the adaptive array in FIG. 6 increases, the signal level at the input terminal of limiter 40 and the input terminals of detector network 70 increases, which in turn causes, respectively, a decrease in the gain of limiter 40 and an appropriate change in the level of the output signal of detector network 70. The decrease in gain of limiter 40 in turn decreases the gain of all the adaptive loops because all adaptive loops share limiter 40 as a component. The level of the output control signal of the detector network 70 in turn changes to increase the gain of gain control 60, which in turn increases the gain of all the loops because gain control 60 is a shared component. How the level of the output signal of detector network 70 changes depends on the specific implementation of the detector network 70 and gain control 60 combination, which is discussed below. The increase in the overall loop gain caused by gain control 60 offsets, at least in part, the decrease in the loop gain caused by limiter 40. Since the ALGC 11A has compensated for the change in loop gain when the input signal level of the adaptive array has changed, the degradation of performance previously caused by the change in loop gain in the prior art adaptive array has been reduced, improving the performance of the adaptive array in multipath and interference signal environments.

One of the advantages of ALGC 11A of FIG. 6, is that it requires only one gain control 60 to change the individual gains of all the adaptive loops of the adaptive array, because gain control 60 is located in the common feedback signal path and is shared by all the adaptive loops. As a result, the gain of all the loops is changed by the same amount. In this implementation, the input signals to detector network 70 alternatively could have been the RF signals from bandpass filters 12. As discussed below, detector network 70 requires only one input signal to estimate the adaptive array input signal. However, using N input signals gives a better estimate. The larger the number of input signals used, the better the estimate.

In U.S. Pat. No. 4,797,950 by Rilling, an adaptive array similar to the adaptive array in FIG. 2 is presented, except that limiters 28 are removed and replaced by direct connections between each output terminal of the tapped delay line 20 to the first input terminal of corresponding multiplier 22, and the equation for the "i"th weight is given as $$W_i(t)=Wo_i-2k \int X_i(t)\epsilon(t)dt \qquad eq(1)$$

where the output signal of the amplitude limiter in the feedback signal path generates the feedback signal $\epsilon(t)$ and is $$\epsilon(t)=Y(t)/|Y(t)| \qquad eq(2)$$

and where t=time $W_i(t)$=the weight of the "i"th adaptive loop $Wo_i$=integration constant of the "i" weight k=gain constant (traditional)

$X_i(t)$=input signal of the "i" adaptive loop and input to multiplier 22

Y(t)=adaptive array output signal

|Y(t)|=envelope of Y(t)

The digital form of equations (1) is given as $$W_i(n+1)=W_i(n)-2k\, X_i(n)\epsilon(n) \qquad eq(3)$$

where n=is the "n"th time sample $W_i(n)$=the weight of the "i"th loop $X_i(n)$=input signal of the "i" loop $\epsilon(n)$=feedback signal In digital form equation (2) becomes $$\epsilon(n)=Y(n)/|Y(n)| \qquad eq(4)$$

where

Y(n)=adaptive array output signal

|Y(n)|=envelope of Y(n)

Limiter 28 in FIG. 2 can be represented by an equation similar to equation (2) and is $$S_i(t)=X_i(t)/|X_i(t)| \qquad eq(5)$$

where $|X_i(t)|$=the envelope of $X_i(t)$ $S_i(t)$ is the input signal to multiplier 22 for the "i"th adaptive loop. Using equation (1), the equation defining the "i"th weight for the prior art adaptive array in FIG. 2 is $$W_i(t)=Wo_i-2k\int\{X_i(t)/|X_i(t)|\}\epsilon(t)dt \qquad eq(6)$$

The equation for the "i"th weight for the embodiment of the present invention shown in FIG. 6 is similar to the prior art adaptive array shown in FIG. 2 except that the magnitude of the feedback signal $\epsilon(t)$ is changed by the gain of gain control 60. Letting D(t) represent multiplicative factor representing the gain of gain control 60, the feedback signal becomes $$\epsilon(t)=D(t)\{Y(t)/|Y(t)|\} \qquad eq(7)$$

where D(t) is determined by the control signal from detector network 70 and gain control 60. Then, substituting equation (7) into equation (6), the equation defining the "i"th weight of the adaptive array in FIG. 6 is $$W_i(t)=Wo_i-2k\int D(t)\{X_i(t)/|X_i(t)|\}\{Y(t)/|Y(t)|\}dt \qquad eq(8)$$

By equation (3) and analogy to equation (4), the digital implementation of equation (8) is $$W_i(n+1)=W_i(n)-2kD(n)\{X_i(n)/|X_i(n)|\}\{Y(n)/|Y(n)|\} \qquad eq(9)$$

Figure 7:
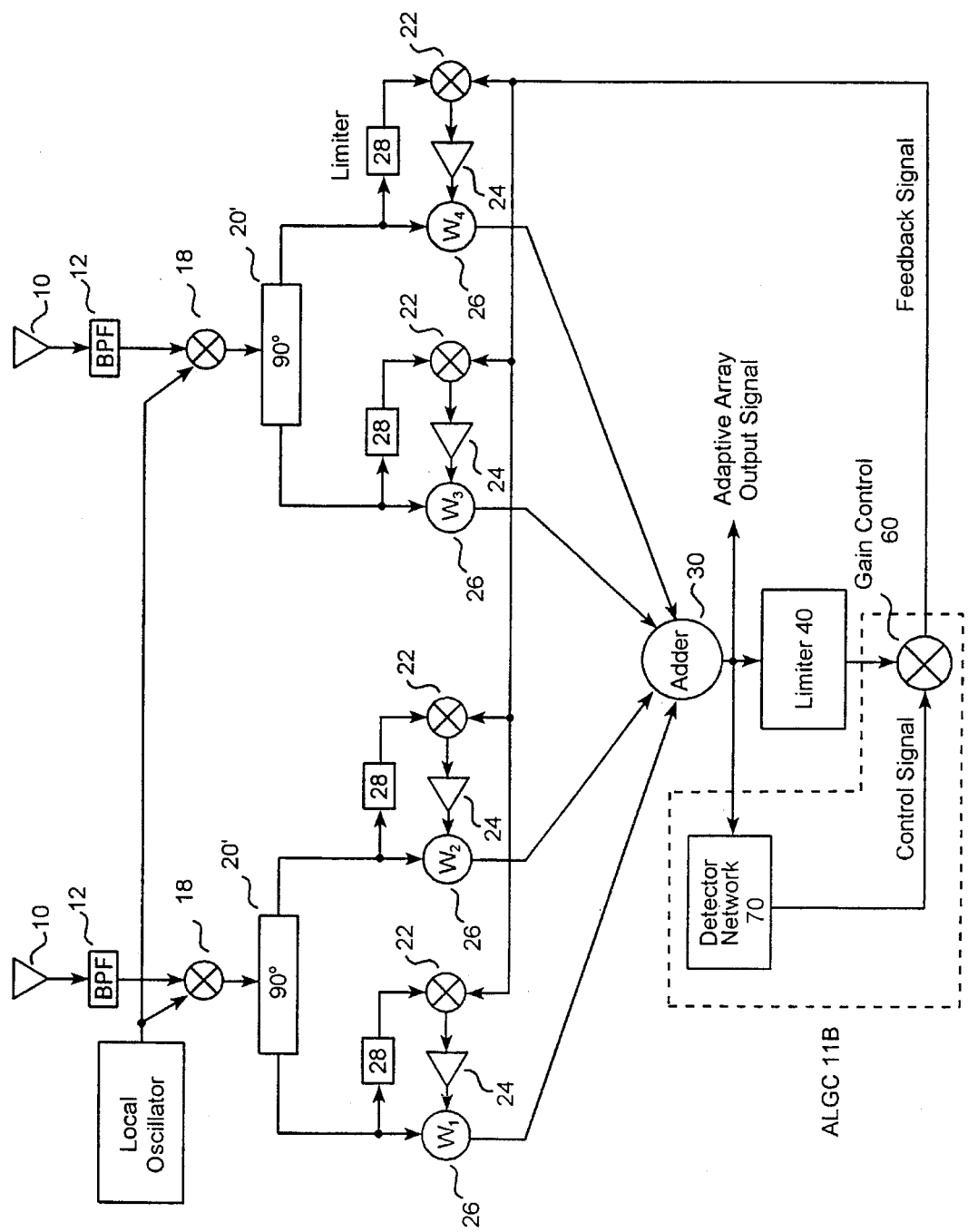
FIG. 7 is a block diagram of an embodiment of the present invention with the gain control common to all the adaptive loops located in the feedback signal path and the input to detector network coupled to the output terminal of the adder.
Figure 8:
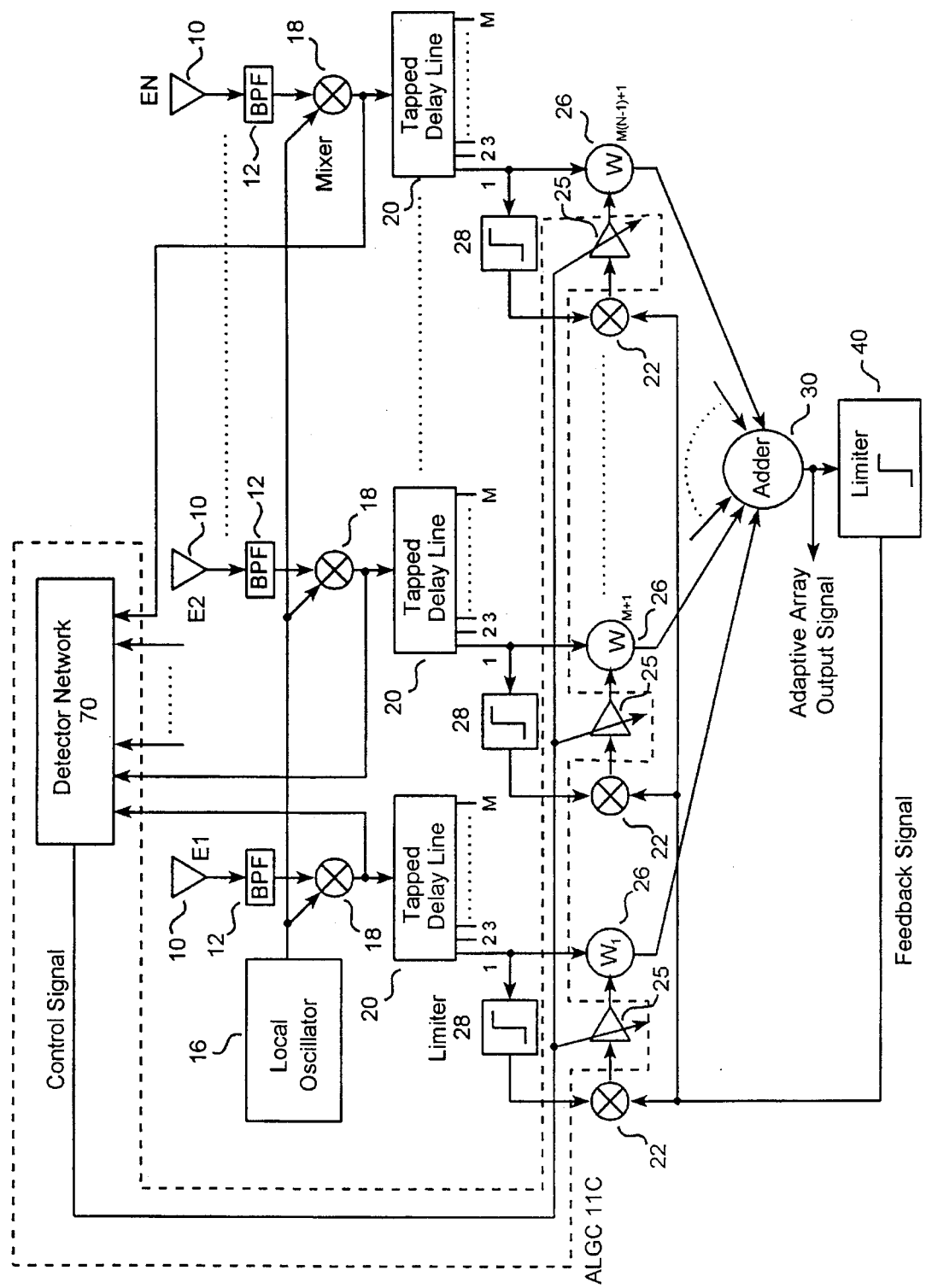
FIG. 8 is a block diagram of an embodiment of the present invention with a variable gain integrator network located in each adaptive loop and the inputs to the detector network coupled to the output terminals of the bandpass filters.
Figure 10:
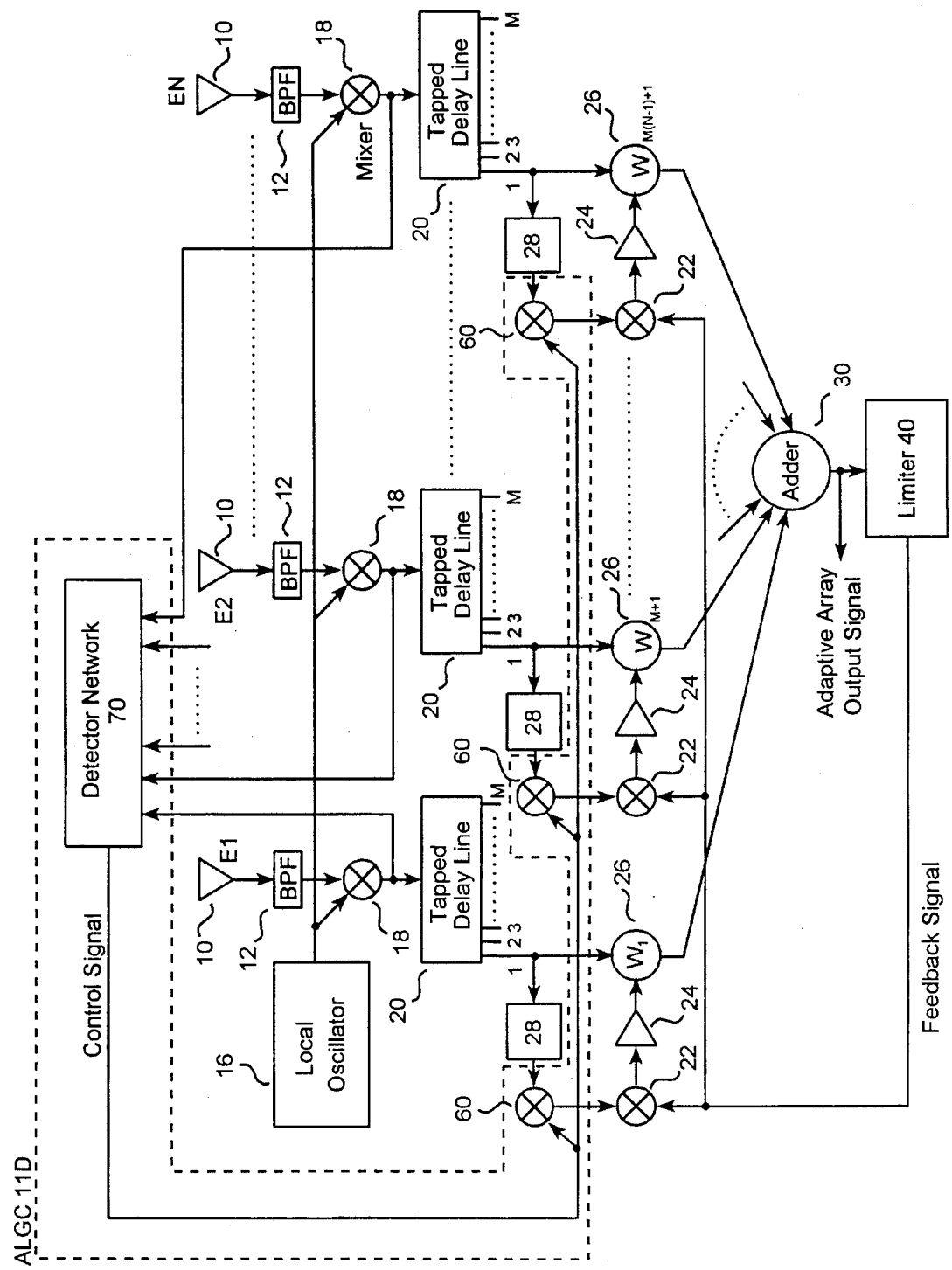
FIG. 10 is a block diagram of an embodiment of the present invention with a gain control located in the input path of each multiplier for each adaptive loop and the inputs to the detector network coupled to the output terminals of the mixers.

The implementation of equation (8) can be realized in other forms beside FIG. 6, such as given in FIGS. 7, 8, and 10. The equations defining the weights of the adaptive arrays of all the other embodiments of the present invention given below in both analog and digital form can be obtained in a similar manner.

FIG. 7, which is also based on equation (8), shows another embodiment of present invention with the input element combination (i.e antenna element 10, bandpass filter 12, and mixer 18) each feeding two adaptive loops, where only two input element combinations are shown here. The implementation of the adaptive array in FIG. 7 is identical to the implementation in FIG. 6, except each mixer 18 is feeding a 90 degree phase shifter 20' instead of tapped delay line 20. Additionally, each 90-degree phase shifter 20' has two output signals, one a signal in phase with the signal from the mixer 18 and the other phase shifted by ninety degrees. Here, however, the single input terminal detector network 70 is coupled to the output terminal of adder 30. Each of the output terminals of each ninety degree phase shifter 20' is coupled to the input terminal of the corresponding amplitude limiter 28 and the first input terminal of the corresponding weight 26 for each adaptive loop (i.e. one adaptive loop and limiter 28 for each output terminal of ninety degree phase shifter 20'). The output terminal of each amplitude limiter 28, in turn, is coupled to the first input terminal of the corresponding multiplier 22. The output terminal of each multiplier 22 is coupled to the input terminal of the corresponding integrator 24. The output terminal of each integrator 24 is coupled to a second input terminal of the corresponding weight 26. The output terminal of each weight 26 is coupled to a corresponding input terminal of adder 30. The output terminal of adder 30 is coupled to the input terminal of limiter 40. The output terminal of adder 30 also provides the adaptive array output signal. The output terminal of limiter 40, in turn, is coupled to the first input terminal of gain control 60, where gain control 60 is implemented appropriately for the ALGC implementation, as is discussed below. Gain control 60 is in the same location as in the embodiment of FIG. 6. The output terminal of gain control 60 is the feedback signal and is coupled to the second input terminal of each multiplier 22. The output terminal of detector network 70 is coupled to the control signal input terminal of gain control 60.

The array output signal provides a representation of the input signal level of the adaptive array over much of the dynamic range of the adaptive array. The adaptive array and ALGC 11B in FIG. 7 function in a manner similar to the adaptive array and AGLC 11A in FIG. 6.

The adaptive array in FIG. 7 can include N antenna elements and can have tapped delay lines 20 with M output terminals instead of the ninety degree phase shifter 20', just as in FIG. 6. Ninety degree phase shifter 20' can be implemented in many ways, including a two terminal delay line with a delay equivalent to 90 degrees and a 90 degree hybrid. For purposes of the present invention, use of the term tapped delay line includes the ninety degree phase shifter 20' and other phase shifting configurations unless the context indicates otherwise.

FIG. 8 shows yet another embodiment of present invention based on equation (8) except that gain control 60 is not in the common feedback signal path, as in FIG. 6. Here, gain control is achieved by replacing integrators 24 of FIG. 6 with variable gain integrator networks 25, with its operation discussed below. A variable gain integrator network 25 is located in each adaptive loop and provides the gain control for that loop. The output terminal of each multiplier 22 is coupled to the first input terminal of the corresponding variable gain integrator network 25. The input terminals of detector network 70 are shown coupled to the input terminals of the corresponding mixers 18, which is different from FIG. 6 which is coupled to the output terminals of mixers 18. As in FIG. 6, the input terminals of the detector network 70 could alternatively be coupled to the output terminals of mixers 18. The control signal output terminal of detector network 70 is coupled to the second input terminal of each variable gain integrator network 25. The output terminal of each variable gain integrator network 25 is coupled to the second input terminal of the corresponding weight 26. The adaptive array and ALGC 11C in FIG. 8 functions in a manner similar to the adaptive array and AGLC 11A in FIG. 6 with the gain of each adaptive loop adjusted by its corresponding variable gain integrator network 25 instead of common loop gain control 60.

Figure 9:
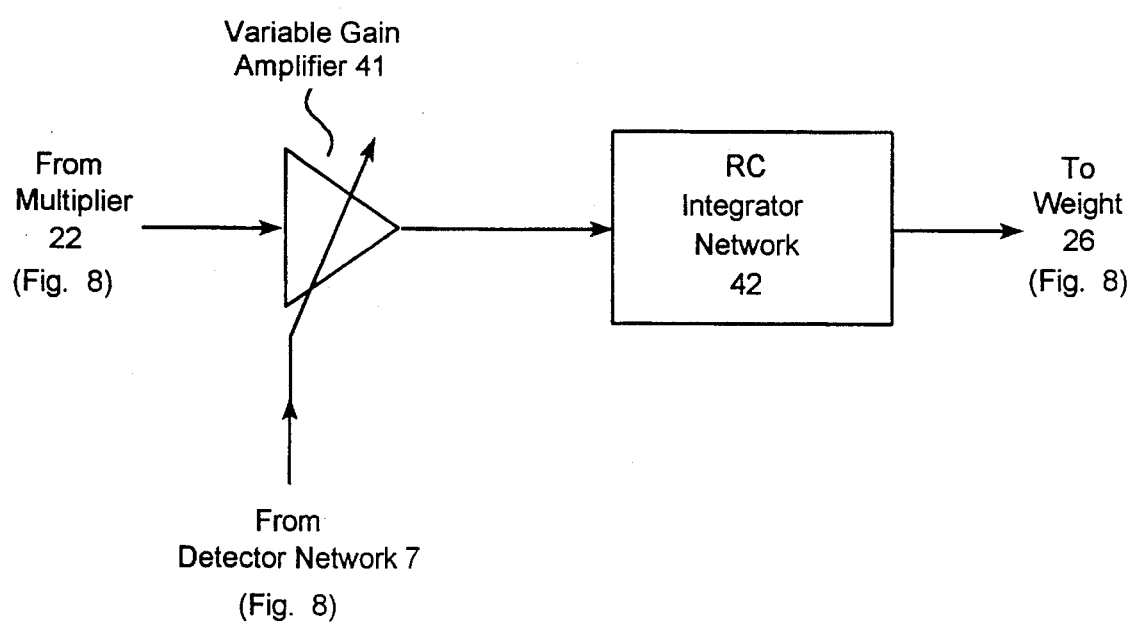
FIG. 9 is a block diagram of a variable gain integrator network implementation.

FIG. 9 shows a variable gain integrator network 25 which is part of the embodiment of the present invention shown in FIG. 8. Variable gain integrator network 25 is an integrator with variable gain and includes an integrator and a variable gain device (amplifier, attenuator, etc.) or a variable gain integrator. The integrator can be implemented by any method which includes, but is not restricted to, an RC integration circuit or an operational amplifier integration circuit. FIG. 9 shows a possible RC integrator implementation, where the output terminal from the multiplier 22 is coupled to the input terminal of variable gain amplifier 41, which is the first input terminal of the variable gain integrator network 25. The output terminal of variable gain amplifier 41 is coupled to the input terminal of RC integrator network 42. The output terminal of RC integrator network 42 is coupled to the second input terminal of weight 26 in FIG. 8. The control signal input terminal of variable gain amplifier 41, which is also the second input terminal of the variable gain integrator network 25 in FIG. 8, is coupled to the output terminal of detector network 70 of FIG. 8, and controls the gain of the variable amplifier 41, and thus, the variable gain integrator network 25. As the control signal from detector network 70 increases, the gain of variable gain amplifier 41 increases, which in turn increases the gain of the variable gain integrator network 25.

FIG. 10 shows still another embodiment of present invention based on equation (8) that is similar to the first embodiment shown in FIG. 6, except gain control 60 has been removed from the common feedback signal path and an individual gain control 60 placed in the signal path of the first input terminal of each multiplier 22, where the output terminal of each limiter 28 is coupled to the first input terminal of the corresponding gain control 60 and the output terminal of network detector 70 is coupled to the control signal input terminal of each gain control 60. The adaptive array and ALGC 11D in FIG. 10 function in a manner similar to the adaptive array and AGLC 11A in FIG. 6 with the gain of each adaptive loop adjusted by its corresponding gain control 60.

FIG. 11 shows a fifth embodiment of the present invention that is also similar to the embodiment of FIG. 6 with gain control 60 removed from the common feedback signal path, and gain controls 60 placed in the signal path of each mixer 18 and the corresponding tapped delay line 20

As the input signal level of the adaptive array of FIG. 11 increases, the control signal at the output terminal of detector network 70 changes to decrease the gain of gain controls 60 and compensate for, at least in part, the increase in the input signal level of the adaptive array. This prevents, at least in part, an increase in the signal level of the input terminal of each tapped delay line 20, and consequently, at the input terminal of limiter 40. And, in turn, this prevents, at least in part, the decrease in loop gain which would degrade the adaptive array performance. As is discussed below, the control signal from the output terminal of detector network 70 is lowpass filtered (averaged), resulting in a signal with a narrow bandwidth, so that gain controls 60 respond only to the average change in the input signal level of the adaptive array. In this way the amplitude fluctuations caused by multipath or interference in the input signals to the adaptive array are preserved and passed through the gain controls 60 to the input terminal of the corresponding tapped delay lines 20. Since the control signal output terminal of detector network 70 is coupled to each gain control 60, all gain controls 60 change gain the same amount, and as a result, the relative differences in signal level from input element to input element is preserved.

In FIG. 11, the input signal to the "i"th adaptive loop is $$X'_i(t)=X_i(t)D'(t) \qquad eq(10)$$

where

Xi(t)=input signal of the "i"th adaptive loop

D'(t)=multiplicative gain factor of gain control 60

Using equations (1) and (2), the equation for the "i"th weight becomes $$W_i(t)=W_{0i}-2k\int\{X'_i(t)/|X'_i(t)|\}\{Y(t)/|Y(t)|\}dt \qquad eq(11)$$

As the average amplitude of $X_i(t)$ changes, ALGC E in FIG. 11 changes D'(t) in such a manner as to reduce the change in $X'_i(t)$. Ideally, $$D'_i(t)=1/<X_i(t)> \qquad eq(12)$$

where <> denotes average.

FIGS. 12 and 13 show two additional embodiments of the present invention which are also based on equation (11). Implementations of the present invention based on equation (11) include, but are not restricted to, FIGS. 11–13.

The gain controls 60 in FIG. 11 could also be located before mixers 18, in which case, the input signals of detector network 70 in FIG. 11 would still be coupled to the input signals to gain controls 60. ALGC 11E in FIG. 11 is an indirect control implementation of the present invention which functions in a feed forward manner.

FIG. 12 shows a sixth embodiment of the present invention which is similar to the embodiment of FIG. 11, except that the input signals to detector network 70 are the output signals of each corresponding gain control 60, instead of the output terminal of each corresponding mixer 18, as in FIG. 11. The embodiment of the present invention is FIG. 12 in also based on equation (11).

ALGC 11F and the adaptive array in FIG. 12 function in an manner similar to ALGC 11E and the adaptive array in FIG. 11, except that gain controls 60 and detector network 70 function in a feedback manner. The specific implementation of detector network 70 and gain control 60 in FIG. 11 and detector network 70 and gain control 60 of FIG. 12, in general, reflect the requirements of feed forward and feedback AGC implementations respectively.

FIG. 13 shows a seventh embodiment of the present invention. The embodiment in FIG. 13 is also based on equation (11) and is functionally most similar to the embodiment in FIG. 12, with the input signals of the adaptive array couple directly to the first input terminal of the corresponding gain control 60, where antenna elements 10, bandpass filters 12, mixers 18 and local oscillator 16 are not present, and tapped delay line 20 has been replaced by 90 degree phase shifter 20', which has only two output terminals. A third difference from FIG. 12 is that the detector network 70 has only one input terminal which is coupled to the output terminal of adder 30 (i.e. the array output signal). ALGC 11G and the adaptive array in FIG. 13 function in an manner similar to ALGC 11F and the adaptive array in FIG. 12. The antenna elements 10, as shown in FIG. 12, can be part of the adaptive array in FIG. 13, however, bandpass filters 12, mixers 18 and local oscillator 16 are not necessary for the proper functioning of the present invention when only the signal-of-interest and its reflected images are present in the radio signal environment and operating the adaptive array at the frequency of the transmitted radio signal is appropriate.

Figure 14:
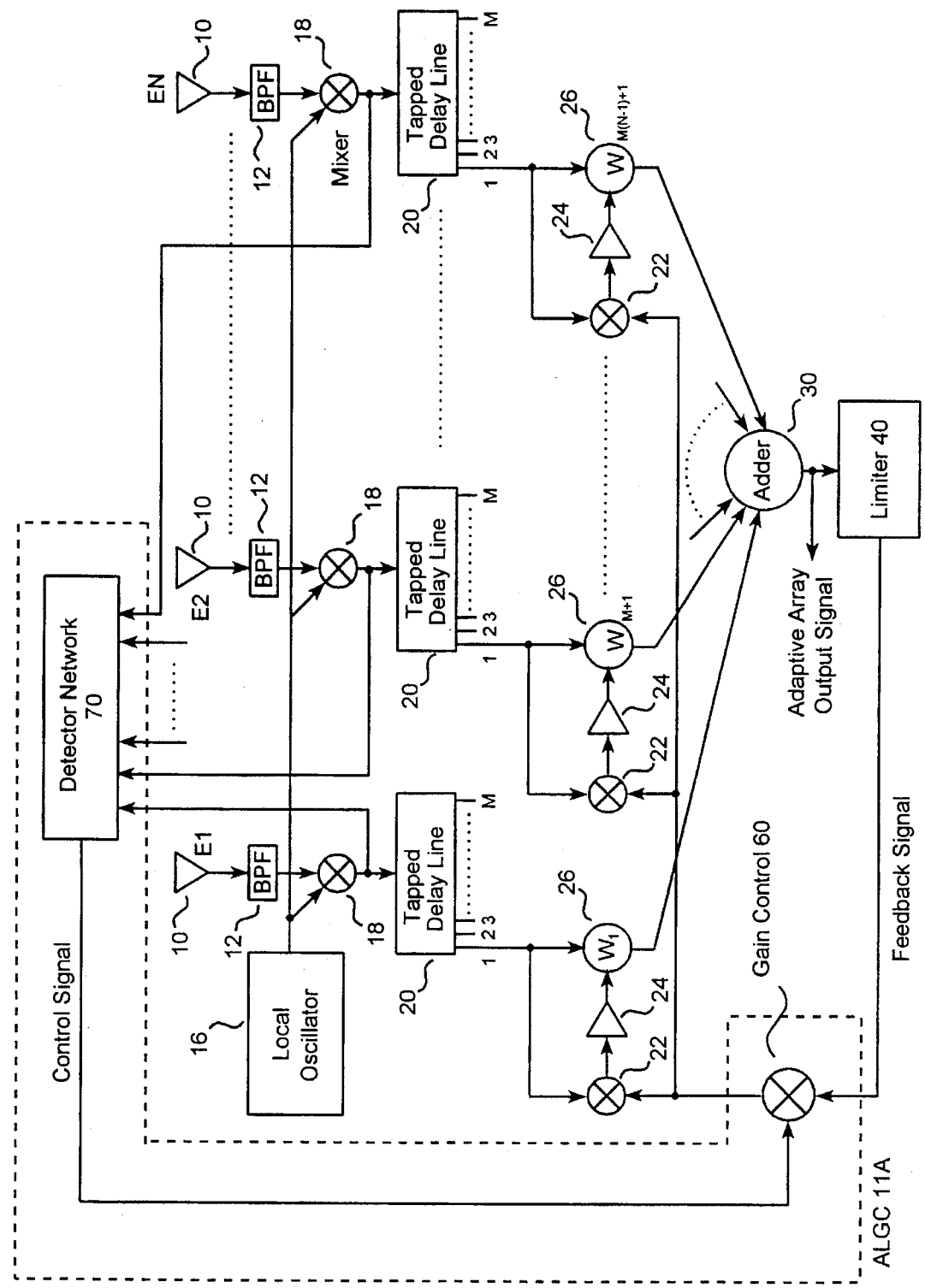
FIG. 14 is a block diagram of a limited dynamic range embodiment of the present invention with a gain control common to all the adaptive loops located in the feedback signal path, the inputs to the detector network coupled to the output terminals of the mixers, and limiters removed from the input paths of the multipliers.

In the embodiments of the present invention given above in FIGS. 6–8 and 10–13, the adaptive arrays are implemented for applications where the widest dynamic range of the input signal level is required. This was accomplished by including limiters 28 in each loop of the array, as is well known in the art, which otherwise are not necessary for the functioning of an adaptive array. In applications where reduced dynamic range is acceptable or expected, limiter 28 can be removed, since it is not otherwise needed. All of the embodiments of the present invention illustrated above that include limiter 28 are also functional embodiments of the present invention without limiter 28. It should be noted that without limiters 28, the optimal loop gain can change and the performance-loop gain relationship may require a different detector network and/or gain control. FIG. 14 is an embodiment of the present invention that does not include limiters 28. This embodiment of the present invention is identical to the first embodiment of FIG. 6 with limiters 28 replaced with a direct connection between the corresponding output terminal of tapped delay line 20 and the first input terminal of multiplier 22. When limiter 28 is removed, equation (8) becomes $$W_i(t)=W_{0i}-2k\int\{D(t)X_i(t)\{Y(t)/|Y(t)|\}dt \qquad eq(13)$$

The adaptive array and ALGC 11H of FIG. 14 function in a manner similar to the adaptive array and AGLC 11A in FIG. 6 except that the weights obey equation (13) instead of equation (8) and the dynamic range of the input signal level of the adaptive array is smaller.

All the embodiments of the present invention can be implemented as part of a receiver or as a stand alone unit. The stand alone unit would have its own bandpass filters 12, if required, and mixers 18 and local oscillator 16 for frequency down conversion, if required. The output terminal of the stand alone adaptive array can be coupled directly to the input terminal of a standard single input receiver, or if frequency down conversion is used in the input of the stand alone unit, up-converted to the received frequency and then coupled to the input of a receiver.

Figure 15:
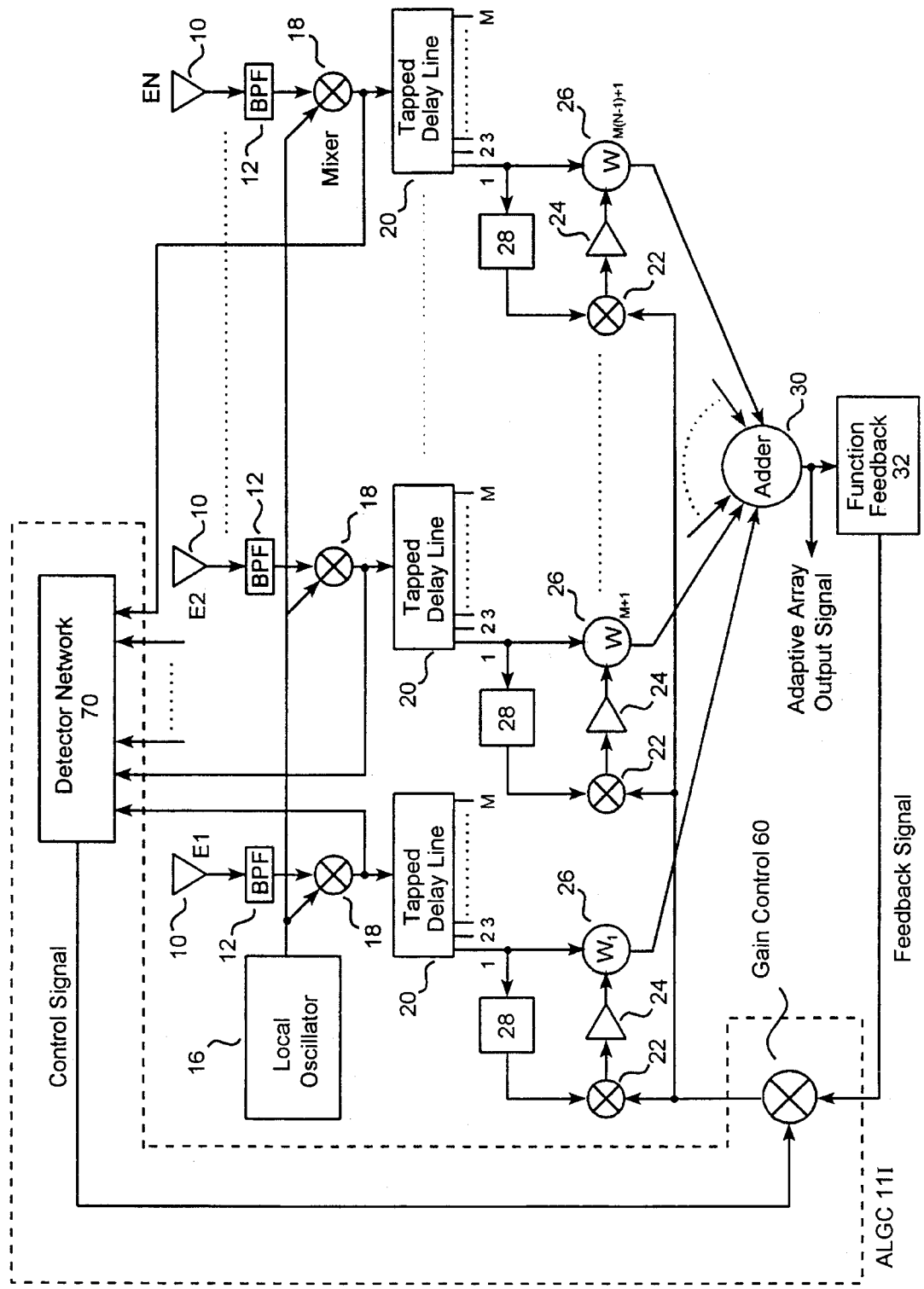
FIG. 15 is a block diagram of an embodiment of the present invention with a gain control common to all the adaptive loops located in the feedback signal path, the to the detector network coupled to the output terminals of the mixers, and the feedback function generating the feedback signal.

In each of the above described embodiments of the present invention (i.e. FIGS. 6–8 and 10–14), the adaptive array feedback signal is generated by limiter 40 from the adaptive array output signal. The feedback signal can be generated by other feedback signal generators besides limiter 40. In U.S. Pat. Nos. 4,736,460, 4,797,950 and 4,752,969 by Rilling, the CMA (constant modulus algorithm) was used to derive a class of feedback signal generators described as feedback functions. As shown in FIG. 15, limiter 40 is replaced by feedback function 32, where feedback function 32 can generate the feedback signal using the CMA class of feedback signal generators in U.S. Pat. Nos. 4,736,460, 4,797,950 and 4,752,969 by Rilling. All of the embodiments of the present invention discussed above can be alternatively implemented with limiter 40 replaced by a feedback function 32, as shown in FIG. 15 when a change in input signal level of the adaptive array cause a change in the gain of the adaptive loops and the performance of the adaptive array is degraded. These other feedback function implementations make each adaptive array operate with different performance characteristics based on the specific implementation of feedback function 32 that is used. The desirability of a specific feedback function 32 implementation depends on the adaptive array application. The adaptive array in FIG. 15 is identical to that of FIG. 6 except that limiter 40 has been replaced by feedback function 32. The performance loop-gain relationship of the adaptive array may be different for each feedback function 32, requiring a different detector network and/or gain control. The ALGC 11I and the adaptive array in FIG. 15 function in a manner similar to the ALGC 11A and the adaptive array of FIG. 6. All of the arrays of FIGS. 6–8 and 10–14 with limiter 40 replaced by all the possible implementations of feedback function 32 are also embodiments of the present invention. The equation for the weights in FIG. 15 is $$W_i(t)=Wo_i-2kD(t)\{X_i(t)/|X_i(t)|\}\epsilon'(t)dt \qquad \text{eq}(14)$$

where $\epsilon'(t)$ is the feedback signal as determined by the feedback function.

Figure 16:
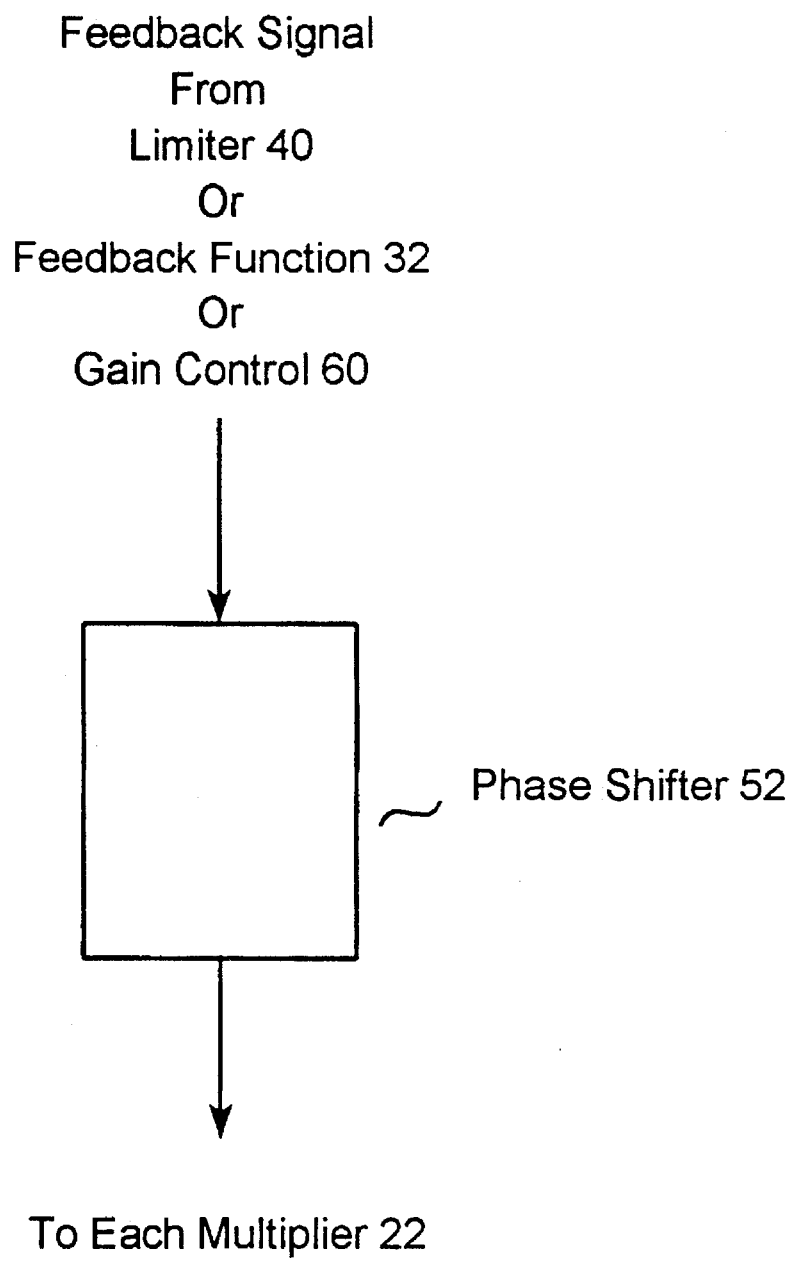
FIG. 16 is the block diagram of a phase shifter located in the feedback signal path of the adaptive array for adjusting the phase of the feedback signal.

In the prior art it is known that a phase shifter can be placed in the feedback signal path to optimize performance of the adaptive array. In FIG. 16, the output terminal of the limiter 40, feedback function 32, or gain control 60 is coupled to the input terminal of phase shifter 52, as appropriate. The output terminal of phase shifter 52 is the feedback signal and is coupled to the second input terminal of each multiplier 22. If the phase relationship of the feedback signal to the input signal of the adaptive array, such as in FIG. 6, is incorrect, the weights 26 never reach a steady state value, constantly changing in a oscillating manner which degrades the performance and, in some cases, prevents functioning of the adaptive array. The phase of the feedback signal can be set to a proper value by phase shifter 52 (FIG. 16), thereby permitting the weights 26 to reach a steady state and improve the performance of the adaptive array.

Figure 17:
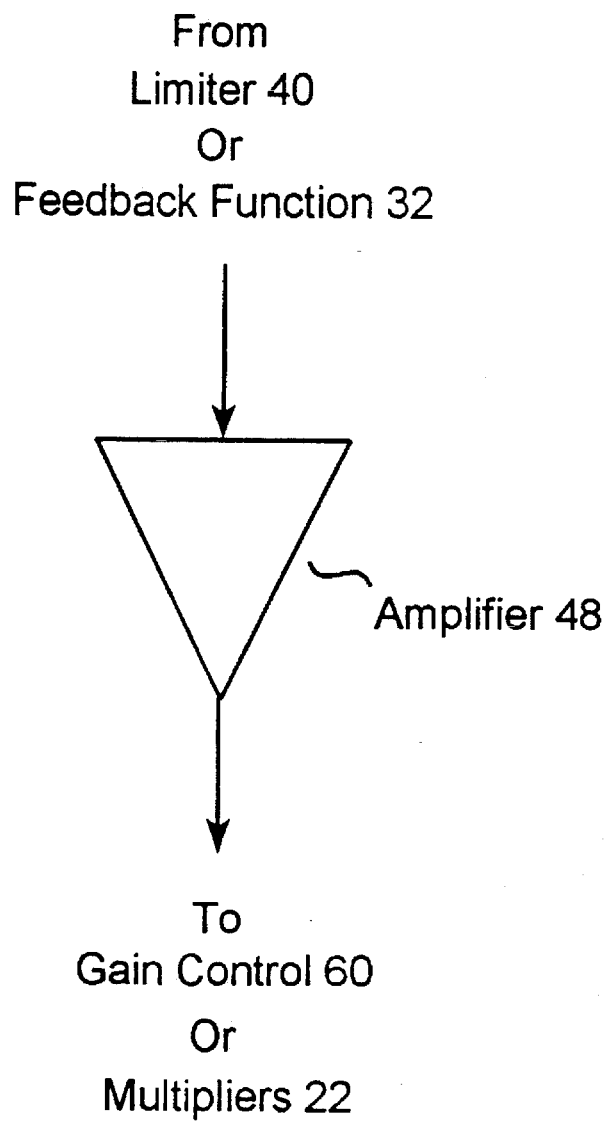
FIG. 17 is a block diagram of an amplifier located in the feedback signal path of the adaptive array.

In some adaptive array/receiver designs of the present invention (i.e. FIGS. 6–8 an 10–15), it may be useful to add an amplifier to the feedback signal path to obtain the required dynamic range of the gain of the adaptive loops to track the optimal gain value for an indirect ALGC embodiment (i.e FIGS. 11–13) or set the optimal gain value for a direct ALGC embodiment (i.e. FIGS. 6–8, 10, 14 and 15) of the present invention. FIG. 17 shows the output terminal of limiter 40 or feedback function 32 coupled to the input terminal of amplifier 48, as appropriate. The output terminal of amplifier 48 is coupled to the first input terminal of gain control 60 or the second input terminal of each multiplier 22, as appropriate, for the particular embodiment.

Figure 18:
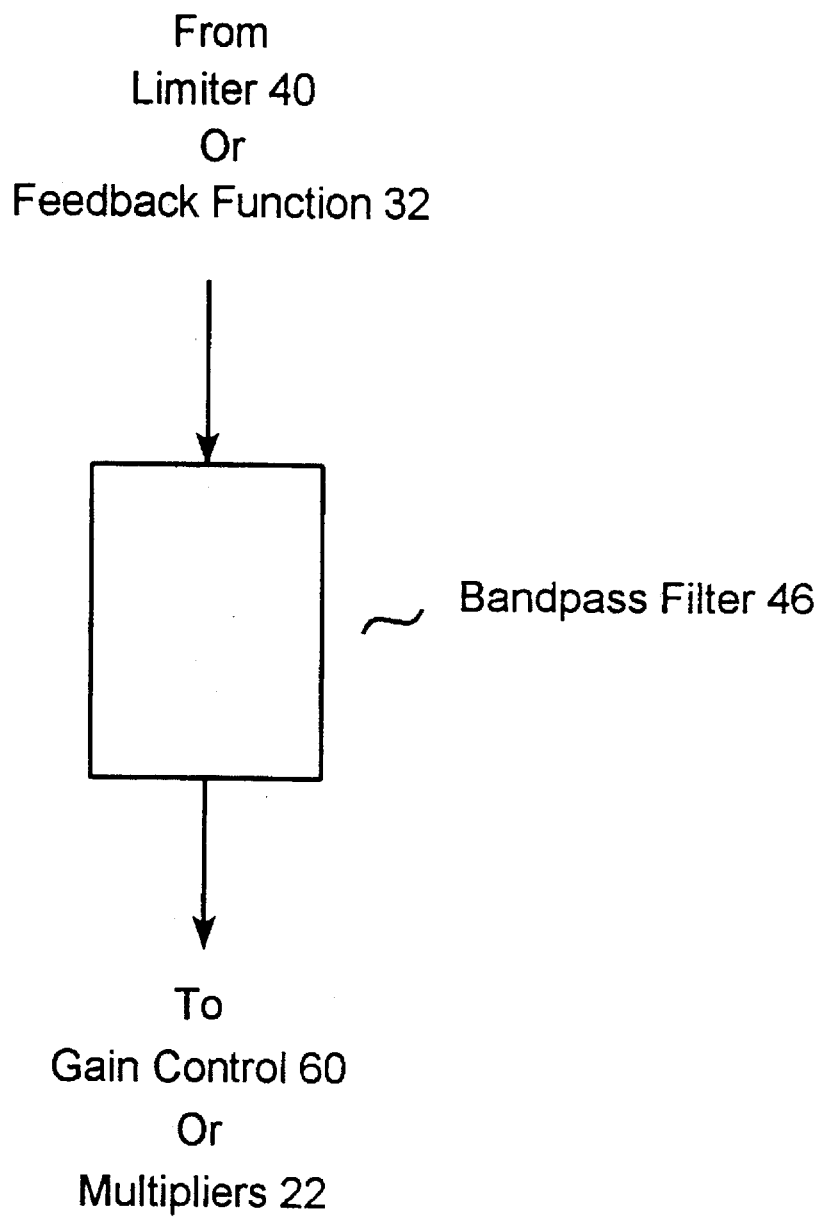
FIG. 18 is a block diagram of a bandpass filter located in the feedback signal path of the adaptive array.

Noise or a spurious signal coupled to the first input of a multiplier 22 which is correlated to noise or a spurious signal coupled to the second input of the same multiplier 22 produce a product term which does not average out in integrator 24 or integrator network 25 and results in an inaccurate multiplier product. If the noise or spurious signal is outside the bandwidth of the desired signal, a bandpass filter (lowpass filter, etc. as appropriate) can be used to reduce this effect. FIG. 18 shows the output terminal of the limiter 40 or feedback function 32 coupled to the input terminal of bandpass filter 46, as appropriate. The output terminal of bandpass filter 46 is coupled to the first input terminal of gain control 60 or the second input terminal of each multiplier 22, as appropriate for the particular embodiment.

Figure 19:
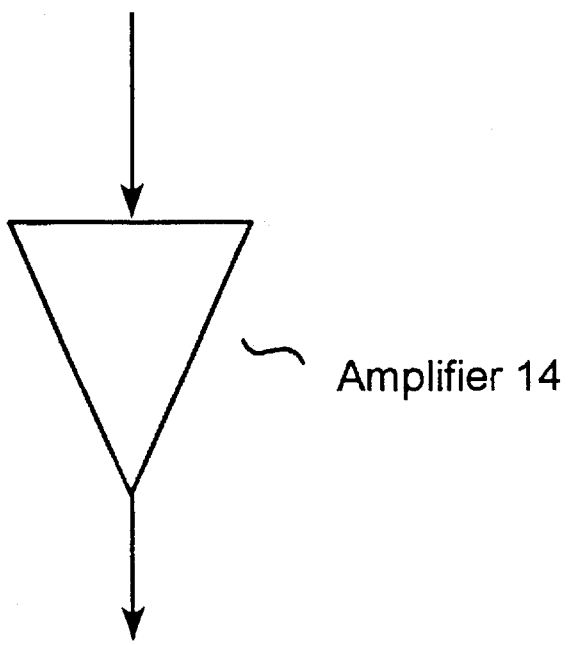
FIG. 19 is a block diagram of an amplifier located in each input signal path of the adaptive array.

Also, for some adaptive array/receiver designs of the present invention, it may be useful to add an amplifier to an input signal path of the adaptive array, at IF or RF, to augment standard receiver amplification for some embodiments of the present invention. FIG. 19 shows the output terminal of the corresponding antenna element 10, bandpass filter 12 or mixer 18 coupled to the input terminal of amplifier 14, as appropriate. The output terminal of amplifier 14 is coupled to the input terminal of the corresponding tapped delay line 20, or mixer 18, as appropriate.

The detector network 70 is capable of making an estimate of the input signal level of the adaptive array from only one input signal from the inputs of the adaptive array (specific single input implementations of detector network 70 are designated as detector 71x, where x identifies the specific implementation, and is discussed below). The detector network 70 in FIGS. 6, 8, 10, 11, 12, 14, and 15 can be implement with only one input signal from the input signals of the adaptive array. However, as the number of input signals used by detector network 70 to make the estimate increases, the estimate becomes better. When the detector network 70 uses two or more signals to make the estimate, the input signals are combined, to form a representation based on average estimate of the input signal level, as discussed below. The following is an example of a multiple input detector network, however other implementations are also possible.

Figure 20:
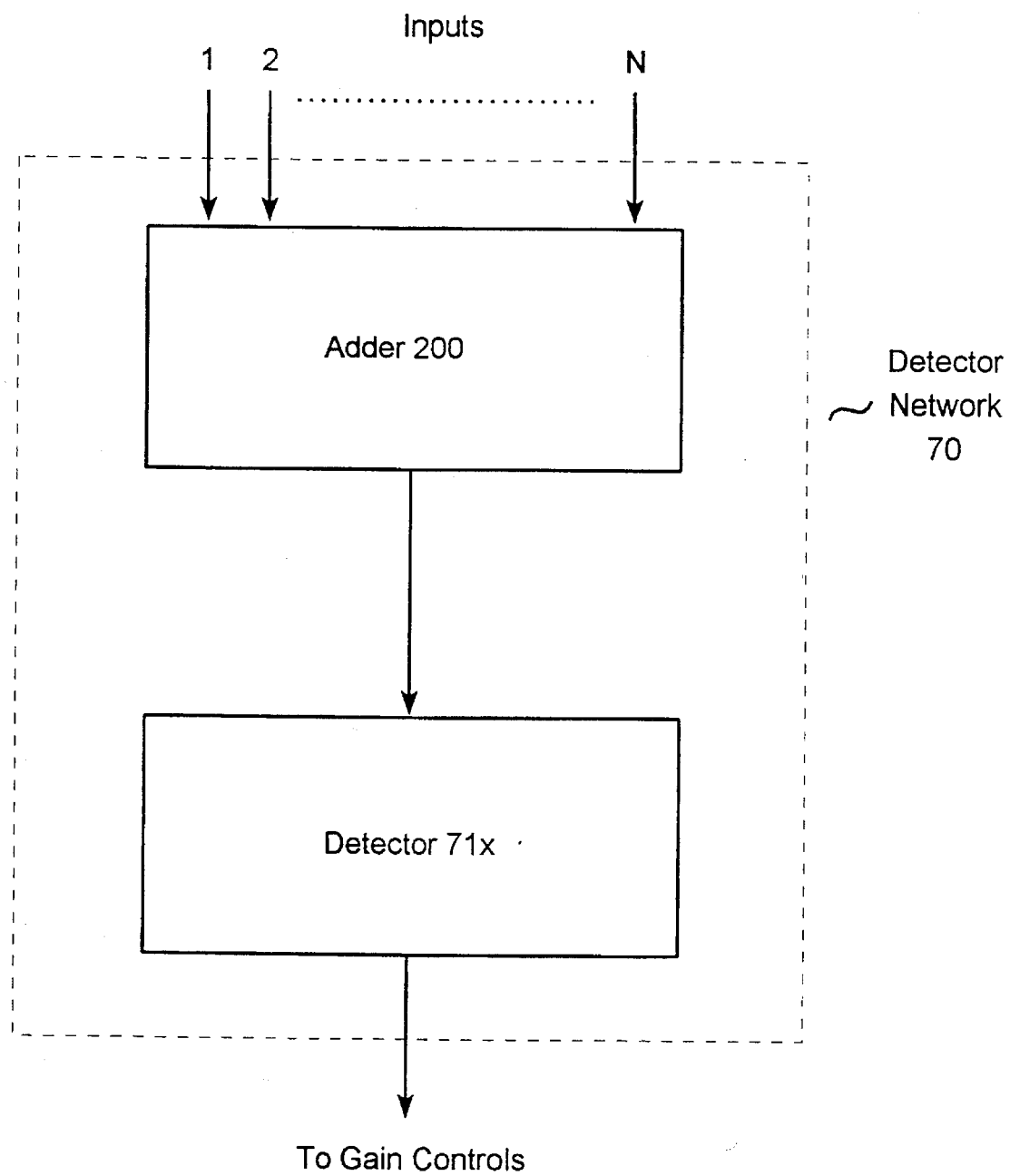
FIG. 20 is a block diagram of a N input signal detector network with a single input detector.

FIG. 20 shows a general implementation of detector network 70 for the present invention. N input signals couple to the N input terminals of adder 200, and the single output terminal of adder 200 is coupled to the single input terminal of detector 71x, where detector 71x is a specific single input terminal implementation of detector network 70 and is discussed below (x identifies the specific detector implementation). Adder 200 and detector 71x form detector network 70 with the output terminal of detector 71x being the output terminal of detector network 70.

When a specific implementation of detector network 70 has only one input terminal, detector network 70 is identified as detector 71x, where x identifies a specific implementation of detector 71. In the ALGC implementations shown in FIGS. 22–28, each detector 71x, where x=A, B, etc., is a specific implementation of detector network 70 with only one input terminal.

Figure 21:
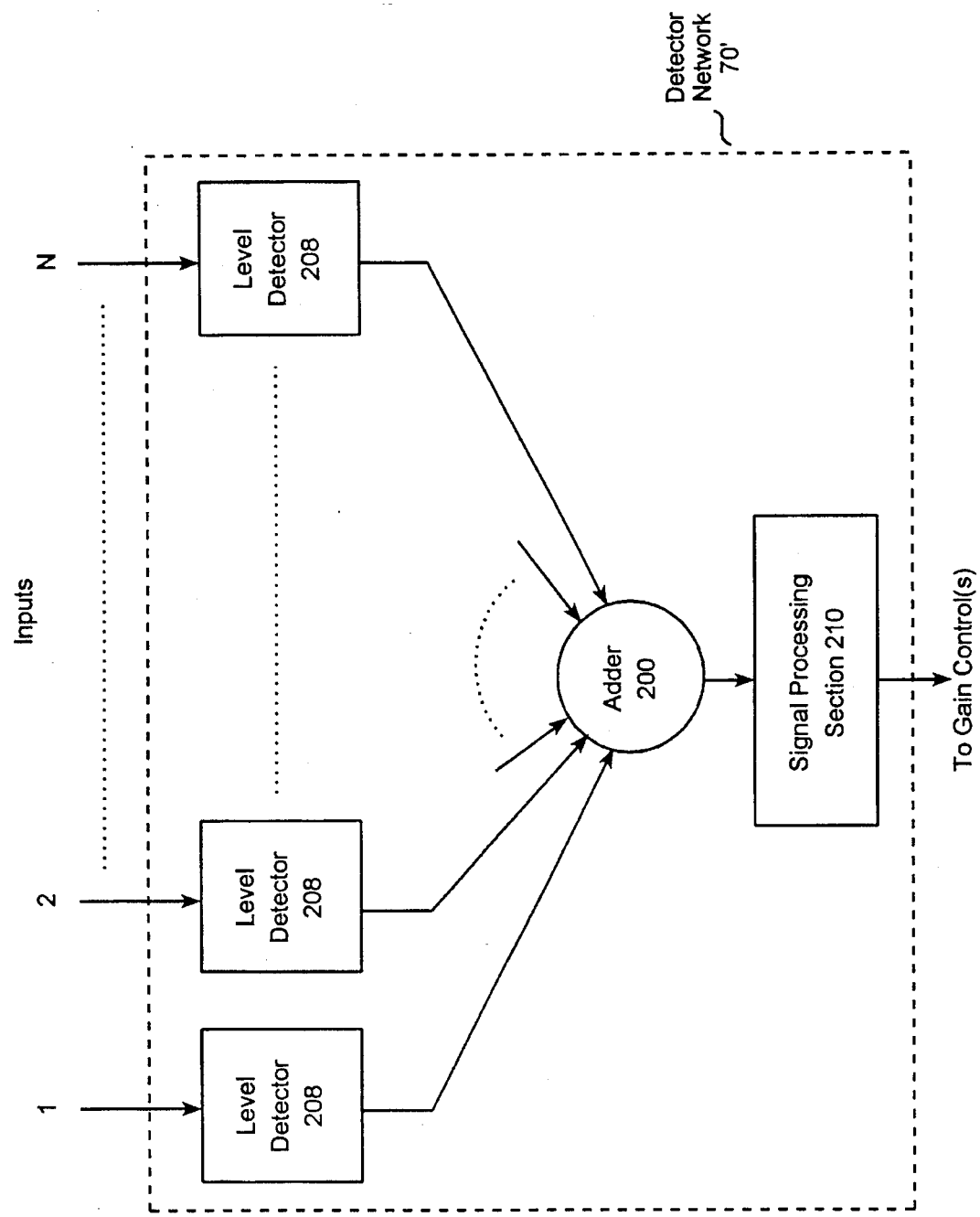
FIG. 21 is a block diagram of an N input signal detector network with N level detectors.

FIG. 21 shows another N input implementation of a detector network of the present invention for improving the estimate of the input signal level. Each input signal is coupled to the input signal terminal of a corresponding level detector 208, where level detector 208 includes, but is not restricted to, the single input level detectors and detector 71x discussed below. The output signal from each level detector 208 is coupled to a different input terminal of adder 200. The output signal of adder 200 in turn is coupled to the input terminal of signal processor section 210, where the signal processor section is discussed below. The level detectors 208, adder 200, and signal processor section 210 form a network detector 70'. The output signal of signal processor section 210 is the output signal of network detector 70'.

Each of the ALGC circuits include a detector network 70 and a gain control 60. The required relationship between the adaptive array, ALGC, detector network and gain control can be determined by test and analysis. As discussed earlier, the embodiment of the present invention in FIG. 6 was arrived at for the prior art adaptive array in FIG. 2 by test and analysis which showed that a somewhat inverse relationship exists between a change in the input signal level of the adaptive array and the change in the gain of the adaptive loop. The gain control and detector network requirements are determined as a set by the adaptive array implementation, the specific ALGC implementation, the performance-gain-input level relationship, and the application. The characteristics of the individual detector network and the gain control can be varied within these requirements.

The specific implementation of the gain control determines the functional relationship between the control signal and the gain of the gain control. The relationship can be linear or non-linear, with a positive or negative slope (i.e. variable gain amplifier, variable attenuator, multiplier, etc.), as is well known in the art.

The gain control 60 can be implemented in either analog, digital, analog/digital hybrid, etc. (i.e. digitally controlled attenuators, digitally controlled variable amplifiers, fully digital variable gain control, etc.) using circuits, DSPs, microprocessors, etc.

Each embodiment of the present invention can require a different relationship between input signal level of the adaptive array to the loop gain to keep the adaptive array at its performance peak as the input signal level of the adaptive array changes. As discussed above, deviation from the ideal performance of individual adaptive array components (i.e. multipliers, amplifiers, limiters, weights, etc.) can cause this relationship to change for a specific adaptive array and, as a result, require compensation. Additionally, the specific application of the adaptive array can also affect the relationship. The ALGC is chosen to provide the required relationship between the input signal level of the adaptive array and the gain of the adaptive loop so that the degradation of performance is reduced when the input signal level to the adaptive array changes.

To provide the proper relationship between the input signal level of the adaptive array and the gain of the adaptive loops, the detector network must provide a control signal with the proper functional relationship for the specific gain control implementation. As is discussed below, the input signal level of the adaptive array is determined by a level detector. For a specific level detector implementation and gain control implementation, additional signal processing of the level detector output signal may be necessary to provide the correct input signal level relationship for the required ALGC response. In general, the detector network includes both a level detector and a signal processor, although, as is shown below, there are some cases where the signal processor is not necessary.

The ALGC of each embodiment can be implemented in a direct control approach with the gain control in the adaptive loop, as shown in FIGS. 6–8, 10, 14, and 15, or the indirect control approach with the gain controls located in the adaptive array input signal paths, as shown in FIGS. 11–13. The relationship required between a specific detector network and gain control implementation is different for adaptive arrays with direct control ALGC and indirect control ALGC. The required functional relationships are the inverse of each other for the direct and indirect implementations. To use the same gain control and detector network (only if applicable) requires either an extra stage that implements the inverse (1/x) in the signal processor section or the use of the gain control with the opposite slope, i.e. from a positive slope variable amplifier to a negative slope variable attenuator gain control with the same functional relationship. Implementations of the present invention with the gain control located in the array input signal(s) path also require a lowpass filter with a narrow bandwidth in the signal processor section so that the amplitude fluctuations of the input signals caused by multipath and interference are passed through to the adaptive array inputs, as discussed above.

Level detectors are well known in the art and can take many forms (i.e. diode based circuits, transistor based circuits, FET based circuits, squaring circuits, RMS circuits, etc., including digital implementations). The relationship between the input and output signals of the level detector depends on the specific level detector implementation.

The signal processor section can also include a lowpass filter. The lowpass filter determines the control signal bandwidth and averages the input signal level. In some cases the level detector generates high frequency components (i.e. squaring generates a high frequency sum term, etc.), in which case the lowpass filter also removes the high frequency signal components. The lowpass filter can have various forms and its specific implementation will affect the way in which the ALGC performs, as is well known in the prior art for control systems.

The detector network 70 and gain control 60 combinations for the gain control located in the adaptive loop of the adaptive array of the present invention includes, but is not limited to, the following implementations.

Figure 22:
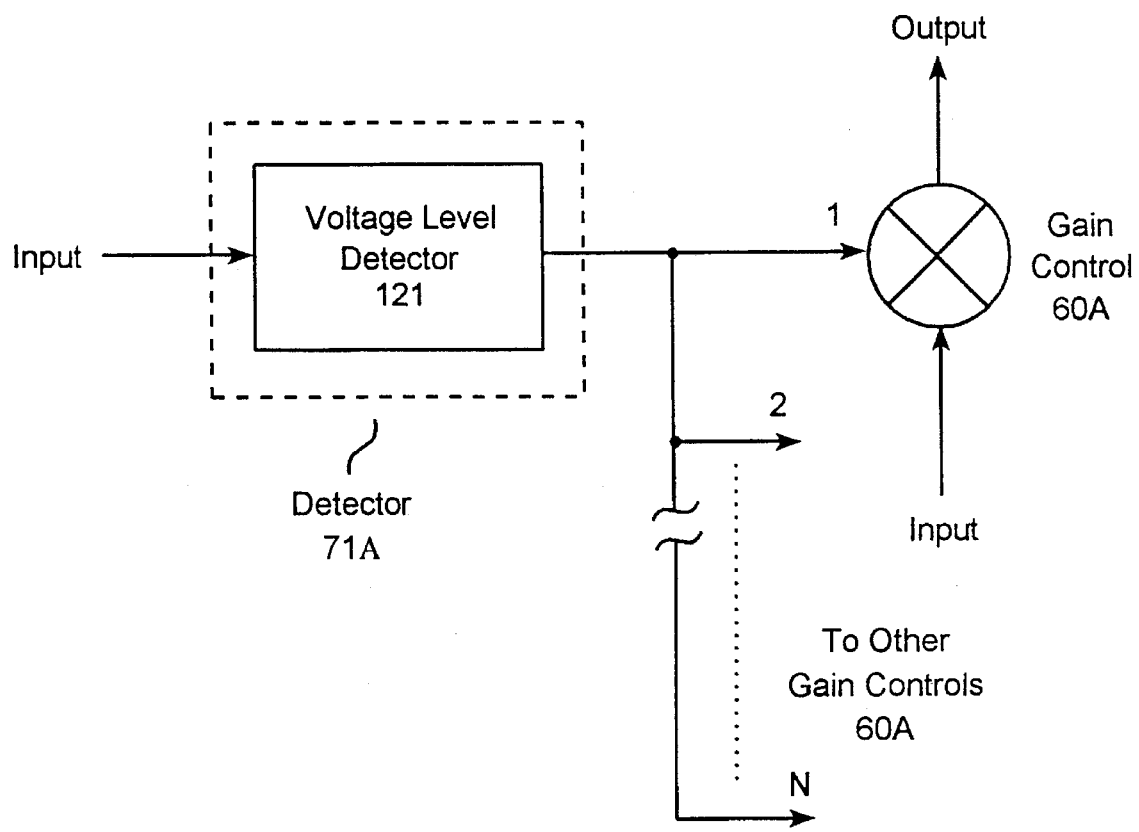
FIG. 22 is a block diagram of an ALGC with voltage level detector and voltage gain control(s) for direct control of the adaptive loop gain.

FIG. 22 shows a specific implementation of an ALGC that includes detector 71A which is a specific implementation of detector 71x, as discussed above and gain control. 60 in combination for the present invention where an input signal of the adaptive array is coupled to the input terminal of each detector 71A, which includes voltage level detector 121, as level detector 208 in FIG. 21 or to a single detector 71A when detector 71A provides sufficient signal averaging, as appropriate. The output terminal of detector 71A is coupled to the control signal input terminal of one or more gain control(s) 60A, as appropriate (i.e. more than one if the specific ALGC implementation requires a gain control in each loop). As the signal amplitude of the input terminal of detector 71A changes, the gain control 60A tracks the amplitude change. If level detector 121 and gain control 60A are linear in voltage, the ALGC tracks the change in the input signal level in a linear manner. The ALGC in FIG. 22 can be used in the N input level detector in FIG. 21 to implement ALGC 11A in FIGS. 6 and 15, and ALGC 11D in FIG. 10. The ALGC in FIG. 22 can also be used to implement ALGC 11B in FIG. 7.

Figure 23:
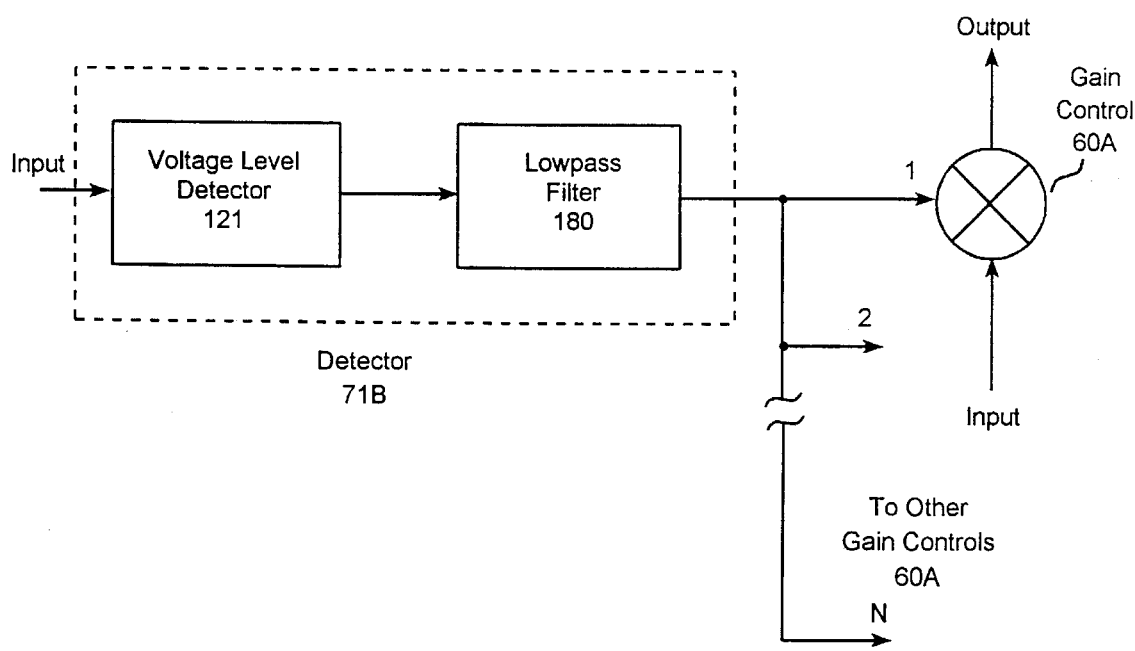
FIG. 23 is a block diagram of an ALGC with voltage level detector, lowpass filter, and voltage gain control(s) for direct control of the adaptive loop gain.

FIG. 23 shows another implementation of an ALGC that includes detector 71B and gain control 60A in combination for the present invention. The input signal of detector 71B is applied to the input terminal of voltage level detector 121. The output terminal of voltage level detector 121 is coupled to the input terminal of lowpass filter 180, where lowpass filter 180 is the signal processor section for detector 71B. Lowpass filter 180 averages the output signal of level detector 121. The output terminal of lowpass filter 180 is the output terminal of detector 71B and is coupled to the control signal input terminal of one or more gain control 60A, as necessary by the specific embodiment where it is used. As the amplitude of the input signal of detector 71B changes, gain control 60A tracks the amplitude change. If level detector 121 and gain control 60A are linear in voltage, the ALGC of FIG. 23 tracks the change of the average input signal level in a linear manner. The ALGC in FIG. 23 can be used with the N input level detector in FIG. 20 to implement ALGC 11A in FIGS. 6 and 15 and ALGC 11D in FIG. 10. The ALGC in FIG. 23 can also be used to implement ALGC 11B in FIG. 7.

Figure 24:
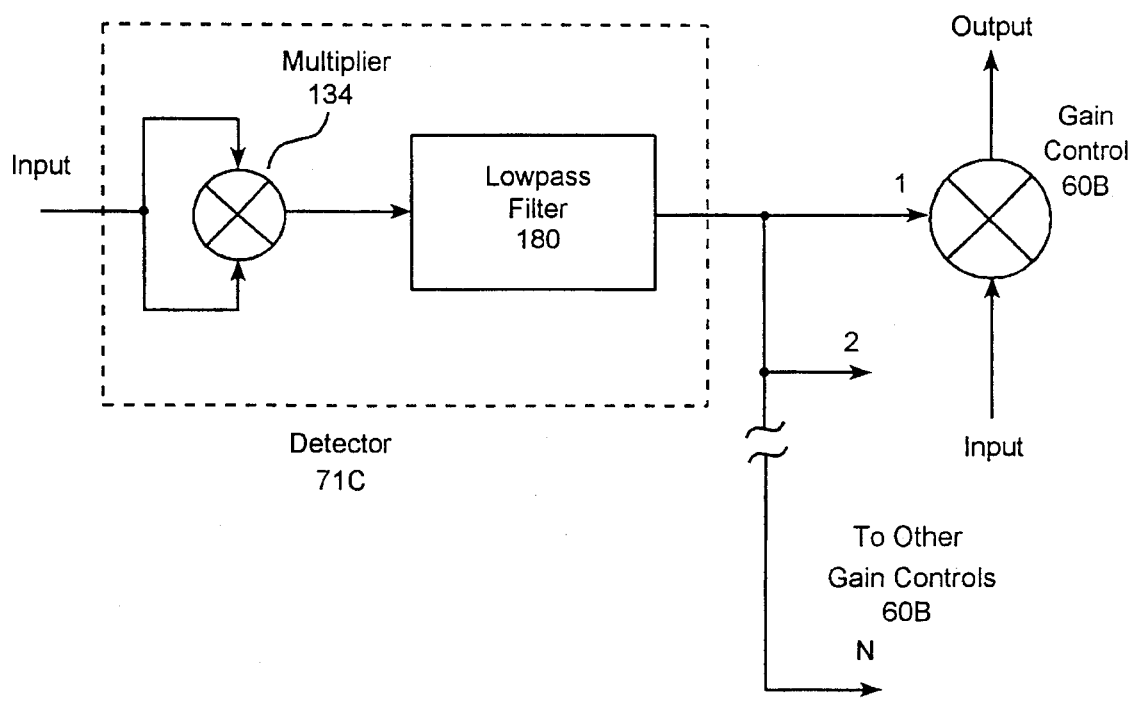
FIG. 24 is a block diagram of an ALGC with squaring multiplier, lowpass filter and power gain control(s) for direct control of the adaptive loop gain.

FIG. 24 shows yet another implementation of an ALGC that includes detector 71C and gain control 60B combination for the present invention, where the input signal to detector 71C is coupled to the two input terminals of multiplier 134, thereby squaring the input signal and the output terminal of multiplier 134 is coupled to the input terminal of lowpass filter 180. Lowpass filter 180 is used to remove the high frequency signal component generated by the multiplier 134. Multiplier 134 and lowpass filter 180 function as the level detector. In operation, if the bandwidth of lowpass filter 180 is narrow enough, it averages the output signal of multiplier 134, thus functioning as the signal processing section of detector 71C of FIG. 24. The output terminal of lowpass filter 180 is the output terminal of detector 71C and is coupled to the control input terminal of one or more gain control 60B, as necessary by the specific embodiment where it is used. The detector 71C and gain control 60B track the changes of the power level of the input signal of the detector 71C in a linear fashion if multiplier 134 is linear in voltage and gain control 60B is linear in power. The ALGC in FIG. 24 can be used in the N input level detector in FIG. 20 to implement ALGC 11A in FIGS. 6 and 15 and ALGC 11D in FIG. 10. The ALGC in FIG. 24 can also be used to implement ALGC 11B in FIG. 7.

Figure 25:
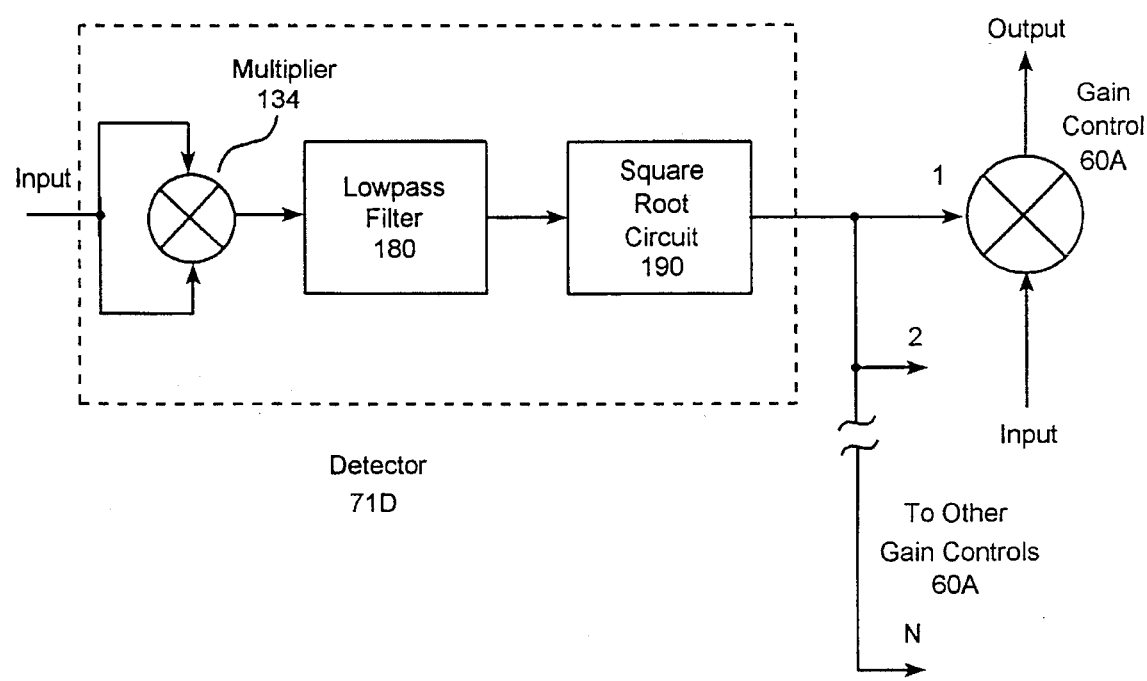
FIG. 25 is a block diagram of an ALGC with squaring multiplier, lowpass filter, square root circuit, and voltage gain control(s) for direct control of the adaptive loop gain.

FIG. 25 shows a further implementation of an ALGC that includes detector 71D and gain control 60A combination for the present invention. The input signal to detector 71D is coupled to both of the two input terminals of multiplier 134, there by squaring the signal. The output terminal of multiplier 134 is coupled to the input terminal of lowpass filter 180. Lowpass filter 180 removes the high frequency components generated by multiplier 134, and if the bandwidth of lowpass filter 180 is narrow enough, it averages the output signal of multiplier 134. The output terminal of lowpass filter 180 is coupled in turn to the input terminal of square root circuit 190. The output terminal of square root circuit 190 is the output terminal of detector 71D and provides the control signal that is coupled to the control signal input terminal of one or more gain control(s) 60A, as necessary. The detector 71D and gain control 60A track the amplitude changes of the input signal to detector 71D. If multiplier 134 and gain control 60A are linear in voltage, the ALGC tracks the changes in the amplitude of the input signal in a linear manner. Multiplier 134 and lowpass filter 180 are the level detector, and filter 180 and square root circuit 190 are the signal processor section. The ALGC in FIG. 25 can be used in the N input level detector in FIG. 20 to implement ALGC 11A in FIGS. 6 and 15 and ALGC 11D in FIG. 10. The ALGC in FIG. 25 can also be used to implement ALGC 11B in FIG. 7.

The ALGC implementations in FIGS. 22–25 can be used with ALGC 11C in FIG. 8, where gain control 60A is implemented by variable gain integrator 25.

Figure 26:
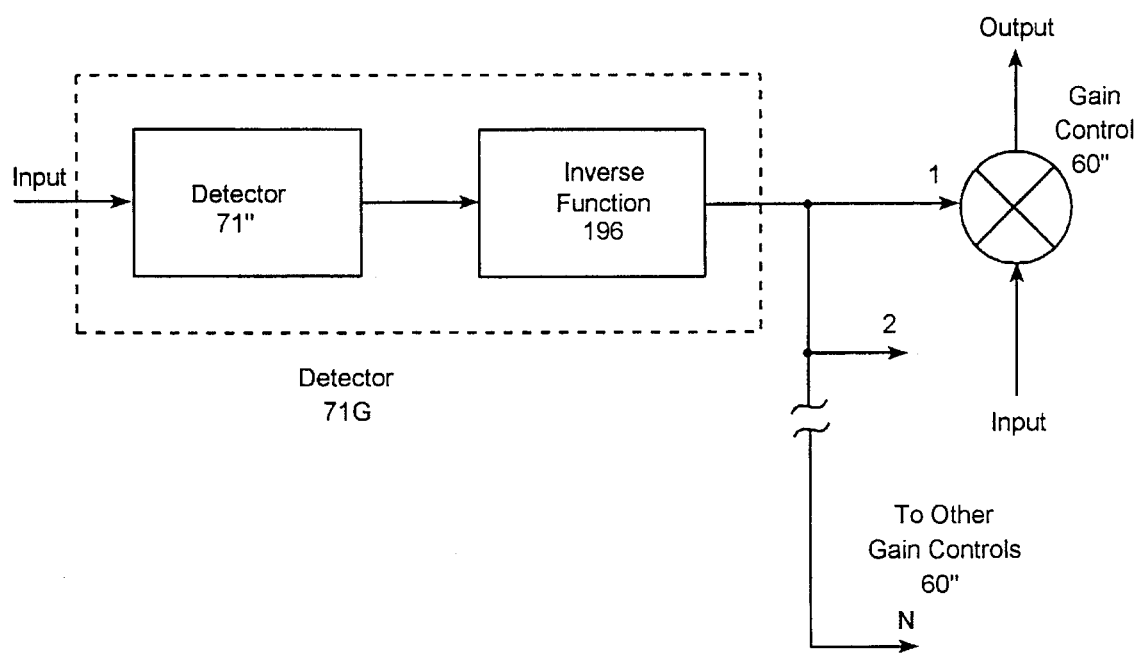
FIG. 26 is a block diagram of an ALGC with the detector and gain controls used in direct control of the adaptive loop gain used in indirect control of adaptive loop gain.

For the ALGC with the gain controls located in the adaptive array input signal paths, the present invention includes, but is not restricted to the following detector network 70 and gain control 60 combination implementations. All these implementations require a lowpass filter to average the control signal so that the envelope modulation of the input signal are passed through to the input terminal of tapped delay line 20, etc. The details of the lowpass filter implementation depend on whether the ALGC is a feed forward or feedback implementation and the response that is desired, as found in the AGC prior art. These are just a few examples, many other combinations are possible. FIG. 26 shows an implementation of the detector 71G and gain control 60" combination for the present invention, where detector 71" is a detector implementation used in the direct control ALGC embodiments of the present invention, such as in FIGS. 22–25, and gain control 60" is the corresponding gain control. The input signal is coupled to the input terminal of detector 71'. The output terminal of detector 71' is coupled the input terminal of inverse function circuit 196 (i.e. 1/x). The output terminal of inverse function circuit 196 is the output terminal of detector 71G and is coupled to the gain control input terminal of each gain control 60" (one gain control in each input signal path of the adaptive array). As the input signal level to detector 71G changes, the detector 71G and gain controls 60" track the changes in the input signal level to reduce the change in or keep constant the level of the input signal(s) to the adaptive array at the tapped delay lines 20, etc. The AGLC implementation in FIG. 26 is the "input path gain control" counter part of the adaptive loop gain control implementation of FIGS. 22–25 (only where applicable). The ALGC in FIG. 26 can be used with the N input level detector in FIG. 20 and ALGC 11E in FIG. 11.

Figure 27:
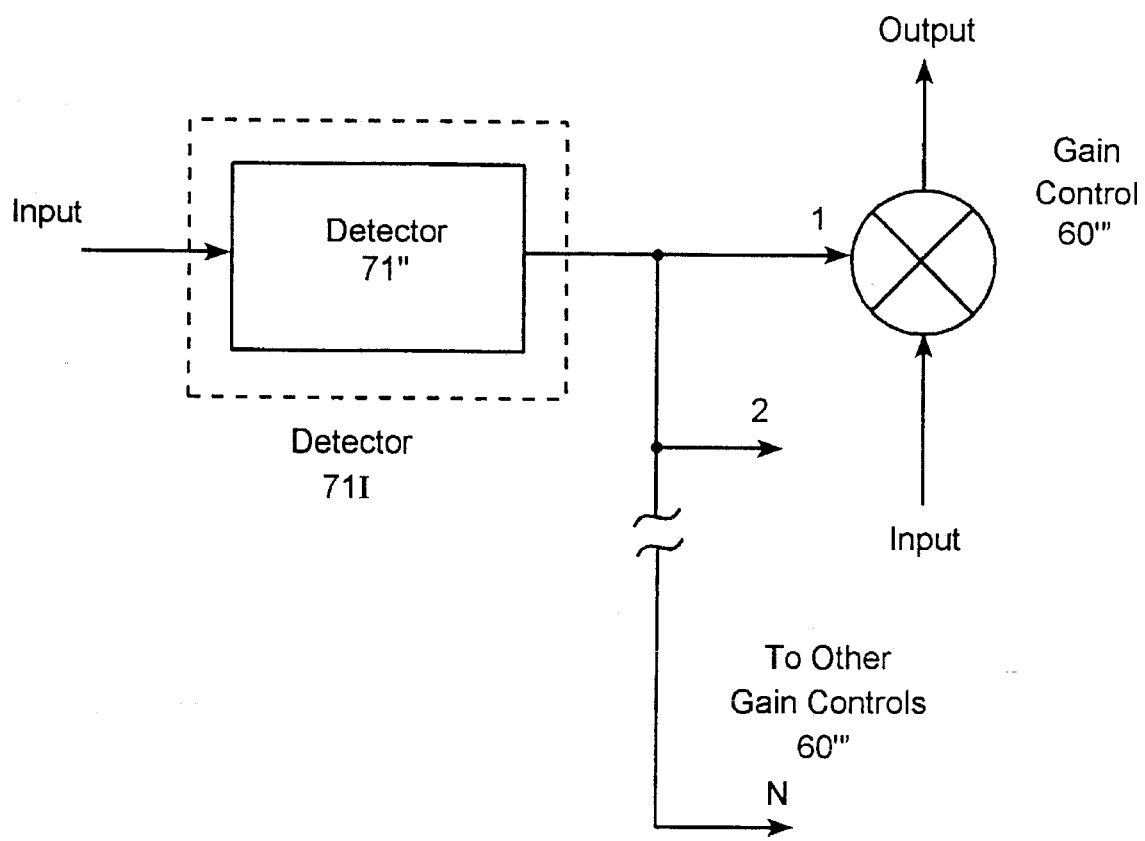
FIG. 27 is a block diagram of an ALGC with the detector used from the direct control of the adaptive loop gain and a variable attenuator gain control for indirect control of the adaptive loop gain.

FIG. 27 shows an implementation of the detector 71" and gain control 60'" combination for the present invention, where detector 71" is a detector implementation used for the direct control ALGC embodiments of the present invention, such as in FIGS. 22–25, and gain control 60'" is a variable attenuator with the inverse response of the corresponding gain control 60" in FIG. 26. This eliminates the need for the inverse function circuit 196 of the detector 71G in FIG. 26. As the input signal level of detector 71I changes, the ALGC in FIG. 27 tracks the changes in the input signal. The implementation in FIG. 27 is the attenuator gain control counter part of the implementation in FIG. 26. The ALGC in FIG. 27 can be applied to the N input level detector in FIG. 20 and ALGC 11E in FIG. 11.

Figure 28:
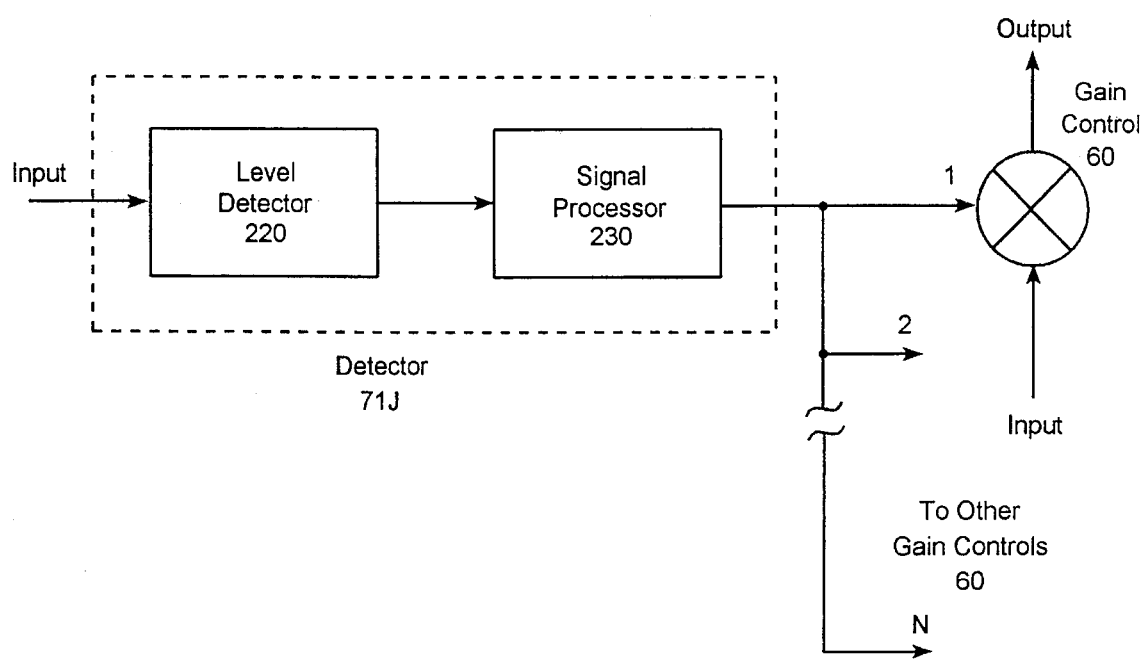
FIG. 28 is a block diagram of an ALGC used in a feedback AGC for use with indirect control of the adaptive loop gain.

FIG. 28 shows a further implementation of the ALGC of the present invention, where level detector 220, signal processor 230, and gain control 60 are implemented for feedback AGC as found in the art. The input signal to detector 71J is coupled to the input terminal of level detector 220, and the output terminal of level detector 220 is coupled to the input terminal of signal processor 230 with the output terminal of signal processor 230 coupled to the signal control input terminal of each gain control 60. The level detector 220 is any level detector found in the art for feedback AGC, including those discussed above; signal processor 230 include a lowpass filter, level shifter, etc. as appropriate as found in the feedback AGC art; and the gain control 60 can be any gain control found in the art for feedback AGC, as appropriate, which includes non-linear variable attenuators. The ALGC in FIG. 28 can be used in the N input level detector in FIG. 20 to implement ALGC 11F of FIG. 12. The ALGC in FIG. 28 can also be used to implement ALGC 11G of FIG. 13.

Figure 29:
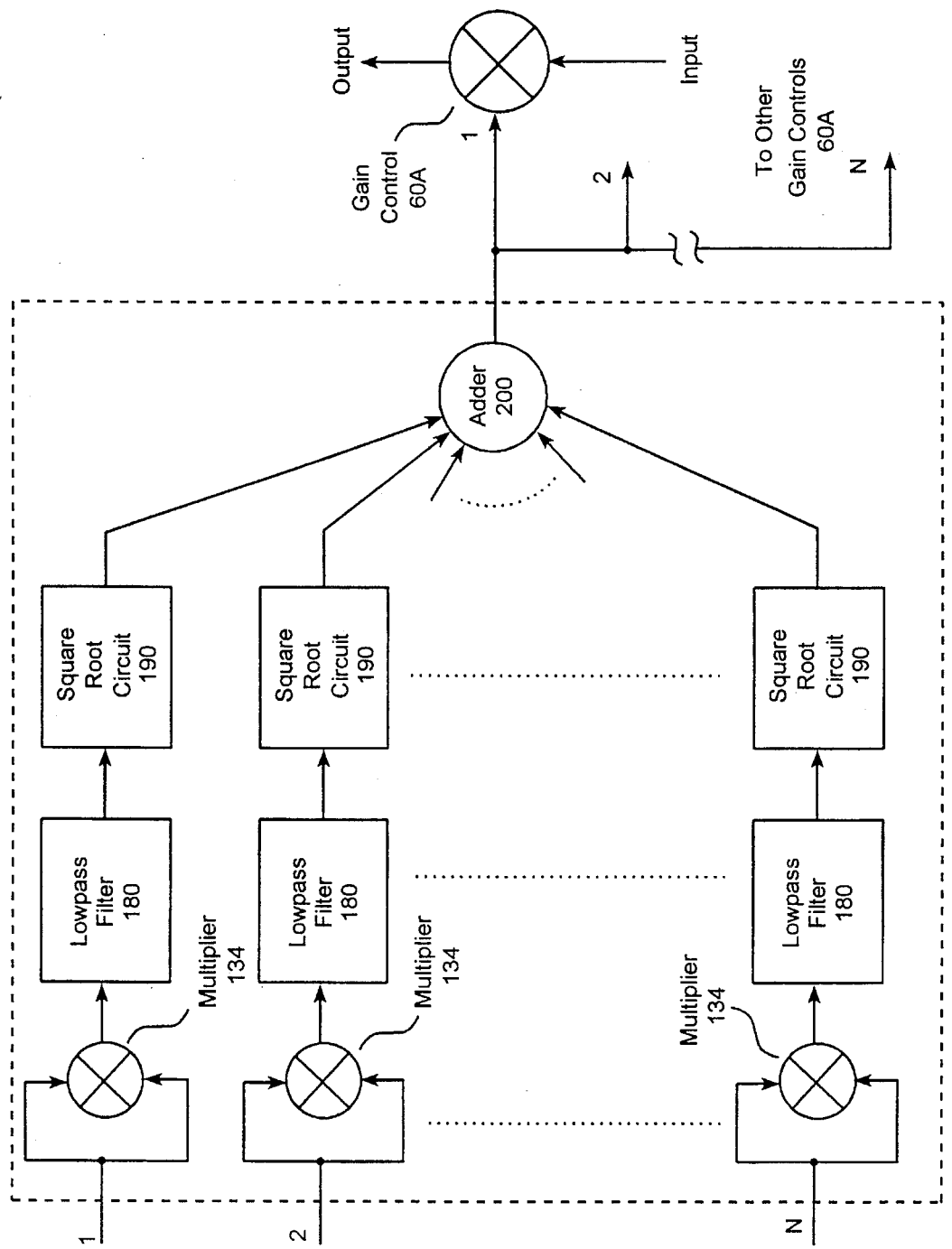
FIG. 29 is a block diagram of an ALGC with a voltage detector network having N input signals, N multipliers, N lowpass filter, N square root circuits, adder, and voltage gain controls for direct control of the adaptive loop gain.

FIG. 29 shows an example of detector network 70' with N input terminals shown in FIG. 21. Each of the N input signals of the adaptive array is coupled to the two input terminals of a corresponding multiplier 134, thereby squaring the input signal. The output terminal of each multiplier 134 is in turn coupled to the input terminal of the corresponding lowpass filter 180, and from the output terminal of lowpass filter 180 is coupled to the input terminal of the corresponding square root circuit 190. The output terminal of each square root circuit 190 is coupled to the corresponding input of adder 200. The output signal of adder 200 is the output signal of network detector 70'A and is coupled to the control signal input terminal of one or more gain control(s) 60A, as appropriate. Lowpass filter 180 is provided to remove the high frequency components generated by the multiplier 134 and can set the bandwidth to provide an average signal. In this implementation, the signal processing is performed by lowpass filters 180 and square root circuits 190 (as part of level detector 208 in FIG. 21). As the input signal level of the adaptive array, and correspondingly, the input signal level at the input terminals of detector network 70'A in FIG. 29, changes, the gain control 60A tracks the amplitude change. If multipliers 134 are linear in voltage and gain controls 60A are linear in voltage, the ALGC tracks the average change in the input signal level at all the input terminals of detector network 70'A in a linear manner. The ALGC in FIG. 29 can be used to implement ALGC 11A in FIGS. 6 and 15 and ALGC 11D in FIG. 10.

It would be clear to a person skilled in the art that the invention can be implemented in either analog, digital, analog/digital hybrid, software/digital, etc., also as partially illustrated below.

Figure 30:
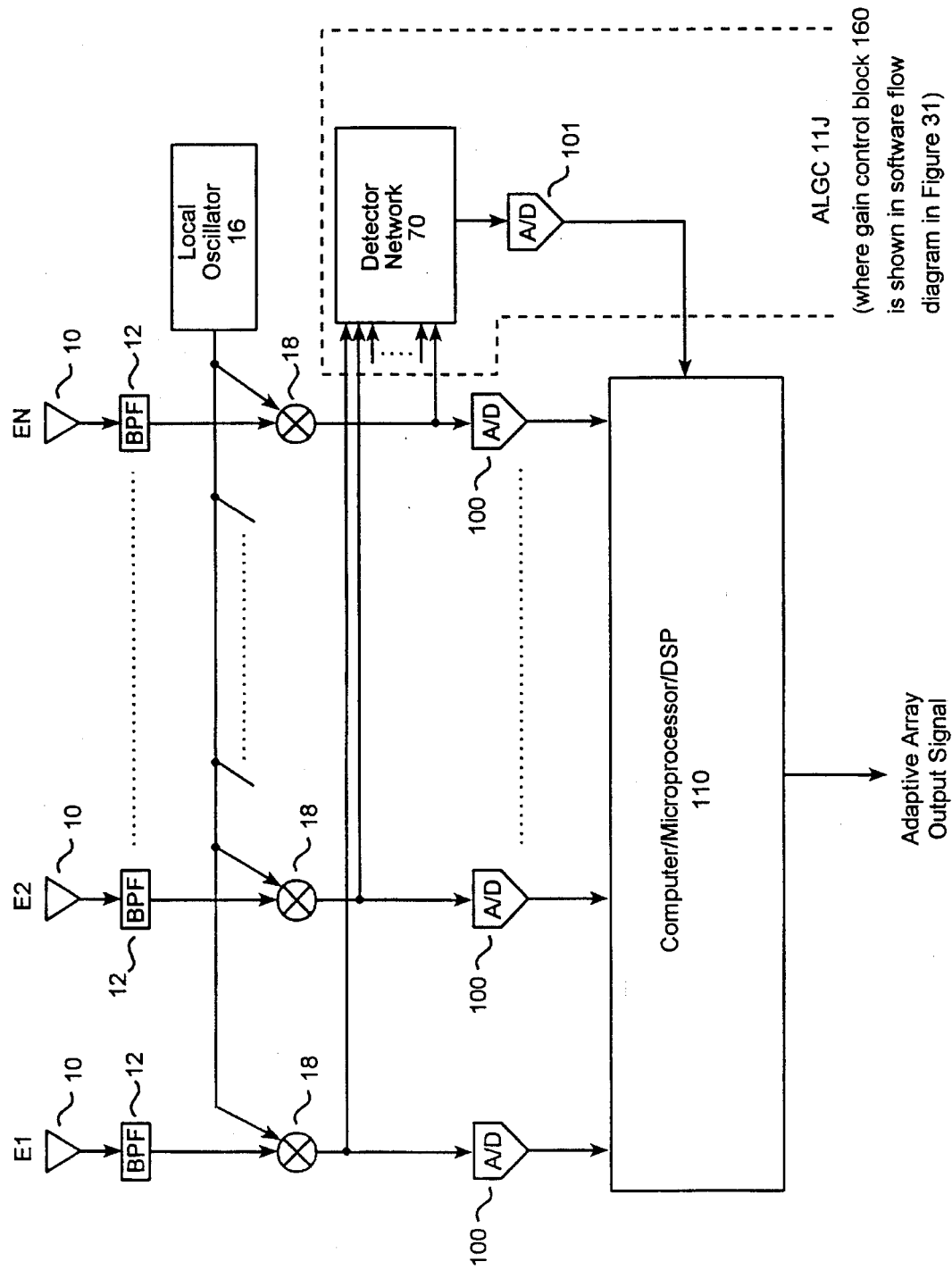
FIG. 30 is a block diagram of a computer/microprocessor/DSP implementation of the present invention.

FIG. 30 shows the present invention implemented with the use of a computer, microprocessor, or digital signal processors (DSP) 110. As in the analog embodiment, the signal of interest and the unwanted multipath or interference signals are received by antenna elements 10 with each antenna coupled to the input terminal of a corresponding bandpass filter 12. In turn, the output terminal of each bandpass filter 12 is coupled to the first input terminal of a corresponding mixer 18. The second input terminal of each mixer 18 is coupled to output terminal of local oscillator 16. The output terminal of each mixer 18 is subsequently coupled to a corresponding input terminal of detector network 70 and the input terminal of a corresponding analog-to-digital (A/D) converter 100, where the output port of each A/D converter in turn is coupled to the corresponding input port of computer/microprocessor/DSP 110. The output terminal of detector network 70 is coupled to the input terminal of A/D converter 101, the output port of which is in turn is coupled to the corresponding input port of computer/microprocessor/DSP 110 (the detector network 70 can equally as well be implemented in software). The adaptive array algorithm for a specific embodiment of the present invention is implemented in the computer/microprocessor/DSP 110, an example of which is discussed below.

Figure 31:
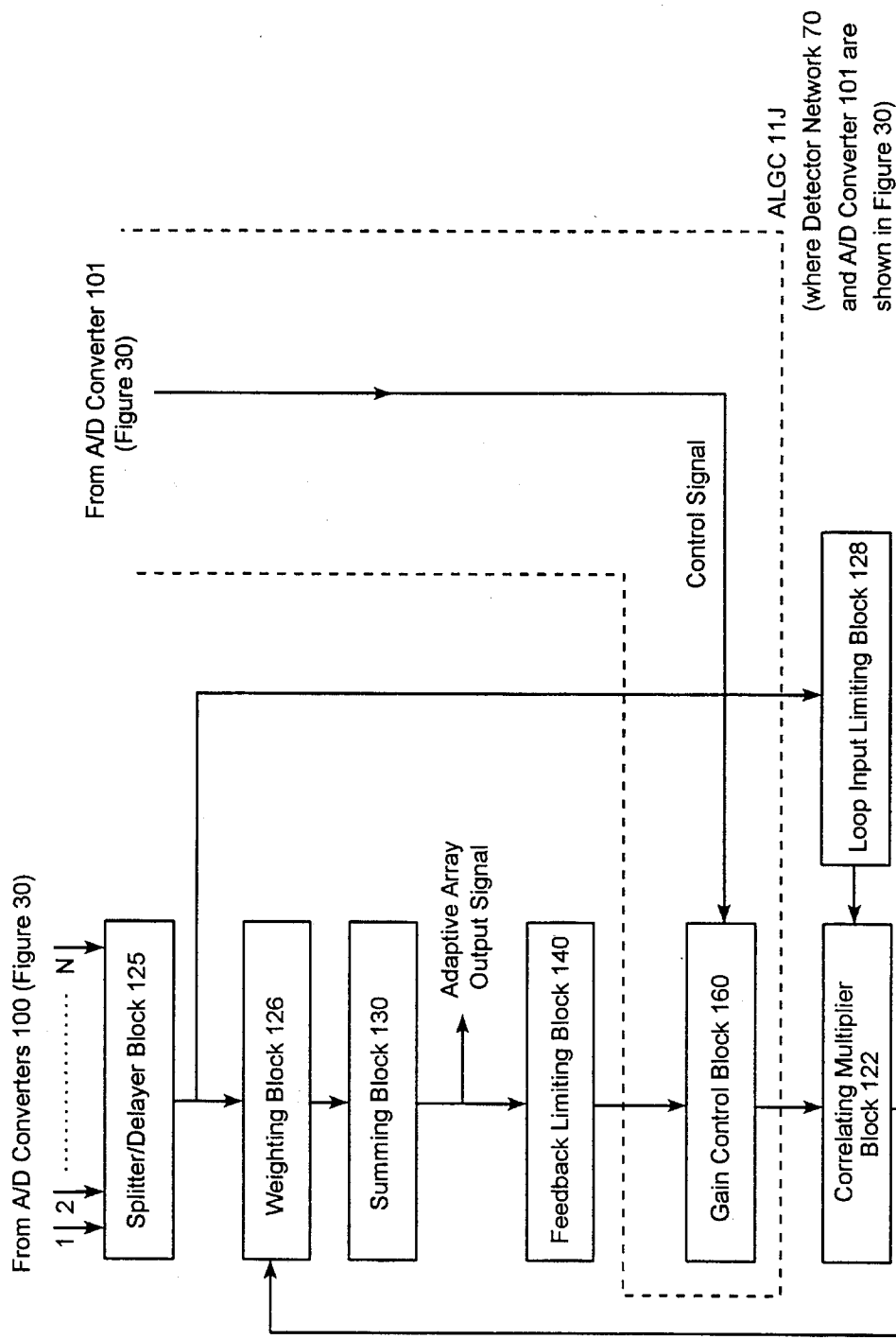
FIG. 31 is a software flow diagram of a software implementation of the present invention.

FIG. 31 shows a flow chart for a software embodiment of the present invention of the embodiment shown in FIG. 6 using equation (9) as the basis of the adaptive array algorithm to compute each weight value, however, the software embodiment of the present invention is not limited to the implementation presented below. At least one software implementation is possible for each of the various analog embodiments of the present invention provided above. In FIG. 31, each of the digitized antenna element signals from A/D converters 100 goes to splitter/delayer block 125.

The splitter/delayer block 125 makes M copies (one for each adaptive loop) of the incoming data from each A/D converter 100, delaying each of the M copies an appropriate length of time such that it functions as the software equivalent of an M output tapped delay line. The splitter/delayer block 125 output goes to loop input limiting block 128 and weighting block 126.

Loop input limiting block 128 computes the input signal level (i.e. envelope) for each antenna element and then computes the amplitude limited signal for each adaptive loop by applying the following calculation:

$$L_i(n)=X_i(n)/|X_i(n)| \qquad \text{eq(15)}$$

The output of loop input limiting block 128 goes to the correlation multiplier block 122.

Weighting block 126 weights each adaptive loop input signal, starting with an initial weighting value, by making the following calculation for each adaptive loop:

$$S_i(n)=X_i(n)*W_i(n) \qquad \text{eq(16)}$$

The output of weighting block 126 goes to the summing block 130.

Summing block 130 sums the weighted values of all the input signals of all the adaptive loops using the following calculation:

$$S_t(n)=\Sigma S_i(n) \qquad \text{eq(17)}$$

The output data of summing block 130 goes to limiting block 140. The output of summing block 130 is also the output signal of the adaptive array which can be used in its digital form in a digital receiver, etc. or be applied to a digital-to-analog converter, which converts the digital signal to an analog signal which can be used in an analog receiver, etc.

Limiting block 140 computes the adaptive array output signal level and then the amplitude limited version of the adaptive array output signal, as follows:

$$\epsilon(n)=S_t(n)/|S_t(n)| \qquad \text{eq(18)}$$

The output data of limiting block 140 goes to the gain control block 160.

The gain control block 160 computes the amplitude of the feedback signal using the following equation:

$$\epsilon_c(n)=\alpha*D(n)*\epsilon(n) \qquad \text{eq(19)}$$

where D(n) is the gain of gain control block 160 as determined by the input signal level of the adaptive array, detector network 70, and gain block 160, and $\alpha$ is a constant. The output of gain control block 160 goes to correlation multiplying block 122.

Correlating multiplier block 122 multiplies the amplitude limited input for each adaptive loop calculated in the correlation limiting block 128 with the feedback signal as follows:

$$M_i(n)=\epsilon_c(n)*L_i(n) \qquad \text{eq(20)}$$

The output of correlation multiplying block 122 is applied to weight calculating block 124 which computes the next weighting value for each weight using the following equation:

$$W_i(n+1)=W_i(n)+M_i(n) \qquad \text{eq(21)}$$

where this new value of each weight is used to update each weight value for calculation of the next data sample. This process continues for each successive data sample with the weights converging to steady state values.

AGLC 11J is made up of detector network 70 and A/D converter 101 in FIG. 30 and gain control block 160 in FIG. 31 and is equivalent to of ALGC 11A in FIG. 6. This software implementation of the present invention in FIGS. 30 and 31 functions in a manner similar to its analog counter part in FIG. 6.

The computer, microprocessor, or digital signal processors (DSP) 110, software design, A/D converters 100 and 101 in FIG. 30, and any associated digital-to-analog converter for the adaptive array output signal are chosen so that they can function in real time for the specific adaptive array application to which it is applied.

From the foregoing description, it will be apparent that the invention disclosed herein provides novel and advantageous performance improvements for adaptive arrays. It will be understood by those familiar with the art, the invention may be embodied in other specific forms without departing from the spirit or essential characteristics thereof.

What is claimed is:

1. A method for automatically controlling the gain of adaptive loops of an adaptive array to reduce the effects of a desired signal with multiple images with different delay times and of interference of input signals of said adaptive array with the performance of said adaptive array degraded by an increased difference between the gain and the optimum gain of any of said adaptive loops due to changes in the input signal level of said adaptive array to improve said performance of said adaptive array, said adaptive array includes a feedback function coupled to receive the adaptive array output signal to generate the feedback signal, said method comprising the steps of:

a. detecting the signal strength of a representation of at least one of said input signals of said adaptive array to generate a control signal representing the relationship between said input signal level of said adaptive array and change of said gain of said adaptive loops;

b. lowpass filtering said control signal of step a. to generate a lowpass filtered control signal; and c. adjusting said gain of said adaptive loops with said lowpass filtered control signal of step b. to reduce said increased difference between said gain and said optimum gain of each of said adaptive loops.

2. A method as in claim 1, wherein said feedback function includes a feedback function for a CMA adaptive array to generate said feedback signal.

3. A method as in claim 1 wherein said feedback function includes the steps of:

d. generating a reference signal which is correlated to said desired signal from said adaptive array output signal;

e. subtracting said adaptive array output signal from said reference signal of step d. to generate said feedback signal.

4. A method for automatically controlling the gain of adaptive loops of an adaptive array having a plurality of input signals to reduce the effects of a desired signal with multiple images with different delay times and of interference received by said adaptive array with the performance of said adaptive array degraded by an increased difference between the gain and the optimum gain of any of said adaptive loops due to changes in the input signal level of said adaptive array, said adaptive array includes a feedback function coupled to receive said adaptive array output signal to generate the feedback signal, said method comprising the steps of:

a. detecting the signal strength of a representation of at least one input signal of said adaptive array to generate a control signal;

b. lowpass filtering said control signal of step a. to generate a lowpass filtered control signal; and c. adjusting the amplitude of each input signal of said adaptive array to reduce the change in said input signal level of said adaptive array with said lowpass filtered control signal of step b. to reduce said increased difference between said gain and said optimum gain of each of said adaptive loops.

5. A method as in claim 4, wherein said feedback function includes a feedback function for a CMA adaptive array to generate said feedback signal.

6. A method as in claim 4 wherein said feedback function includes the steps of:

d. generating a reference signal which is correlated to said desired signal from said adaptive array output signal;

e. subtracting said adaptive array output signal from said reference signal of step d. to generate said feedback signal.

7. A method for automatically controlling the gain of the adaptive loops of an adaptive array used in a communications receiver system with a plurality of antenna elements to reduce the effects of multipath with the performance of said adaptive array degraded by an increased difference between the gain and the optimum gain of any of said adaptive loops due to changes in the input signal level of said adaptive array to improve said performance of said adaptive array, with each of said input signals of said adaptive array generated from the output signal of the associated one of said antenna elements, said adaptive array includes a separate multiplier associated with each one of said adaptive loops coupled to the associated one of said input signals of said adaptive array and the feedback function for a CMA adaptive array coupled to receive said adaptive array output signal to generate the feedback signal, said method comprising the steps of:

a. detecting the signal strength of a representation of at least one of said input signals of said adaptive array to generate a control signal representing the relationship between said input signal level of said adaptive array and change of said gain of said adaptive loops;

b. lowpass filtering Said control signal of step a. to generate a lowpass filtered control signal; and c. adjusting said gain of said adaptive loops with said lowpass filtered control signal of step b. to reduce said increased difference between said gain and said optimum gain of each of said adaptive loops.

8. A method as in claim 7 wherein:

step a. includes the steps of:

d. summing at least two of said input signals of said adaptive array to generate a summed signal;

e. squaring said summed signal of step d. to generate a representative signal representing said input signal level of said adaptive array;

f. lowpass filtering said representative signal of step e. to provide further averaging and a lowpass filtered signal; and g. taking the square root of said lowpass filtered signal of step f. to generate said control signal; and step c. includes the step of changing the voltage gain of the adaptive loops linearly with respect to the voltage level of said control signal;

wherein said feedback function for a CMA adaptive array includes a first amplitude limiter coupled to receive said adaptive array output signal to generate said feedback signal; and wherein said adaptive array further includes a second amplitude limiter associated with each said multiplier coupled to receive said associated one of said input signals of said adaptive array to generate an amplitude limited input signal coupled to be received by associated said multiplier.

9. A method as in claim 7 wherein:

step a. includes the steps of:

h. separately squaring at least two of said input signals of said adaptive array to generate squared signals;

i. summing said squared signals in step h. to generate said control signal; and step c. includes the step of linearly changing the power gain of the adaptive loops with respect to the voltage level of said control signal;

wherein said feedback function for a CMA adaptive array includes a first amplitude limiter coupled to receive said adaptive array output signal to generate said feedback signal; and wherein said adaptive array further includes a second amplitude limiter associated with each said multiplier associated with one of said input signals of said adaptive array coupled to receive said associated one of said input to generate an amplitude limited input signal coupled to be received by associated said multiplier.

10. A method as in claim 7 wherein:

said adaptive array further includes:

a computing system; and an algorithm representation of said adaptive array and said direct ALGC;

step a. further includes the steps of:

j. generating a digital representation of said control signal; and k. generating a digital representation of each of said input signals of said adaptive array; and said method further includes the step of:

l. computing a real time digital representation of said adaptive array output signal from said digital representation of said control signal of step j. and said digital representation of each of said input signals of step k. with said computing system and said algorithm.

11. A method as in claim 7 wherein said feedback function for a CMA adaptive array includes the step of amplitude limiting said adaptive array output signal to generate said feedback signal.

12. A method as in claim 7 wherein said feedback function for a CMA adaptive array includes the step of directly connecting said adaptive array output signal to the output of said feedback function for a CMA adaptive array to make said adaptive array output signal said feedback signal.

13. A method as in claim 7, wherein said communications receiver system includes a constant envelope modulation system.

14. A method for automatically controlling the gain of the adaptive loops of an adaptive array used in a communications receiver system with a plurality of antenna elements to reduce the effects of multipath with the performance of said adaptive array degraded by an increased difference between the gain and the optimum gain of any of said adaptive loops due to changes in the input signal level of said adaptive array to improve said performance of said adaptive array, with each of input signals of said adaptive array generated from the output signal of the associated one of said antenna elements, said adaptive array includes a different multiplier associated with each one of said adaptive loops coupled to the associated one of said input signals and a feedback function coupled to receive said adaptive array output signal to generate the feedback signal, said method comprising the steps of:

a. detecting the signal strength of a representation of at least one of said input signals of said adaptive array to generate a control signal;

b. lowpass filtering the control signal to generate a lowpass filtered control signal; and c. adjusting the amplitude of each one of said input signals of said adaptive array to reduce the change in said input signal level of said adaptive array with said lowpass filtered control signal of step b. to reduce said increased difference between said gain and said optimum gain of each of said adaptive loops.

15. A method as in claim 14 wherein:

step a. includes the steps of:

d. separately squaring at least two of said input signals of said adaptive array to generate squared signals;

e. summing said squared signals in step d. to generate a said control signal signal; and said gain control includes a variable power attenuator; and step c. includes the step of adjusting said gain of each variable power attenuator gain control in a feedback manner.

16. A method as in claim 14, wherein said feedback function includes the step of amplitude limiting said adaptive array output signal to generate said feedback signal.

17. A method as in claim 14, wherein said feedback function includes the steps of:

f. amplitude limiting said adaptive array output signal to generate an amplitude limited signal;

g. envelope detecting said adaptive array output signal to generate an envelope signal representation of the voltage signal level of said adaptive array output signal;

h. generating a bias voltage signal;

i. subtracting said bias voltage signal of step h. from said envelope signal of step g. to generate the biased envelope signal; and j. multiplying said amplitude limited signal of step f. and said biased envelope signal of step i. to generate said feedback signal.

18. A method as in claim 14, wherein said communications receiver system includes a constant envelope modulation system.

19. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array, a first adder coupled to receive the output signals of said weights to generate the adaptive array output signal, a feedback function for a CMA adaptive array coupled to receive said adaptive array output signal to generate the feedback signal, a separate first multiplier associated with each of said weights, each said first multiplier having a first and second input terminal and an output terminal, said automatic loop gain control system comprising:

a direct ALGC including:

a detector having at least one input terminal and an output terminal, with each input terminal of said detector disposed to be coupled to associated input terminal of said adaptive array to generate a control signal representing the relationship between said input signal level of said adaptive array and change of said gain of said adaptive loops at said output terminal of said detector; and a gain control having first and second input terminals and one output terminal, said first input terminal disposed to be coupled to receive said feedback signal, said output terminal disposed to be coupled to said second input terminal of each said first multiplier, and said second input terminal of said gain control coupled to said output terminal of said detector to receive said control signal to adjust said gain of said gain control to reduce said increased difference between said gain and said optimum gain of each of said adaptive loops.

20. A system as in claim 19 wherein said feedback function for a CMA adaptive array includes an amplitude limiter.

21. A system as in claim 19 wherein said feedback function includes:

an envelope detector with an input terminal and an output terminal with said input terminal coupled to said output terminal of said first adder to receive said adaptive array output signal to generate a signal representative of the level of said adaptive array output;

a voltage source having an output terminal to generate a bias voltage signal;

a subtractor having a first and a second input terminal and an output terminal with said first input terminal coupled to said output terminal of said envelope detector and said second input terminal coupled to said output terminal of said voltage source to subtract said bias signal from said signal representative of the level of said adaptive array output signal to generate a biased envelope signal;

an amplitude limiter with an input terminal and an output terminal with said input terminal coupled to said output terminal of said first adder to receive said adaptive array output signal to generate an amplitude limited signal; and a second multiplier with first and second input terminals and an output terminal, where said first input terminal is coupled to said output terminal of said subtractor and said second input terminal is coupled to said output terminal of said amplitude limiter to multiple said biased envelope signal and said amplitude limited signal to generate said feedback signal.

22. A system as in claim 19 wherein said feedback function for a CMA adaptive array has an input terminal and an output terminal with said input terminal connected to said output terminal.

23. A system as in claim 19 further includes an individual amplitude limiter associated with each of said weights, each said amplitude limiter having an input and an output terminal with said input terminal disposed to be coupled to an input of the associated one of said weights and said output terminal of said amplitude limiter is coupled to said first input terminal of said first multiplier associated with same one of said weights.

24. A system as in claim 19 wherein:

said detector includes:

a second adder having a plurality of input terminals and one output terminal with each of said input terminals disposed to be coupled to a different one of said N antenna elements to generate a summed signal;

a third multiplier having first and second input terminals and an output terminal, said first and second input terminals coupled to said output terminal of said second adder to square said summed signal to generate the squared summed signal at said output terminal of said third multiplier;

a lowpass filter having an input terminal and an output terminal, with said input terminal coupled to said output terminal of said third multiplier to lowpass filter said squared summed signal; and a square root circuit having an input terminal and an output terminal, said input terminal coupled to said output terminal of said lowpass filter to generate the control signal at said output terminal of said square root circuit; and said gain control includes a fourth multiplier having first and second input terminals and an output terminal with said first input terminal of said fourth multiplier being said first input terminal of said gain control and said second input terminal of said fourth multiplier being said second input terminal of said gain control and with said output terminal forming the output terminal of said gain control;

said feedback function for CMA adaptive array includes an amplitude limiter; and said adaptive array further includes an individual amplitude limiter associated with each one of said weights, each said amplitude limiter having an input and an output terminal with said input terminal disposed to be coupled to said input of the associated one of said weights and said output terminal of said amplitude limiter coupled to said first input terminal of said first multiplier associated with the same associated one of said weights.

25. A system as in claim 19 wherein:

said detector includes:

a second adder with a plurality of input terminals and one output terminal with each of said input terminals disposed to be coupled to a different one of said N antenna elements to generate a summed signal applied to said output terminal of said adder; and a power detector with input and output terminals with said input terminal coupled to said output terminal of said second adder to generate a control signal representative of the power level of said summed signal with said control signal applied to said output terminal of said power detector; and said gain control changes the power gain of the feedback signal;

said feedback function for CMA adaptive array includes an amplitude limiter; and said adaptive array further includes an individual amplitude limiter associated with each one of said weights, each said amplitude limiter having an input and an output terminal with said input terminal disposed to be coupled to said input of the associated one of said weights and said output terminal of said amplitude limiter coupled to said first input terminal of said first multiplier associated with the same associated one of said weights.

26. A system as in claim 19, wherein:

said system further includes:

a first analog-to-digital converter having an input terminal and a control signal output data port with said input terminal disposed to be coupled to said output terminal of said detector to generate a digital representation of said control signal; and said adaptive array further includes:

N second analog-to-digital converters having an input terminal and an output digital data port with said input terminal of each of said N second analog-to-digital converters disposed to be coupled to a different one of each of said N antenna elements to generate a digital representation of each said input signal of said adaptive array; and a computing system having N input signal digital data ports, one input control signal digital data port and one output signal digital data port with each of said N input signal digital data ports coupled to said output signal digital data port of a different one of each of said second N analog-to-digital converters and said input control signal digital data port of said computing system coupled to said output control signal digital data port of said first analog-to-digital converter, said computing system computing a real time digital representation of said adaptive array output signal with an algorithm representation of said adaptive array and said direct ALGC with said digital representation of said adaptive array output signal applied to said output digital data port of said computing system.

27. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array, an adder coupled to receive the output signals of said weights to generate the adaptive array output signal, a feedback function coupled to receive said adaptive array output signal to generate the feedback signal, said feedback function including generation of a reference signal which is correlated to said desired signal from said adaptive array output signal and subtracting said adaptive array output signal from said reference signal to generate said feedback signal, a separate multiplier associated with each of said weights, each said multiplier having a first and second input terminal and an output terminal, said automatic loop gain control system comprising:

a direct ALGC including:

a detector having at least one input terminal and an output terminal, with each input terminal of said detector disposed to be coupled to the associated said input terminal of said adaptive array to generate a control signal representing the relationship between said input signal level of said adaptive array and change of said gain of said adaptive loops at said output terminal of said detector; and a gain control having first and second input terminals and one output terminal, said first input terminal disposed to be coupled to receive said feedback signal, said output terminal disposed to be coupled to said second input terminal of each said multiplier, and said second input terminal of said gain control coupled to said output terminal of said detector to receive said control signal to adjust said gain of said gain control to reduce said increased difference between said gain and said optimum gain of each of said adaptive loops.

28. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array, an adder coupled to receive the output signals of said weights to generate the adaptive array output signal, a feedback function for a CMA adaptive array coupled to receive said adaptive array output signal to generate the feedback signal, a separate multiplier associated with each of said weights, each said multiplier having a first and second input terminal and an output terminal, said automatic loop gain control system comprising:

a direct ALGC including:

a detector having an input terminal and an output terminal, with each input terminal of said detector coupled to receive said adaptive array output signal to generate a control signal representing the relationship between said input signal level of said adaptive array and change of said gain of said adaptive loops at said output terminal of said detector; and a gain control having first and second input terminals and one output terminal, said first input terminal disposed to be coupled to receive said feedback signal, said output terminal disposed to be coupled to said second input terminal of each said multiplier, and said second input terminal of said gain control coupled to said output terminal of said detector to receive said control signal to adjust said gain of said gain control to reduce said increased difference between said gain and said optimum gain of each of said adaptive loops.

29. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a separate plurality of weights with each of said weights having a first and second input terminal with said first input terminal coupled to each associated said input terminal of said adaptive array to selectively weight said received signals by selected weight factors, an adder coupled to receive the output signals of said weights to generate the adaptive array output signal, a feedback function for a CMA adaptive array coupled to receive said adaptive array output signal to generate the feedback signal, a separate multiplier associated with each of said weights, each said multiplier having a first and second input terminal and an output terminal, said automatic loop gain control system comprising:

a direct ALGC including:

a detector having at least one input terminal and an output terminal, with each input terminal of said detector disposed to be coupled to the associated said input terminals of said adaptive array to generate a control signal representing the relationship between said input signal level of said adaptive array and change of said gain to reduce said increased difference between gain and optimum gain of said adaptive loops at said output terminal of said detector; and variable gain integrator networks, one variable gain integrator network associated with each said multiplier, wherein each of said variable gain integrator networks having first and second input terminals and an output terminal with said first input terminal coupled to said output terminal of said associated multiplier, said second input terminal of each one of said variable gain integrator networks disposed to be coupled to said output terminal of said detector to receive said control signal to adjust said gain of each said variable gain integrator networks to reduce said increased difference between said gain and said optimum gain of each of said adaptive loops, and said output terminal of each of said variable gain integrator networks coupled to said second input terminal of the same one of said weights with which each one of said variable gain integrator networks is associated to control the generation of said select weight factor of said associated one of said weights.

30. An adaptive array as in claim 29 wherein each of said variable gain integrator networks includes:

a variable gain amplifier having first and second input terminals and an output terminal, said first input terminal being said first input terminal of said variable gain integrator network and is coupled to the output terminal of said associated multiplier and said second input terminal being said second input terminal of said variable gain integrator network disposed to be coupled to the output terminal of said detector; and an RC integrator network with an input terminal and an output terminal, said input terminal coupled to said output terminal of said variable gain amplifier and said output terminal being said output terminal of said variable gain integrator network coupled to associated one of said weights.

31. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array to selectively weight said received signals by selected weight factors, an adder coupled to receive the output signals of said weights to generate the adaptive array output signal, a feedback function for a CMA adaptive array coupled to receive said adaptive array output signal to generate the feedback signal, a separate multiplier associated with each of said weights, each said multiplier having a first and second input terminal and an output terminal, said automatic loop gain control system comprising:

a direct ALGC including:
a detector having an input terminal and an output terminal, with each input terminal of said detector disposed to be coupled to receive said adaptive array output signal to generate a control signal representing the relationship between said input signal level of said adaptive array and change of said gain of said adaptive loops at said output terminal of said detector; and variable gain integrator networks, one variable gain integrator network associated with each said multiplier, wherein each of said variable gain integrator networks having first and second input terminals and an output terminal with said first input terminal coupled to said output terminal of said associated multiplier, said second input terminal of each one of said variable gain integrator networks disposed to be coupled to said output terminal of said detector to receive said control signal to adjust said gain of each said variable gain integrator networks to reduce said increased difference between said gain and said optimum gain of each of said adaptive loops, and said output terminal of each of said variable gain integrator networks coupled to said second input terminal of the same associated one of said weights with which each one of said variable gain integrator networks is associated to control the generation of said select weight factor of said associated one of said weights.

32. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a separate plurality of weights with each of said weights having a first and second input terminal with said first input coupled to each associated said input terminal of said adaptive array to selectively weight said received signals by selected weight factors, an adder coupled to receive the output signals of said weights to generate the adaptive array output signal, a feedback function for a CMA adaptive array coupled to receive said adaptive array output signal to generate the feedback signal, a separate multiplier associated with each of said weights, each said multiplier having a first and second input terminal and an output terminal, said automatic loop gain control system comprising:

a direct ALGC including:
a detector having at least one input terminal and an output terminal, with each input terminal of said detector disposed to be coupled to the associated said input terminal of said adaptive array to generate a control signal representing the relationship between said input signal level of said adaptive array and change of said gain of said adaptive loops at said output terminal of said detector; and a separate gain control associated with each one of said weights having first and second input terminals and one output terminal, said first input terminal coupled to the same said input terminal of said adaptive array associated with said associated one of said weights, said output terminal disposed to be coupled to said first input terminal of associated said multiplier, and said second input terminal of said gain control disposed to be coupled to said output terminal of said detector to receive said control signal to adjust said gain of each said gain control to reduce said increased difference between said gain and said optimum gain of each of said adaptive loops.

33. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights with a first and second input terminal, said first input terminal of each of said weights coupled to the associated said input terminal of said adaptive array, a adder coupled to receive the output signals of said weights to generate the adaptive array output signal, a feedback function for a CMA adaptive array coupled to receive said adaptive array output signal to generate the feedback signal, a separate multiplier associated with each of said weights, each said first multiplier having a first and second input terminal and an output terminal, said automatic loop gain control system comprising:

a direct ALGC including:
a detector having an input terminal and an output terminal, with each input terminal of said detector disposed to be coupled said adaptive array output signal to generate a control signal representing the relationship between said input signal level of said adaptive array and change of said gain of said adaptive loops at said output terminal of said detector; and a separate gain control associated with each one of said weights having first and second input terminals and one output terminal, said first input terminal coupled to the same said input terminal of said adaptive array associated with said associated one of said weights, said output terminal disposed to be coupled to said first input terminal of associated said multiplier, and said second input terminal of said gain control disposed to be coupled to said output terminal of said detector to receive said control signal to adjust said gain of each said gain control to reduce said increased difference between said gain and said optimum gain of each of said adaptive loops.

34. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights with a first and second input terminal, said first input terminal of each of said weights coupled to the associated said input terminal of said adaptive array, a first adder coupled to receive the output signals of said weights to generate the adaptive array output signal, a feedback function coupled to receive said adaptive array output signal to generate the feedback signal, a separate first multiplier associated with each of said weights, each said first multiplier having a first and second input terminal and an output terminal, said automatic loop gain control system comprising:

an indirect ALGC including:
a separate gain control associated with each input terminal of said adaptive array, each having first and second input terminals and an output terminal, said first input terminal disposed to be coupled to associated one of said antenna elements, and said output terminal disposed to be coupled to said associated input terminal of said adaptive array; and
a detector having at least one input and an output terminal with each input terminal of said detector disposed to be coupled to said output terminal of the associated said gain control to generate a control signal and with said output terminal of said detector disposed to be coupled to said second input terminal of each said gain control to adjust the gain of each said gain control to reduce said increased difference between said gain and said optimum gain of each of said adaptive loops by reducing the change in said input signal level of said adaptive array in a feedback manner.

35. A system as in claim 34 wherein said feedback function includes an amplitude limiter.

36. A system as in claim 34 wherein:
each said gain control includes a variable power attenuator gain control; and
said detector further includes:
a second adder having a plurality of input terminals and an output terminal with each of said input terminals disposed to be coupled to said output terminal of a different said variable power attenuator gain control to generate a summed signal;
a second multiplier having first and second input terminals and an output terminal, said first and second input terminals coupled to the output terminal of said second adder to square said summed signal; and
a lowpass filter having an input terminal and an output terminal with said input terminal coupled to said output terminal of said second multiplier to generate said control signal.

37. A system as in claim 34 further includes an individual amplitude limiter associated with each of said weights, each said amplitude limiter having an input and an output terminal with said input terminal disposed to be coupled to said associated one of said weights and said output terminal of each said amplitude limiter disposed to be coupled to said input terminal of said first multiplier associated with each of said associated weights.

38. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array to selectively weight said received signals by selected weight factors, an adder coupled to receive the output signals of said weights to generate the adaptive array output signal, a feedback function coupled to receive said adaptive array output signal to generate the feedback signal, said feedback function including generation of a reference signal which is correlated to said desired signal from said adaptive array output signal and subtracting said adaptive array output signal from said reference signal to generate said feedback signal, a separate multiplier associated with each of said weights, each said multiplier having a first and second input terminal and an output terminal, said automatic loop gain control system comprising:

an indirect ALGC including:
a separate gain control associated with each input terminal of said adaptive array, each having first and second input terminals and an output terminal, said first input terminal disposed to be coupled to associated one of said antenna elements, and said output terminal disposed to be coupled to said associated input terminal of said adaptive array; and
a detector having at least one input and an output terminal with each input terminal of said detector disposed to be coupled to said output terminal of the associated said gain control to generate a control signal and with said output terminal of said detector disposed to be coupled to said second input terminal of each said gain control to adjust the gain of each said gain control to reduce said increased difference between said gain and said optimum gain of each of said adaptive loops by reducing the change in said input signal level of said adaptive array in a feedback manner.

39. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array to selectively weight said received signals by selected weight factors, an adder coupled to receive the output signals of said weights to generate the adaptive array output signal, a feedback function coupled to receive said adaptive array output signal to generate the feedback signal, a separate multiplier associated with each of said weights, each said multiplier having a first and second input terminal and an output terminal, said automatic loop gain control system comprising:

an indirect ALGC including:

a detector having an input and an output terminal with said input terminal coupled to said adaptive array output signal to generate a control signal; and a separate gain control associated with each input terminal of said adaptive array, each having first and second input terminals and an output terminal, said first input terminal disposed to be coupled to associated one of said antenna elements, said output terminal disposed to be coupled to said associated input terminal of said adaptive array, and said second input terminal disposed to be coupled to said output terminal of said detector to adjust the gain of each said gain control to reduce said increased difference between said gain and said optimum gain of each of said adaptive loops by reducing the change in said input signal level of said adaptive array in a feedback manner.

40. An automatic loop gain control system to improve the performance of an adaptive array included in a communications receiver system with a plurality of antenna elements to reduce the effects of multipath with the performance of said adaptive array degraded by an increased difference between the gain and the optimum gain of any of the adaptive loops of said adaptive array due to changes in the input signal level of said adaptive array, said adaptive array including a separate input terminal associated with each one of said antenna elements, a plurality of weights coupled to each said input terminal of said adaptive array to selectively weight said received signals by selected weight factors, a first adder coupled to receive the output signals of said weights to generate the adaptive array output signal, a feedback function coupled to receive said adaptive array output signal to generate the feedback signal, a separate first multiplier associated with each of said weights, each said first multiplier having a first and second input terminal and an output terminal, said automatic loop gain control system comprising:

an indirect ALGC including:

a separate gain control associated with each input terminal of said adaptive array, each having first and second input terminals and an output terminal, said first input terminal disposed to be coupled to associated one of said antenna elements, and said output terminal disposed to be coupled to said associated input terminal of said adaptive array; and a detector having at least one input and an output terminal with each input terminal of said adaptive array disposed to be coupled to said input terminal of the associated said gain control to generate a control signal and with said output terminal of said detector disposed to be coupled to said second input terminal of each said gain control to adjust the gain of each said gain control to reduce said increased difference between said gain and said optimum gain of each of said adaptive loops by reducing the change in said input signal level of said adaptive array in a feedforward manner.

41. A system as in claim 40 wherein said feedback function includes an amplitude limiter.

42. A system as in claim 40 wherein: said detector further includes:

a second adder having a plurality of input terminals and one output terminal with each of said input terminals disposed to be coupled to a different one of said input terminals of said adaptive array to generate a summed signal; and a second multiplier having first and second input terminals and an output terminal, said first and second input terminals coupled to the output terminal of said second adder to square said summed signal;

a lowpass filter having an input terminal and an output terminal with said input terminal coupled to said output terminal of said second multiplier to generate the lowpass filtered signal; and a square root circuit with an input and output terminal with said input terminal coupled to said output terminal of said lowpass filter to receive said lowpass filtered signal to generate said control signal; and each said gain control includes a variable voltage attenuator gain control; and said adaptive array further includes an individual amplitude limiter associated with each one of said weights, each said amplitude limiter having an input and an output terminal with said input terminal coupled to the associated one of said weights and said output terminal of said amplitude limiter coupled to said first input terminal of said first multiplier associated with the same associated one of said weights.

43. An adaptive array included in a communications receiver system with constant envelope modulation to reduce the effects of multipath and interference, said adaptive array comprising:

N antenna elements disposed to receive transmitted radio signals as an input signal where N is an integer of at least 2;

N tapped delay lines, one tapped delay line associated with each of said N antenna elements, wherein each tapped delay line has a single input terminal disposed to be coupled to said antenna element associated therewith and M output terminals, where M is an integer of at least 2;

L weights, where L equals the product of M times N and where a different one of said L weights is associated with a different one of said output terminals of said N tapped delay lines, wherein each of said L weights having a first and a second input terminal and an output terminal, said first input terminal of each of said L weights is coupled to the associated output terminal of said associated tapped delay line and wherein each of said L weights applies a select weight factor to the signal received on said first input terminal of each of said L weights;

a first adder having L input terminals and an output terminal, each of said input terminals is coupled to the output terminal of a different one of said L weights to generate an adaptive array output signal;

a first amplitude limiter having an input terminal and an output terminal, said input terminal coupled to said output terminal of said first adder to receive said adaptive array output signal to generate a feedback signal;

a direct ALGC, said direct ALGC comprising:

a detector having an output terminal and at least one input terminal with each input terminal of said detector disposed to be coupled to the associated one of said N antenna elements to generate a control signal at said output terminal of said detector; and a gain control with a first and second input terminal and an output terminal, said first input terminal disposed to be coupled to said output terminal of said first amplitude limiter to receive said feedback signal and said second input terminal coupled to said output terminal of said detector to receive said control signal to adjust said gain of each of said adaptive loops;

L first multipliers, one first multiplier associated with each one of said L weights, wherein each of said L first multipliers have a first and a second input terminal and an output terminal with said first input terminal of each of said L first multipliers coupled to said associated output terminal of said associated tapped delay line and said second input terminal of each of said L first multipliers is coupled to said output terminal of said gain control; and L integrators, one integrator associated with each of said L weights, wherein each integrator has an input terminal and an output terminal with said input terminal coupled to said output terminal of the same of each L first multipliers that is associated with the same of each of said L weights and said output terminal of each of said L integrators is coupled to said second input terminal of said associated one of said L weights to control the generation of said select weight factor of said associated one of said L weights.

44. An adaptive array as in claim 43 wherein:

said detector further includes:
- a second adder having a plurality of input terminals and one output terminal with each of said input terminals disposed to be coupled to a different one of said N antenna elements to generate a summed signal;
- a second multiplier having first and second input terminals and an output terminal, said first and second input terminals coupled to said output terminal of said second adder to square said summed signal to generate a squared signal at said output terminal of said second multiplier;
- a lowpass filter having an input terminal and an output terminal, wherein said input terminal is coupled to said output terminal of said second multiplier to receive said squared signal to generate a lowpass filtered signal at said output terminal of said lowpass filter; and
- a square root circuit having an input terminal and an output terminal, said input terminal coupled to said output terminal of said lowpass filter to receive said lowpass filtered signal to generate said control signal at said output terminal of said square root circuit; and said gain control includes a third multiplier; and said adaptive array further includes L second amplitude limiters, one second amplitude limiter associated with each of said output terminals of each of said tapped delay lines, wherein each second amplitude limiter has an input terminal and an output terminal, with said input terminal of each of said L second amplitude limiters coupled to the associated one of M output terminals of the associated one of N tapped delay lines to amplitude limit the received signal and said output terminal of each of said L second amplitude limiters is coupled to said first input terminal of said associated one of each of said L first multipliers.

45. A system as in claim 43 further includes L second amplitude limiters, one second amplitude limiter associated with each of said output terminals of each of said N tapped delay lines, wherein each second amplitude limiter has an input terminal and an output terminal, with said input terminal of each of said L second amplitude limiters coupled to the associated one of M output terminals of the associated one of said N tapped delay lines to amplitude limit the received signal and said output terminal of each of said L second amplitude limiters is coupled to said first input terminal of said associated one of each of said L first multipliers.

46. An adaptive array included in a communications receiver system with constant envelope modulation to reduce the effects of multipath and interference, said adaptive array comprising:

N antenna elements disposed to receive transmitted radio signals as an input signal where N is an integer of at least 2;

an indirect ALGC, said indirect ALGC comprising:
- N gain controls, each having a first and a second input terminal and an output terminal, said first input terminal disposed to be coupled to said associated one of said N antenna elements;
- a detector with an output terminal and at least one input terminal with each input terminal of said detector coupled to said output terminal of the associated one of said N gain controls to generate a control signal at said output terminal of said detector and with said output terminal disposed to be coupled to said second input terminal of each of said N gain controls to adjust the signal level of each of said N antenna elements in a feedback manner to reduce change in the input signal level of said adaptive array;

N tapped lines, one tapped delay line associated with each of said N antenna elements, wherein each tapped delay line has a single input terminal disposed to be coupled to said output terminal of one of said N gain controls associated with the same one of said N antenna elements and M output terminals, where M is an integer of at least 2;

L weights, where L equals the product of M times N and where a different one of said L weights is associated with a different one of said output terminals of said N tapped delay lines, wherein each of said L weights has a first and a second input terminal and an output terminal, said first input terminal is coupled to the associated output terminal of said associated one of said N tapped delay lines and each of said L weights applies a select weight factor to the signal received on said first input terminal of each of said L weights;

a first adder having L input terminals and an output terminal, each of said L input terminals being coupled to the output terminal of a different one of said L weights to generate an adaptive array output signal;

a first amplitude limiter having an input terminal and an output terminal, said input terminal coupled to said output terminal of said first adder to receive said adaptive array output signal and to generate a feedback signal;

L first multipliers, one first multiplier associated with each of said L weights, wherein each of said L first multipliers having a first and a second input terminal and an output terminal with said first input terminal of each of said L first multipliers coupled to said associated output terminal of said associated N tapped delay lines and said second input terminal of each of said L first multipliers coupled to said output terminal of said first amplitude limiter; and L integrators, one integrator associated with each of said L weights, wherein each integrator has an input terminal and an output terminal with said input terminal coupled to said output terminal of the same of each of said L first multipliers that is associated with the same said of each of said L weights to which each of said integrator is associated and said output terminal is coupled to the second input terminal of the associated one of said L weights to control the generation of said select weight factor of said associated one of said L weights.

47. A system as in claim 46 wherein:

each of said N gain controls includes a variable power attenuator gain control; and said detector further includes:
- a second adder having a plurality of input terminals and an output terminal with each of said input terminals disposed to be coupled to said output terminal of a different said variable power attenuator gain control to generate a summed signal;
- a second multiplier having first and second input terminals and an output terminal, said first and second input terminals coupled to the output terminal of said second adder to square said summed signal and generate a squared signal at said output terminal of said second multiplier; and
- a lowpass filter having an input terminal and an output terminal with said input terminal coupled to said output terminal of said second multiplier to receive said squared signal to generate said control signal.

48. A system as in claim 46 further includes L second amplitude limiters, one second amplitude limiter associated with each of said output terminals of each of said tapped delay lines, wherein each second amplitude limiter has an input terminal and an output terminal, with said input terminal of each of said L second amplitude limiters coupled to the associated one of M output terminals of the associated one of N tapped delay lines to amplitude limit the received signal and said output terminal of each of said L second amplitude limiters is coupled to said first input terminal of said associated one of each of said L first multipliers.

* * * * *

UNITED STATES PATENT AND TRADEMARK OFFICE
CERTIFICATE OF CORRECTION

PATENT NO. : 5,608,409
DATED : Mar. 4, 1997
INVENTOR(S) : Kenneth F. Rilling

It is certified that error appears in the above-indentified patent and that said Letters Patent is hereby corrected as shown below:

Replace [AGLC] with -- ALGC -- in the following locations:

Column 7, line 7
Column 10, line 13
Column 10, line 33
Column 12, line 14
Column 15, line 34
Column 15, line 66
Column 16, line 39
Column 18, line 25
Column 23, line 65
Column 26, line 37

Column 19, line 8, in eq(14) insert an integral sign $\int$ after "2k" and in front of "D(t)".

Column 16, line 36, replace [network detector] with -- detector network --.

Column 17, line 7, replace [Xi(t)] with -- $X_i(t)$ --.

Column 18, line 7, replace [other,vise] with -- otherwise --.

UNITED STATES PATENT AND TRADEMARK OFFICE
CERTIFICATE OF CORRECTION

PATENT NO. : 5,608,409
DATED : Mar. 4, 1997
INVENTOR(S) : Kenneth F. Rilling

It is certified that error appears in the above-indentified patent and that said Letters Patent is hereby corrected as shown below:

Column 22, line 11, replace [control.60] with
-- control 60 --.

Column 25, line 61, in eq(17) replace $[S_1(n)=]$ with
-- $S_t(n)=$ --.

Column 26, line 7, in eq(18) replace $[S_1(n)/|S_1(n)|]$ with
-- $S_t(n)/|S_t(n)|$ --.

Signed and Sealed this

Thirtieth Day of September, 1997

Attest:

BRUCE LEHMAN

*Attesting Officer*  *Commissioner of Patents and Trademarks*